(12) United States Patent
Fujisaki

(10) Patent No.: US 7,127,271 B1
(45) Date of Patent: Oct. 24, 2006

(54) COMMUNICATION DEVICE

(76) Inventor: Iwao Fujisaki, 3-5-8-313, Musashinoshi, Kichijouji, Kitamachi, Tokyo (JP) 180-0001

( * ) Notice: Subject to any disclaimer, the term of this patent is extended or adjusted under 35 U.S.C. 154(b) by 855 days.

(21) Appl. No.: 10/251,579

(22) Filed: Sep. 19, 2002

Related U.S. Application Data

(60) Provisional application No. 60/329,997, filed on Oct. 18, 2001.

(51) Int. Cl.
H04M 1/00 (2006.01)

(52) U.S. Cl. ............................. 455/556.1; 455/550.1; 455/556.2

(58) Field of Classification Search ............ 455/550.1, 455/552.1, 556.1, 556.2, 566, 412.1–412.2, 455/413, 414.1, 419, 420, 92
See application file for complete search history.

(56) References Cited

U.S. PATENT DOCUMENTS

| | | | |
|---|---|---|---|
| 5,802,460 A * | 9/1998 | Parvulescu et al. ........... 455/92 |
| 5,959,661 A | 9/1999 | Isono | |
| 6,323,892 B1 | 11/2001 | Mihara | |
| 6,424,369 B1 | 7/2002 | Adair et al. | |
| 6,424,843 B1 | 7/2002 | Reitmaa et al. | |
| 6,452,626 B1 | 9/2002 | Adair et al. | |
| 6,486,867 B1 * | 11/2002 | Kopp et al. ................. 345/108 |
| 6,512,919 B1 * | 1/2003 | Ogasawara ............... 455/422.1 |
| 6,542,750 B1 * | 4/2003 | Hendrey et al. ......... 455/456.1 |
| 6,728,531 B1 | 4/2004 | Lee et al. | |
| 6,836,654 B1 | 12/2004 | Decotignie | |
| 7,035,666 B1 * | 4/2006 | Silberfenig et al. ...... 455/556.1 |
| 2001/0045978 A1 | 11/2001 | McConnell et al. | |
| 2002/0068599 A1 | 6/2002 | Rodriguez | |
| 2002/0173344 A1 | 11/2002 | Cupps et al. | |
| 2002/0196378 A1 | 12/2002 | Slobodin | |
| 2003/0013483 A1 | 1/2003 | Ausems | |
| 2003/0181201 A1 | 9/2003 | Bomze | |
| 2004/0242269 A1 | 12/2004 | Fadell | |
| 2005/0107119 A1 | 5/2005 | Lee et al. | |

FOREIGN PATENT DOCUMENTS

JP 20030114191 6/2003

* cited by examiner

*Primary Examiner*—CongVan Tran

(57) ABSTRACT

A wireless communication device comprising a camera, a display, an image data producing means, a wireless transmitting means, wherein said camera is capable of facing a first direction and a second direction, said image data producing means is capable of producing a non-inverted image data and an inverted image data, said image data producing means produces said non-inverted image data which is displayed on said display when said camera is facing said first direction and produces said inverted image data which is displayed on said display when said camera is facing said second direction, while said non-inverted image data is transferred in a wireless fashion from said wireless transmitting means.

2 Claims, 80 Drawing Sheets

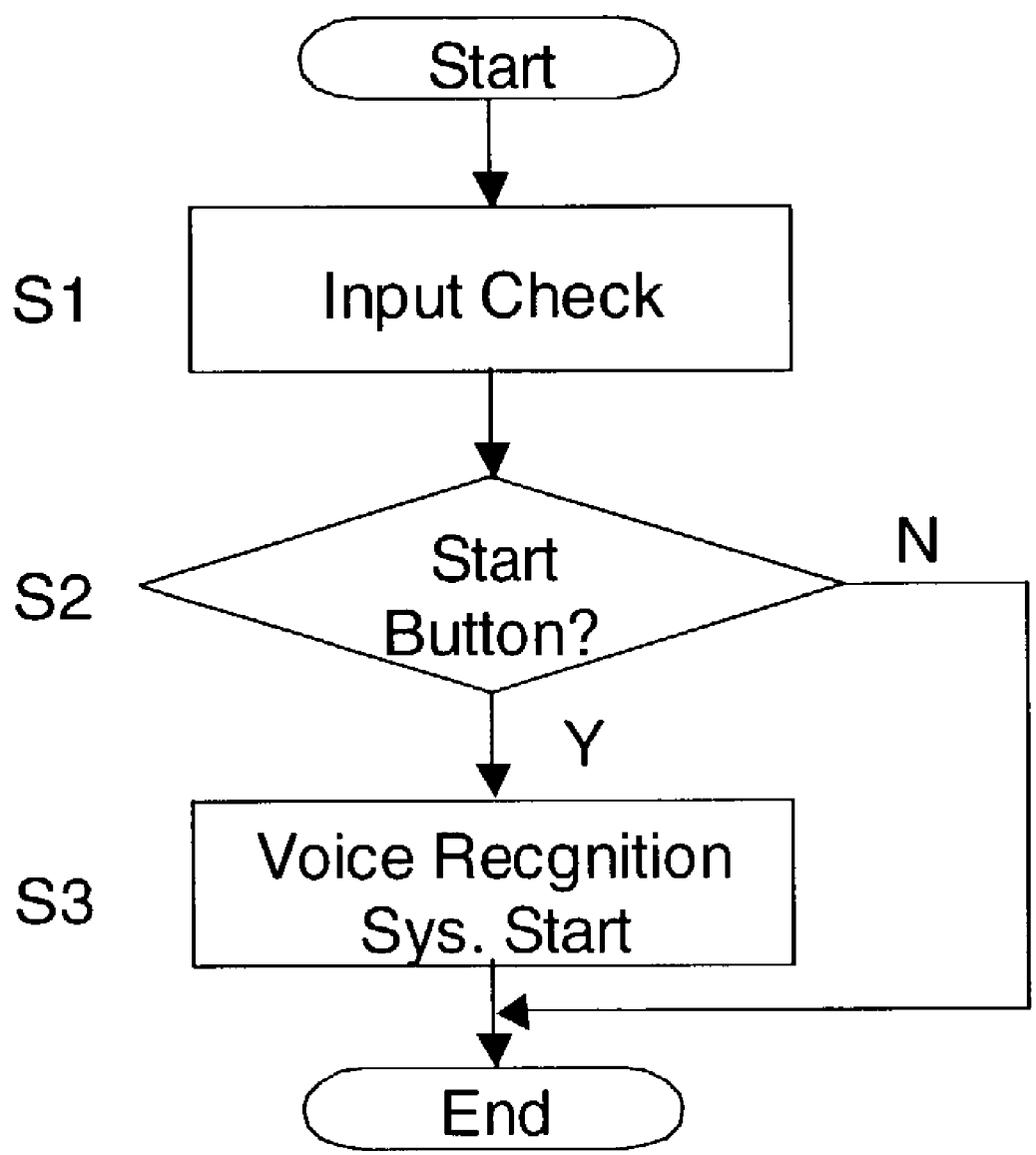

Table #1

| Audio Info #1 | Scott |
|---|---|
| Audio Info #2 | Carol |
| Audio Info #3 | Peter |
| Audio Info #4 | Amy |
| Audio Info #5 | Brian |

Fig. 8

Table #2

| Scott | (916) 411-2526 |
|---|---|
| Carol | (418) 675-6566 |
| Peter | (220) 890-1567 |
| Amy | (615) 125-3411 |
| Brian | (042) 645-2097 |

Fig. 9

Table #A

| Audio Info #1 | (916) 411-2526 |
|---|---|
| Audio Info #2 | (418) 675-6566 |
| Audio Info #3 | (220) 890-1567 |
| Audio Info #4 | (615) 125-3411 |
| Audio Info #5 | (042) 645-2097 |

Fig. 10

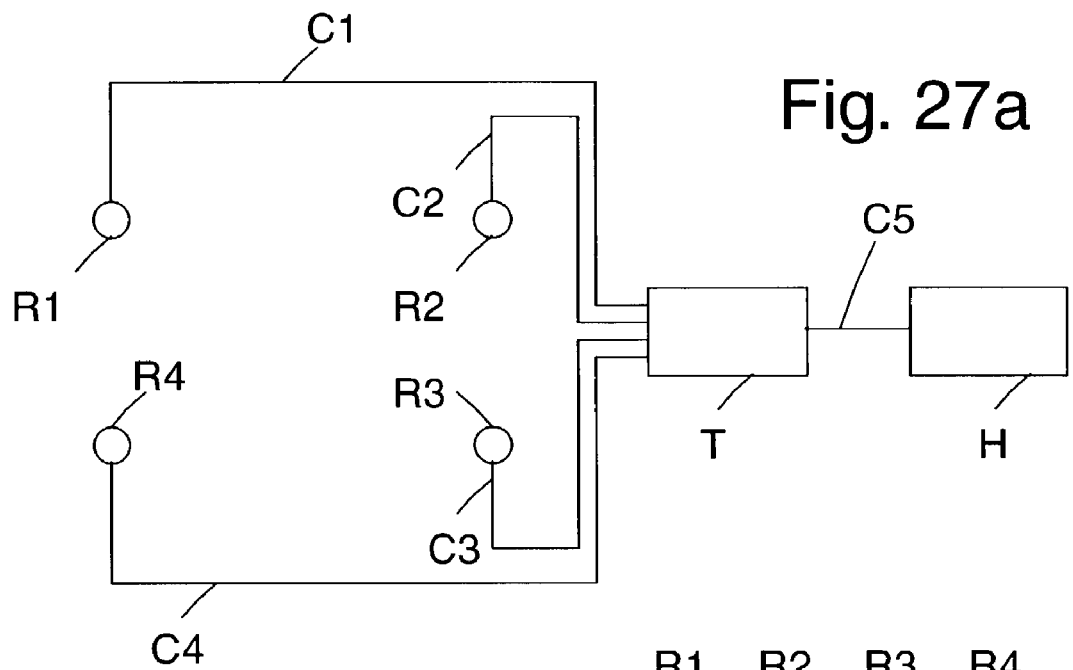
Fig. 27a
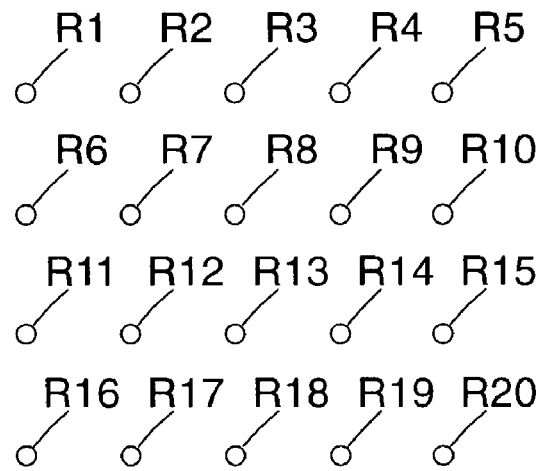
Fig. 27b
Fig. 28
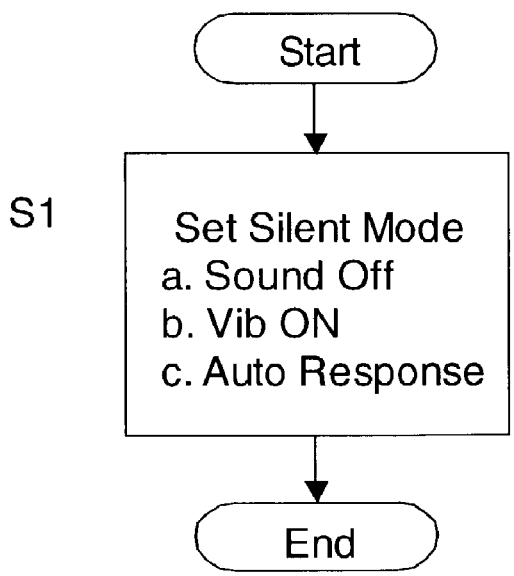

Fig. 32a
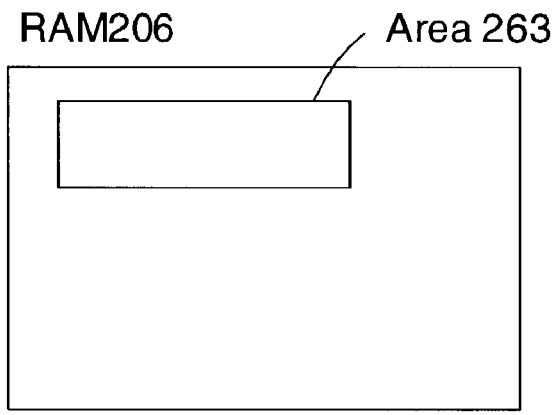
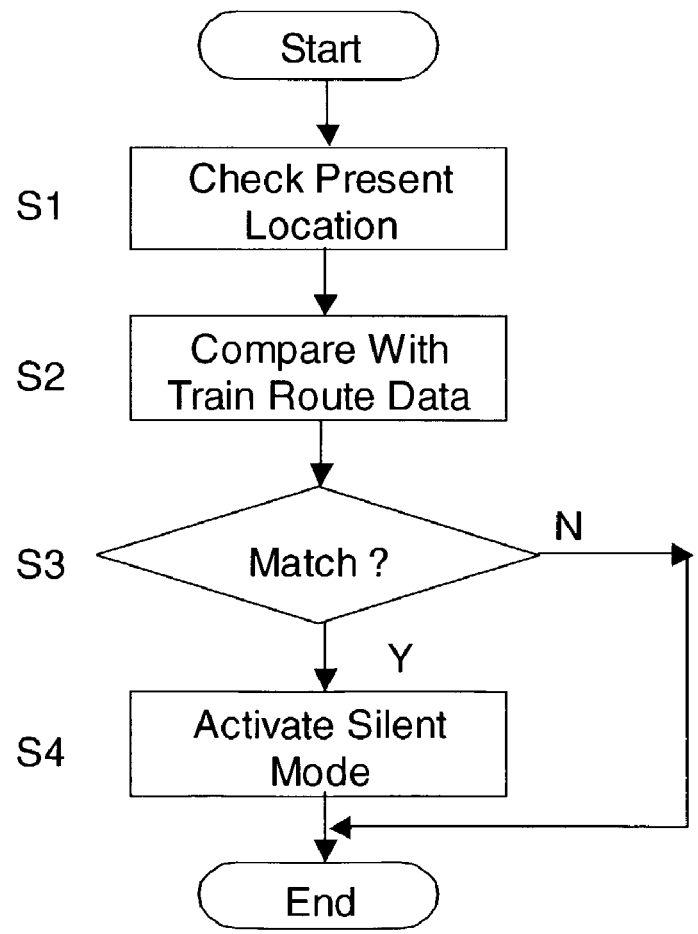
Fig. 32b

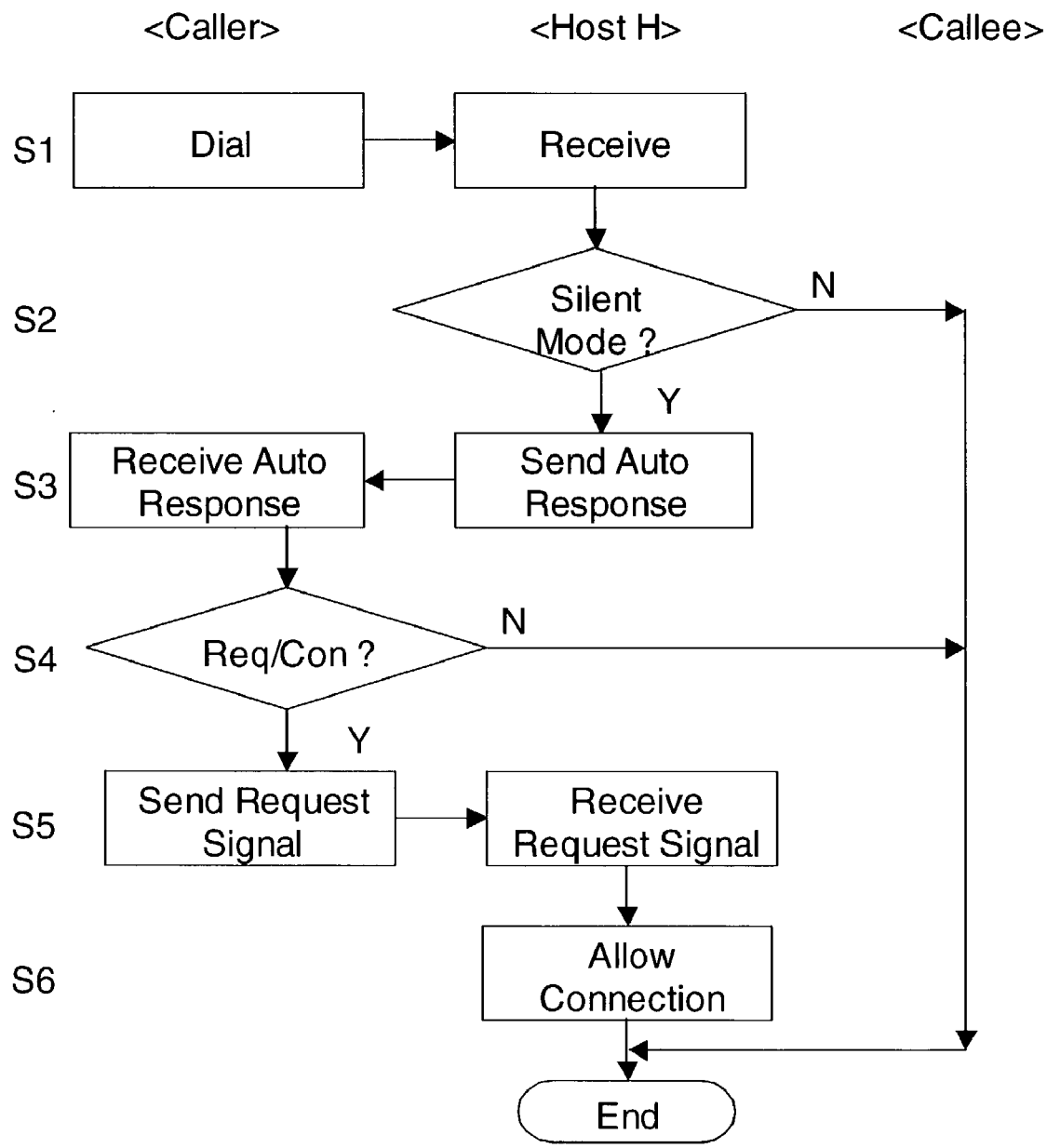

Area 267

Area 267

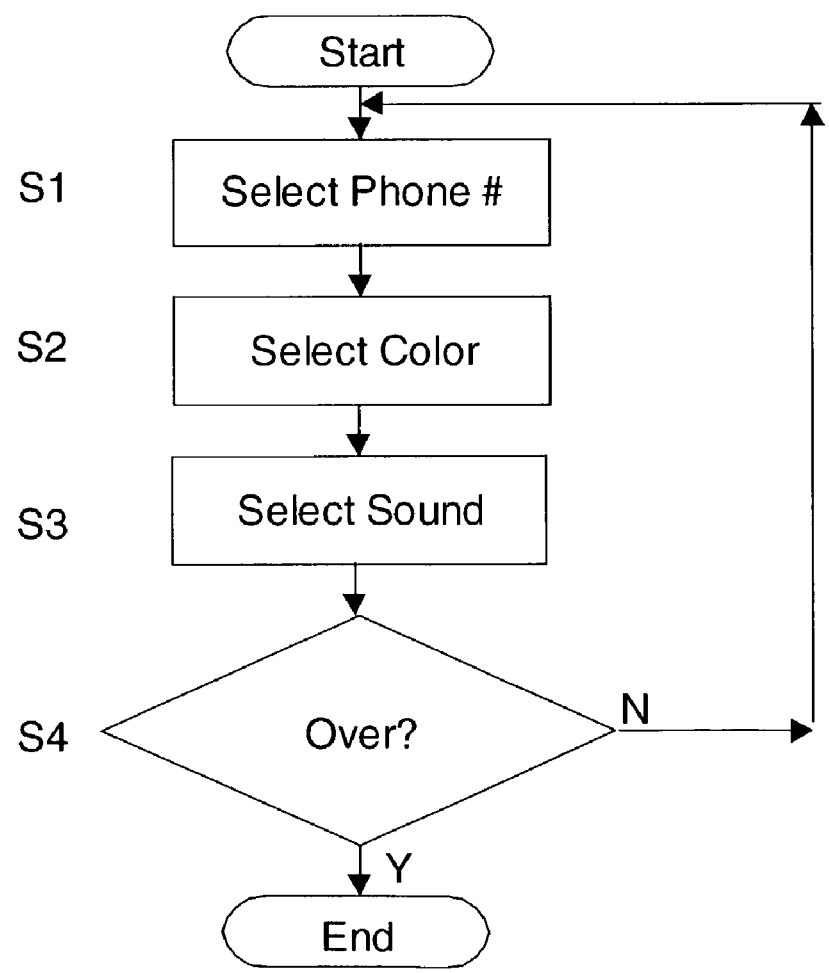

COMMUNICATION DEVICE

CROSS REFERENCE TO RELATED APPLICATIONS

This application claims the benefit of U.S. Provisional Application No. 60/329,997, filed Oct. 18, 2001, which is hereby incorporated herein by reference in its entirety.

FIELD OF THE INVENTION

The invention relates to communication device and more particularly to the communication device which has a capability to communicate with another communication device in a wireless fashion.

BACKGROUND OF THE INVENTION

U.S. Pat. No. 6,424,843 introduces a telecommunication device which comprises a speaker (32) and a microphone (33) in order to use the telecommunication device as a telephone. Further it comprises a camera (91, 1101) having a certain photographing direction, and a display (38, 1102) having a certain displaying direction, in order to use the telecommunication device as an image generating means. The photographing direction is substantially different from the displaying direction. In this prior art, FIGS. 3 a through 3d, 9a, 9b, 10, and 11 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,424,369 introduces a reduced area imaging device which is provided for use with a miniature hand-held computer referred to in the industry as a PDA. In one configuration of the imaging device, the image sensor is placed remote from the remaining image processing circuitry. In a second configuration, all of the image processing circuitry to include the image sensor is placed in a stacked fashion near the same location. In the first configuration, the entire imaging device can be placed at the distal end of a camera module. In a second configuration, the image sensor is remote from the remaining image processing circuitry wherein available space within the PDA is used to house the remaining circuitry. In any of the embodiments, the image sensor may be placed alone on a first circuit board, or timing and control circuits may be included on the first circuit board containing the image sensor. One or more video processing boards can be stacked in a longitudinal fashion with respect to the first board, or the video processing boards may be placed within the housing of the communication device. The PDA includes a miniature LCD-type video view screen which is capable of viewing not only the images taken by the camera module, but also can show incoming video images received from a personal computer connected to a global communications network. The camera module is of such small size that it can be easily stored within the housing of the PDA, and may be attached thereto as by a small retractable cable. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,342,915 introduces an image telecommunication system which comprises a worker's device and a manager's device. According to this prior art, the worker's device collects an image of an object and transmits it to the manager's device placed in a remote place, so that the image is displayed on a display screen of the manager's device. The manager's device transmits a designated position of the image, designated in a state where the image is displayed, to the worker's device. The worker's device indicates a position of the object corresponding to the designated position received from the manager's device. The worker's device detects a point of view of the worker. The manager's device suppresses fluctuation of the image displayed on the display screen, when it is determined that the worker looks at the object substantially continuously. In this prior art, FIGS. 1, 2, 4, 5, 10, and 11 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,323,893 introduces a portable video conference module supporting a network-based video conference comprising a processor, a video camera, and audio input device and several interfaces coupled to the processor. According to this prior art, the processor includes a local instruction processor accessing a local non-volatile memory. The interfaces include a wireless data capture interface, a video display interface, an audio output interface and a network interface. In this prior art, FIG. 7 primarily illustrates the application of camera, however, this prior art does not disclose a communication device displaying a non-inverted image data when a CCD is facing the first direction and displaying an inverted image data when the CCD is facing the second direction as described hereinafter.

U.S. Pat. No. 6,323,892 introduces a display and camera device for a videophone which comprises a liquid crystal display for displaying a picture, a camera such as a CCD sensor or a CMOS sensor, a free-form surface prism, and a prism for guiding light to the camera. According to this prior art, the free-form surface prism has a concave reflector for optically enlarging a picture displayed on the display. A beam splitter is provided on a bonded surface between the free-form surface prism and the prism. The beam splitter is designed to reflect some of light beams from the display toward the reflector and transmit some of light beams from the reflector. A camera-system optical path extending from the camera is aligned with a display-system optical path extending from the display within the free-form surface prism and the outside space. In this prior art, FIGS. 3 and 10 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,317,039 introduces a method and system for remote assistance and review of a technician or multiple technicians, in real time, working with equipment of various complexity. According to this prior art, a technician or multiple technicians at a remote location are coupled by a wireless means to an advisor at a local station, so that the advisor may view and hear the same stimuli as the technician, that the advisor and technician may communicate. The technician has limited training or otherwise in need of support, and may be a field engineer, technician or maintenance personnel. The advisor has extensive training and able to provide technical support, and generally has extended and specialized knowledge with regard to the remote apparatus, and may be a technical expert on the remote apparatus. The technician may comprise an individual or group with technical training and knowledge, but lacking managerial or other authority, while the advisor comprises an individual or group with such authority. The technician communicates with the advisor by visual cues or ordinary speech, while the advisor views and listens to the remote apparatus. The advisor gives advise to the technician for manipulating or repairing the remote apparatus. Alternatively, an intermediate advisor may advise the technician and be advised by a higher-level advisor. In this prior art, FIGS. 2 through 4 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,304,729 introduces a camera which is provided with a radio receiver for receiving electromagnetic waves transmitted from a given radio base station, a GPS receiver for receiving electromagnetic waves transmitted from each of a plurality of artificial satellites, a place information generator for generating place information based on one of electromagnetic waves received by the radio receiver and electromagnetic waves received by the GPS receiver, and a selector for selecting activation of one of the radio receiver and the GPS receiver, the selector judging whether the receptive state of the radio receiver is satisfactory, and selecting activation of the GPS receiver if the receptive state of the radio receiver is judged to be unsatisfactory. In this prior art, FIG. 8 primarily illustrates the application of camera, however, this prior art does not disclose a communication device displaying a non-inverted image data when a CCD is facing the first direction and displaying an inverted image data when the CCD is facing the second direction as described hereinafter.

U.S. Pat. No. 6,300,976 introduces a digital image capturing device which communicates through an input/output interface with an external processing device which monitors and/or controls the camera. According to this prior art, the image capturing device communicates with the external device in order to output status information to the external device, receive commands from the external device and to transfer images and sound between the image capturing device and the external device. Various parameters describing the state of the image capturing device are transmitted to the external device including characteristics of the captured images, whether the flash is ready, the state of the device battery, whether the memory is full, or the parameters used when capturing images. The commands which can be sent from the external device to the image capturing device include commands to change any of the parameters of the image capturing device and a command to capture an image or a series of images, and whether or not sound is recorded. In this prior art, FIGS. 3 and 6 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,278,884 introduces a conventional portable cellular phone which is modified such that the phone housing incorporates a digital cameras security alarm system and other functions. In another embodiment, the portable cellular phone is modified such that the phone housing incorporates a security alarm system, radio receiver and other functions. In this prior art, FIGS. 2 through 4 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,192,257 introduces a wireless communication terminal which is configured for enabling a user to receive and transmit video images as well as receive and transmit audio or speech signals associated with the user of the terminal and another user at, for example, a remote location. According to this prior art, the received video image is obtained from a video image signal received over a radio frequency communications link established between the wireless communication terminal and a cellular base station. This received video image is displayed in a video image display conveniently associated with the wireless communication terminal. The transmitted video image signal may be that of the user of the terminal, of a scene within the field of view of the video camera or of text either coupled to the terminal through one of many well known data interfaces, or an image of text as captured by the camera. This transmitted video image signal is obtained from a video camera associated with the wireless communication terminal and then transmitted over the radio frequency communications link established between the wireless communication terminal and the cellular base station for displaying in a remotely located video image display. In this prior art, FIG. 5 primarily illustrates the application of camera, however, this prior art does not disclose a communication device displaying a non-inverted image data when a CCD is facing the first direction and displaying an inverted image data when the CCD is facing the second direction as described hereinafter.

U.S. Pat. No. 6,177,950 introduces a personal communication device which includes a display for displaying data and video signals; a loudspeaker for generating an audible signal; a microphone for receiving an audio signal; a keypad for entering data; a telecommunications interface for receiving and transmitting information; and an internal multi-position and multi-function reading head for producing an image signal when in a first position using a first lensing and for reading for image conversion using a second lensing when in a second position. In this prior art, FIGS. 1A, 3A, 3B, 9, and 10 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,175,717 introduces a mobile which can transmit and receive broadcast quality video signals while in motion. The system includes a power generator and a microwave subsystem coupled to said power generator. The microwave subsystem transmits first local microwave signals modulated with first local digital data while in motion with respect to earth and also receives first remote microwave signals modulated with first remote digital data while in motion with respect to earth. A high speed digital station receives a video signal and transforms and compresses the video signal into the first local digital data and transforms and decompresses the first remote digital data into a first decompressed remote digital data. The mobile microwave system is housed in a vehicle which has a lower portion and an upper portion, wherein the first local microwave signals can pass through the upper portion. In this prior art, FIGS. 5 through 8 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,073,034 introduces a microdisplay system that utilizes a small high resolution active matrix liquid crystal display with an illumination system and a magnifying optical system to provide a hand held communication display device. The system can employ an LED illumination system and cellular communication or processor circuits within a compact housing to provide communication devices such as pagers, telephones, televisions, and hand held computer or card reader devices with a compact high resolution data and/or video display. In this prior art, FIGS. 4B*a*, 8, 10A, 10B, 14A–14C, and 17A–17C primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 6,055,513 introduces apparatus and methods which are provided for effecting remote commerce, such as in telemarketing (either inbound or outbound) and in electronic commerce, which are particularly adapted for the intelligent selection and proffer of products, services or information to a user or customer. In one aspect of the invention, goods, service or information are provided to the user via electronic communication, such as through a telephone, videophone or other computer link, as determined by the steps of first, establishing communication via the electronic communications device between the user and the system to effect a primary transaction or primary interaction, second, obtaining data with respect to the primary transaction or primary interaction, including at least in part a determination of the identity of the user or prospective customer, third, obtaining at least a second data element relating to the user, fourth, utilizing the primary transaction or primary interaction data along with the at least second data element as factors in determining at least one good, service or item of information for prospective upsell to the user or prospective customer, and offering the item to the prospective customer. In the preferred embodiment, the selection of the proffer of goods, services or information comprises an upsell with respect to the primary transaction or primary interaction data. The offer of the upsell is preferably generated and offered in real time, that is, during the course of the communication initiated with the primary transaction or primary interaction. In this prior art, FIG. 3 primarily illustrates the application of camera, however, this prior art does not disclose a communication device displaying a non-inverted image data when a CCD is facing the first direction and displaying an inverted image data when the CCD is facing the second direction as described hereinafter.

U.S. Pat. No. 6,038,295 introduces a communication system which includes at least one telephone unit, a transmission system for communicating from the telephone unit, and a server for receiving information via the transmission system. The telephone unit includes a digital image pick up by which images are recorded, transmitted to the server, and stored in the server depending upon classification information which characterizes the digital images and which is associated with the digital image data. The classification information is determined by an analysis unit in the server. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 5,966,643 introduces hand-held mobile radiotelephones and cordless telephones which have the dimensions of a handset, and their antennas radiate near the user's head; such may be improved by providing a hand-held radiotelephone which is of a compact design and fully user-controllable and exposes the user to only little RF radiation. A hand-held radiotelephone (HH1) is provided whose earpiece (R) and/or microphone (M) are spatially separated from the other components of the radiotelephone. It is also possible to provide an infrared link between the earpiece and/or microphone and the housing of the radiotelephone in order to further increase the user's freedom of movement. During operation of the hand-held radiotelephone, the keyboard and display are fully accessible. In this prior art, FIG. 2 primarily illustrates the application of camera, however, this prior art does not disclose a communication device displaying a non-inverted image data when a CCD is facing the first direction and displaying an inverted image data when the CCD is facing the second direction as described hereinafter.

U.S. Pat. No. 5,917,542 introduces a system method for digital image capture and transmission which includes an image fulfillment server, having a transceiver for sending and receiving channel assessment signals and receiving a digital image file and a memory for storing the received digital image file. The system also includes a digital camera having an electronic image sensor for sensing an image and producing a digital image; a short term memory for storing digital images produced by the image sensor in digital image files; a transceiver for communicating with and transmitting the digital image files to the image fulfillment server; a signal strength detector for monitoring the registration signal from the fulfillment server and producing a transmit enable signal; a long term memory for storing the digital image files; the transmit enable signal for disabling transmission of the digital image data when the channel assessment signal indicates that successful transmission of the digital image data is not possible; and a timer for transferring the digital image file from the short term memory to the long term memory after a predetermined period of time. In this prior art, FIGS. 1 through 3 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 5,915,020 introduces a portable device for receiving satellite signals and displaying the signals as video. The device includes a portable supporting member such as a hinged enclosure case, a satellite antenna, and a display monitor. The satellite antenna is preferably of a flat configuration and is mounted to the support, and the display monitor is preferably a flat video screen mounted to the same support. The required satellite receiver electronics and video decoder may be mounted to the portable support and powered by one or more batteries to provide an integrated and easily transported system to receive and view video relayed by satellite. A PCMCIA card slot and a microcontroller can be provided with the device to provide additional features such as cellular modem use, PCS wireless access, RS-232 port emulation, or GPS position location. In this prior art, FIG. 8 primarily illustrates the application of camera, however, this prior art does not disclose a communication device displaying a non-inverted image data when a CCD is facing the first direction and displaying an inverted image data when the CCD is facing the second direction as described hereinafter.

U.S. Pat. No. 5,879,289 introduces a portable, hand-held endoscopic camera having all of the necessary components for performing endoscopic procedures which comprises power source means, lens means, light source means, and video camera means. The portable endoscopic camera is adaptable to a wide variety of systems and includes a highly efficient means for focusing the illumination of the light source. The lens means includes a fiber bundle and the light source means includes a bulb. The bulb is positioned in an abutting relationship with the fiber bundle, thereby focusing light into the fiber bundle. The camera is selectively operable in a cordless and cord-operated mode. In this prior art, FIGS. 1 through 4, and 7 through 10 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 5,550,754 introduces a combination portable recording video camera and video-conferencing terminal wherein a video camera and lens is adjustable so that it can either produce images of an operator's surroundings for recording on a medium such as video tape, as in normal recording video cameras, or of the operator as in video conferencing terminals. The device is preferably provided with a video display screen that functions as a viewfinder in video-graphing the surroundings. The device is equipped with communication electronics that establish a connection over a network, and then transmits video and audio signals from the device while displaying video signals and reproducing audio signals that arrive over the network. Attempts by the network to establish a connection with the device result in the device automatically establishing the connection. Then the device activates its internal recording systems to play the prerecorded video message and transmit it over the network. The operator is later able to play the recorded signals and view them on the device's built-in display. In this prior art, FIGS. 6, 12, 13, and 29 primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 5,491,507 introduces a handy type video telephone equipment which permits a user to transmit and receive pictures and speech with a casing held in one hand. A speaker is arranged at the upper end part of the front of the casing which is thin and vertically long, while a microphone is arranged at the lower end part thereof. A display panel and a control panel are interposed between the speaker and the microphone. A camera is mounted on the casing so as to be capable of altering its angle. The speaker is detachably mounted, and it is usable as an earphone when detached. The user's movements are not hampered during the transmission and reception, and the equipment can assume various communication or service attitudes conforming to the contents of information for the communications. In this prior art, FIGS. 6, 15, 16A, and 16B primarily illustrate the application of camera, however, this prior art does not disclose a communication device displaying a non-inverted image data when a CCD is facing the first direction and displaying an inverted image data when the CCD is facing the second direction as described hereinafter.

U.S. Pat. No. 5,414,444 introduces a personal communicator for use in a wireless communication network which includes a wireless communications LCD and a multimedia LCD with the communications, mounded on a hinged member, and superimposed on top of the multimedia LCD. The communications LCD is sufficiently transparent to permit viewing of the under multimedia LCD. Each provides visual information to the user relative to the present use of the communicator. The selected use of the communicator is primarily responsive to the open or closed position of the hinged keyboard supporting cover. When the hinged member is closed the communicator operates in a communication mode. When it is open the communicator operates primarily in a multimedia mode. The personal communicator includes a steerable video imager for controllably optimizing image field coverage and adjusting to the orientation of the user relative to the personal communicator. The video imager includes an optical lens set and the imager is mounted on a mounting shaft so as to allow controlled rotation about its axis. The video imager includes mechanical apparatus interactive with the hinged keyboard supporting cover to reset its orientation to a standard position when the cover is closed and allow differing orientations when the cover is open. In this prior art, FIGS. 2 through 5, and 7 through 10 primarily illustrate the application of camera, however, this prior art does not disclose a communication device displaying a non-inverted image data when a CCD is facing the first direction and displaying an inverted image data when the CCD is facing the second direction as described hereinafter.

JP 2002-027495A introduces a three-dimensional image generating system which can generate a three-dimensional image stably even in the outdoors, and a three-dimensional information service system. According to this prior art, a three-dimensional shape can be measured with high accuracy using a plurality of (more than one) portable terminals with camera by preparing bases for installing these portable terminals with camera and calibrating them. An image can be picked up with a stabilized luminance even in the outdoors by a 3D imaging mode where flash light is used while setting predetermined shutter speed and iris or the shutter speed or iris is adjusted automatically through a unit for measuring illuminance. Furthermore, an arrangement for transferring three-dimensional data measured through use of the portable terminal with camera or three-dimensional data stored in a server to other terminal is realized. In this prior art, FIGS. 3, 10, and 11 primarily illustrate the application of camera, however, this prior art does not disclose a communication device displaying a non-inverted image data when a CCD is facing the first direction and displaying an inverted image data when the CCD is facing the second direction as described hereinafter.

JP 2000-332904A introduces a video telephone terminal in order to allow the other party to extremely easily grasp information that can not be completely communicated with characters alone in a visual way by transmitting an image together with the characters, further the image and sound together with the characters. According to this prior art, the video telephone terminal 1 consists of a camera 3, a display 2 displaying an image and characters, a microphone 6, a speaker 5, a key operating part 4 to be operated when various operations and character data are inputted, a radio part 11 which performs communication of sound data, character data and image data through an antenna 7, a mail preparing part 14 preparing various mails and a controlling part 15 transmitting mail data from the part 11 according to the instruction of mail transmission from the key operating part 4. The part 15 makes the part 14 prepare a mail with an image obtained by attaching image data to character data, and the characters and image of a received mail with an image are shown on the display 2 when the mail with an image is received. In this prior art, FIGS. 1 and 4 primarily illustrate the application of camera, however, this prior art does not disclose a communication device displaying a non-inverted image data when a CCD is facing the first direction and displaying an inverted image data when the CCD is facing the second direction as described hereinafter.

JP 2002-077841A introduces a small portable telephone with a camera having excellent operability. According to this prior art, the portable telephone with the camera comprises a lens 4 to be fed from a surface having main control buttons 10 to 13 of a body 2 arranged thereon to photograph. The telephone also comprises a control means for controlling to feed the lens 4 from the body 2 by an operation of the originating button 10 for originating a speech to enable a start of photographing. In this prior art, FIGS. 1 through 3 primarily illustrate the application of camera, however, this prior art does not disclose a communication device displaying a non-inverted image data when a CCD is facing the first direction and displaying an inverted image data when the CCD is facing the second direction as described hereinafter.

JP 2002-077687A introduces a camera which is not bulky when carrying, can be accommodated nicely in a pocket, a bag, or the like, offers an easy release operation regardless of the stance, an angle or the like when photographing and does not tend to give camera shakes when photographing. According to this prior art, a body 1 is flat and is a rectangular parallelepiped having an oblong shape in the longitudinal direction. A photographing lens 2 is housed in one end portion in the longitudinal direction and has an object incidence plane on one of the flat planes of the body 1. A display screen of a liquid crystal display 3 is placed in the middle of the longitudinal direction of the other flat plane of the body 1. A release button 5 is placed at an appropriate place from around an intermediate part to the other end in the longitudinal direction of the other flat plane of the body 1 and at around the center or close to the center of the body in the short side direction, that is in widthwise direction, so as to be depressable in the optical axis direction of the photographing lens 2 and operate. In this prior art, FIGS. 1 through 5, and 7 through 15 primarily illustrate the application of camera, however, this prior art does not disclose a communication device displaying a non-inverted image data when a CCD is facing the first direction and displaying an inverted image data when the CCD is facing the second direction as described hereinafter.

JP 2002-077684A introduces a camera unit and a portable electronic device such as a mobile phone capable of restricting use and protecting recorded information with a simple configuration. According to this prior art, the mobile phone 10 has a camera function including a lens unit 13 and an image pickup device and comprises a finger contact member 14 which can be housed in a housing 11 and a user can touch one's finger thereon when moved and a fingerprint collation unit wherein a fingerprint contacted with the finger contact member is photographed by the lens unit and the image pickup device, then said fingerprint is collated with the registered fingerprint whether they are the same or not based upon the photographed image. When the fingerprint is recognized the same as the registered fingerprint by the fingerprint collation unit, restricted functions such as power switch become available. In this prior art, FIGS. 1 through 5 primarily illustrate the application of camera, however, this prior art does not disclose a communication device displaying a non-inverted image data when a CCD is facing the first direction and displaying an inverted image data when the CCD is facing the second direction as described hereinafter.

JP 2002-050999A introduces a portable telephone system having a camera function, which can remotely control the portable telephone system. According to this prior art, the portable telephone system having a camera function is constituted by; a portable telephone set (portable telephone body 10) with a camera function having a remote communication means (remote communication portion 18) on the portable telephone side, and a remote controller (remote control body 30) having a remote communication means (remote communication portion 33) on the remote control side for transmission/reception of an operation signal to/from the remote communication means on the portable telephone side. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP 2002-033799A introduces a portable information terminal equipment and method to readily report a place where a user is located at present, or the state of the periphery by portable information terminal equipment. According to this prior art, while using a portable telephone set 10 provided with a transmitting/receiving means for transmitting/receiving video signals via a communication network for moving object, a display panel 12 for displaying video composed of video signals received by this transmitting/receiving means and a CCD camera 18 for imaging and transmitting the video signals provided by imaging through the transmitting/receiving means, the scenery of the periphery is photographed by the CCD camera 18, the video signals provided by this photographing are transmitted via the communication network for moving object to the other portable telephone set 10 connected to a line, and this photographed scenery of the periphery is displayed on the display panel 12 of the other portable telephone set 10. In this prior art, FIGS. 1 through 10 primarily illustrate the application of camera, however, this prior art does not disclose a communication device displaying a non-inverted image data when a CCD is facing the first direction and displaying an inverted image data when the CCD is facing the second direction as described hereinafter.

JP 2001-333171A introduces a mobile phone with camera to solve a problem of a conventional mobile phone with camera that has had a remarkable difference of a focal position between a general photographing and a magnified photographing of the iris of a talker for the purpose of person authentication because the person authentication of a possessor of the mobile phone is required attended with multimedia application of the mobile phone, incorporation of the camera is generalized and the built-in camera can be used for a tool for the person authentication to effective utilization of it. According to this prior art, a movable lens is provided in front of an existing objective lens so as to considerably change a focal position when the movable lens is employed and not employed. In this prior art, FIG. 1 primarily illustrates the application of camera, however, this prior art does not disclose a communication device displaying a non-inverted image data when a CCD is facing the first direction and displaying an inverted image data when the CCD is facing the second direction as described hereinafter.

JP 2001-320622A introduces a portable telephone set having a camera that can pick up an image of an object without a problem even at a dark place. According to this prior art, a strobe 22 is provided to a main body 12 of the portable telephone set 10 provided with a camera, and the camera picks up an image of the object by lighting the object with the strobe 22 through a release operation of a release button 40. Furthermore, a backlight 90 of a liquid crystal display device 14, a liquid crystal display panel 92 and a strobe discharge tube 24 of the strobe 22 equivalent to noise sources are contained in container sections 86A, 86B formed to the surface of an electromagnetic shield frame 86, an electronic printed circuit board 11 of the portable telephone set 10 is fitted to the rear side of the electromagnetic shield frame 86 to configure a shield unit 88. Since the electromagnetic wave is remarkably attenuated by the electromagnetic shield frame 86 before the electromagnetic wave emitted from the strobe 22 and the liquid crystal display device 14 reaches the electronic printed circuit board 11, malfunction due to the electromagnetic wave of the portable telephone set 10 can be prevented. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP 2001-320463A introduces a foldable portable terminal that is provided with an imaging camera, can transmit video and audio data and allows a user to monitor an image on a display device when the imaging camera picks up an image of the user itself and picks up an external object. According to this prior art, a lid section 3 is foldable and turnable with respect to a case body 2 of the portable terminal and the display device 6 provided at the lid section 3 is turned in correspondence with an imaging state with respect to the imaging camera 11 fixed to a rear face or a side face of the case body 2 so as to allow the user to monitor an image in the portable terminal. In this prior art, FIGS. 1, 4 and 5 primarily illustrate the application of camera, however, this prior art does not disclose a communication device displaying a non-inverted image data when a CCD is facing the first direction and displaying an inverted image data when the CCD is facing the second direction as described hereinafter.

JP 2001-320454A introduces a mobile phone with camera that can excellently be used even when a user photographs itself and the user photographs other person. According to this prior art, the mobile phone 10 comprises a camera incorporating an electronic camera 18 having a CCD photographing an object via a photographing lens 20 and having a release button 26 and provided with a liquid crystal display device 14 that displays a still picture of the object photographed by the release operation of the release button 26, the photographing lens 20 and the liquid crystal display device 14 are placed to a front side 12A of a mobile phone main body 12 and an eyepiece section 23 of an optical finder 22 is placed on a rear side 12C of the mobile phone body 12. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP 2001-309012A introduces a device for integrally combining a portable telephone set or a PHS with a camera and can conveniently be used. According to this prior art, the portable telephone set 3, the camera 4 and a battery charger 5 for the portable telephone set 3 are integrally incorporated in a container box 2. They are connected and the combination device 1 of the portable telephone set and the camera is constituted. One projected line 6 which is in an almost semi-columnar shape is installed on the outer part of the container box 2 and a lens protection cover 7, which performs power switch operation of the camera 4 and opens/closes, is installed in a front part. An opening part 9 for exchanging the battery of the camera 4 is installed in a side part. In this prior art, FIGS. 1 and 3 primarily illustrate the application of camera, however, this prior art does not disclose a communication device displaying a non-inverted image data when a CCD is facing the first direction and displaying an inverted image data when the CCD is facing the second direction as described hereinafter.

JP 2001-309003A introduces a portable telephone system to prevent dust and dirt from sticking and scratch from being made onto the lens of a camera and to make a system resistant to impact of drop in a portable telephone system having the camera. According to this prior art, a protection cover 3 is installed on a camera 2 being the video take-up means of a portable telephone main body 1. Projected lines 4 for sliding are provided on the projection cover 3 and recessed grooves 5 for sliding the projection cover 3 are provided in the portable telephone main body 1. The protection cover 3 can move along the recessed grooves 5 for sliding. When a user uses the camera 2, the protection cover 3 is slid, the lens 6 is exposed to use the camera 2. When the function of the camera 2 is not used, the protection cover 3 is slid, the lens 6 is covered to protect the camera 2 and the lens 6. In this prior art, FIGS. 1, and 3 through 10 primarily illustrate the application of camera, however, this prior art does not disclose a communication device displaying a non-inverted image data when a CCD is facing the first direction and displaying an inverted image data when the CCD is facing the second direction as described hereinafter.

JP 2001-285436A introduces a portable video telephone set provided with a loudspeaker having nearly the same size as that of the loudspeaker of a portable telephone and superior in receiving characteristics. According to this prior art, the small-sized portable telephone set is used in such a way that, when the telephone transmits and receives image data, a camera 12 having an image pick-up function is turned to the front side of an enclosure by using a turn mechanism 18. When the telephone transmits and receives voice data, a loudspeaker 15 provided on the back side of the camera 12 is turned to the front side of the enclosure by using the turn mechanism 18. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP 2001-245267A introduces portable information communication terminal unit with video camera to dispense with vertical inversion processing of an image in a portable telephone set with a video camera, which is used as a video camera and a TV telephone set. According to this prior art, when the portable telephone set 1 is used as a hands-free portable TV telephone set with a video camera, a camera receiver unit 9 is made to be in a state shown in figure. When it is used as the video camera, the camera receiver unit 9 is rotated by 180° from the shown state, and the front of a video camera part 10 is directed to the rear surface side of a body 2. The vertical inversion processing of an image signal can be dispensed with, since the vertical relation of the video camera is not changed in both usage cases as the portable TV telephone set and as the video camera. In this prior art, FIGS. 1 through 6 primarily illustrate the application of camera, however, this prior art does not disclose a communication device displaying a non-inverted image data when a CCD is facing the first direction and displaying an inverted image data when the CCD is facing the second direction as described hereinafter.

JP 2001-245266A introduces a portable information communication terminal unit by which a plurality of video camera units being different in specifications are mode attachable selectively and the mounted video camera units are identified so as to change-over operations. According to this prior art, a portable telephone set 1 is provided with a connecting part 2, a first case part 3 connected by the part 2 to be foldable and a second case part 4. An exterior video camera unit 10 is mounted on a camera unit mounting part 6. The various kinds of video camera units which is different in specifications, such as a color video camera unit, a monochrome video camera unit, a wide-angle video camera unit or telescopic video camera unit, are made attachable to the part 6. The portable information communication terminal 1 discriminates the specification of the mounted video camera unit and can change-over the internal operation according to the specification. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP 2001-245034A introduces a portable telephone set with a camera which can easily change the sight line of a camera to the front face or the rear face with a simple structure without impairing portability and which reduces costs and also can change camera functions. According to this prior art, this portable telephone set with a camera where a camera 100 is attached to a telephone body 10 in a freely attachable and detachable way, the camera 100 and the body 10 are connected by female and male connectors 102 and 200. The contacts 103 and 203 of the connectors are also doubly provided, and the sight line of the camera can be set toward the front or rear faces by the reversible connection mechanism of the camera 100. In this prior art, FIGS. 1, 2, and 4 through 8 primarily illustrate the application of camera, however, this prior art does not disclose a communication device displaying a non-inverted image data when a CCD is facing the first direction and displaying an inverted image data when the CCD is facing the second direction as described hereinafter.

JP 2001-169166A introduces a multifunctional portable terminal which is provided with a function of a video telephone or a video camera by which a user can simultaneously send a scene which the user is viewing and his expression, a pen entry function, and a data communication function and is miniaturized without impairing portability. According to this prior art, this portable terminal is provided with a device main part 10, a revolving shaft part 30, and a flip part 20, and the device main body part 10 has a microphone 18, a key operation part 17, and an image and voice radio transmission/reception function 54, and the revolving shaft part 30 is provided with a video camera 33 and an operation dial 34, and, and the flip part 20 is provided with a video display part 21 which displays an image photographed by the video camera 33, a received image, and an image for input operation and is provided with a touch panel, a CCD camera 23, a loudspeaker 24, and an operation button 22, and the revolving shaft part 30 is provided with an open/close shaft 31, which couples the device body part 10 and the flip part 20 so that they can be rotated relative to each other, and a revolving shaft 32 which couples the flip part so that it can be rotated in a horizontal direction different from the rotation direction, and the portable terminal is used as a video camera with a monitor, when the flip part is rotated in the opening horizontal direction. In this prior art, FIGS. 1–5, 9, and 13 primarily illustrate the application of camera, however, this prior art does not disclose a communication device displaying a non-inverted image data when a CCD is facing the first direction and displaying an inverted image data when the CCD is facing the second direction as described hereinafter.

JP 2001-007908A introduces a portable communication device which enables a conventional CCD camera half-fixedly attached to a portable telephone set to more flexibly work in a wide range and consequently is made very convenient to have a wider photographing range. According to this prior art, this device is provided with antenna equipment 4 for radio transmission/reception and is comprised of a portable communication device body 1 incorporating a communication information processing function connected to the antenna equipment and a CCD camera 3 which is connected to the communication information processing function to supply video digital information and is attached to the outside of the portable communication device body 1 by a flexible cord 2, and a display device, function keys, and a transmitter-receiver are constituted on the surface of the portable communication device body. In this prior art, FIG. 1 primarily illustrates the application of camera, however, this prior art does not disclose a communication device displaying a non-inverted image data when a CCD is facing the first direction and displaying an inverted image data when the CCD is facing the second direction as described hereinafter.

JP 2000-354233A introduces a portable telephone system that can transmit image information to a communication opposite party while securing a privacy and providing entertainment. According to this prior art, this portable telephone system 1, a CPU 2 applies image processing to image information photographed by a CCD camera 5 or an external device 13 and a radio communication section 3 transmits the processed image information to a communication opposite party as a transmission radio wave. It is avoided that a face of a communication party is clearly displayed on a display device of the communication opposite party by adopting processing hardly making the face of the communication party clearly visible such as mosaic processing of the face of the communication party, for example, for the image processing, and provision of entertainment is attained by adopting the processing such as provision of entertainment to image information of magnification reduction processing of part of, e.g. the image information for the image processing. Thus, the image information is transmitted to the communication opposite party by securing a privacy or providing the entertainment. In this prior art, FIGS. 1, 2, 4, and 5 primarily illustrate the application of camera, however, this prior art does not disclose a communication device displaying a non-inverted image data when a CCD is facing the first direction and displaying an inverted image data when the CCD is facing the second direction as described hereinafter.

JP 2000-354106A introduces a mobile phone to make the portability of the mobile phone compatible with the operability. According to this prior art, this mobile phone 1 consists of a 1st unit 2 and a 2nd unit 3, and the 1st unit 2 is provided with a base station radio communication section 5 that conduct radio communication with a base station 14, a local radio communication section 6 that makes local radio communication with the 2nd unit 3, a microphone 12 that receives voice information, and a receiver 13 that outputs the voice information. The 2nd unit 3 is provided with a keyboard 18 to enter character information, a CCD camera 19 that enters image information, and a display device 20 outputs the character information and the image information. A base station radio communication section 5, the keyboard, the CCD camera and the display device are separately provided to the units 2, 3. In the case of using the 2nd unit 3 to receive/output the character information and the image information, the 1st unit 2 with the enhanced operability is provided with the base station radio communication section 5 and the carrying performance of the 2nd unit 3 is enhanced through miniaturization and weight reduction. In this prior art, FIGS. 1 through 10 primarily illustrate the application of camera, however, this prior art does not disclose a communication device displaying a non-inverted image data when a CCD is facing the first direction and displaying an inverted image data when the CCD is facing the second direction as described hereinafter.

JP 2000-253455A introduces a portable radio terminal convenient for carrying in a waiting state and allowed to be easily used as a TV telephone as necessary.

SOLUTION: The portable radio terminal capable of executing data communication including sounds and images with a called party's terminal is provided with radio transmission/reception parts 3, 17, a camera 11 for acquiring picture data to be transmitted to the called party's terminal through the transmission/reception parts 3, 17, a color display device 10 capable of displaying the picture data received from the called party's terminal through the transmission/reception parts 3, 17, and a connector 21 capable of detachably fitting the camera 11 in accordance with a state whether the picture data are to be transmitted to the called party's terminal or not. In this prior art, FIGS. 1, 3, 5, 6, 8, and 9 primarily illustrate the application of camera, however, this prior art does not disclose a communication device displaying a non-inverted image data when a CCD is facing the first direction and displaying an inverted image data when the CCD is facing the second direction as described hereinafter.

JP 2000-253124A introduces an information portable terminal provided with image-pickup function to eliminate the need for preparing newly a mechanism or parts to attach an image pickup member freely turnably and accordingly to decrease the number of parts and to simplify the configuration of an information portable terminal by providing a hinge part, where the 1st and 2nd terminal main bodies are collapsibly connected together and the image pickup member which is prepared at the hinge part. According to this prior art, a display side main body 101 and a push-button side main body 104 are collapsibly connected together via a hinge part 200. Then a camera main body 105 is attached in a single body with the part 200 by means of a turning shaft of the part 200. Thus, the main body 150 is set on the turning shaft of the part 200, and according the photographing lens of the main body 150 is set at an angle to catch a user, when a collapsible portable telephone set is unfolded. Furthermore, the main body 105 is attached freely turnably via the turning shaft of the part 200, and accordingly the number of part items is decreased together with a simple constitution secured for an information portable terminal, in comparison with a case where the main body 150 is attached to the main body 101. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP 2000-253118A introduces a highly reliable portable information terminal or portable telephone set for easily selecting and using the portable information terminal or portable telephone set according in matching with TPO, and for flexibly coping with the variety of a user by forming a camera part freely attachably and detachably for the portable information terminal or portable telephone set. According to this prior art, a camera part 3 is formed freely attachably and detachably for a portable telephone set main body 1, and the camera 3 and the main body 1 are respectively provided with noncontact connectors for a power and signal, and the both connectors are arranged at positions faced to each other when the camera part 3 is mounted on the main body 1. Thus, it is possible to easily select and use the main body 1 and the camera part 3 according to TPO, and it is possible to flexibly cope with the variety of a user. Also, the both noncontact connectors are incorporated, and it is possible to ensure mechanical and electrical reliability at the attaching and detaching part, and to ensure reliability in a using environment such as moisture or dirt from the outside. In this prior art, FIGS. 1 through 3, 6, 7, and 9 through 11 primarily illustrate the application of camera, however, this prior art does not disclose a communication device displaying a non-inverted image data when a CCD is facing the first direction and displaying an inverted image data when the CCD is facing the second direction as described hereinafter.

JP 2000-253111A introduces a radio portable terminal for allowing a user to easily identify a caller at incoming time, even in the case of a relatively compact display part. According to this prior art, an image photographed by a camera 17 or an image fetched through an antenna 1, a transmission and reception switching part 2, a receiving part 7, and a demodulating part 8 are stored in an image memory 18. Then, at incoming time, a control part 11 reads the output of the demodulating part 8, obtains a telephone number at the calling side or the like, reads the image corresponding to the obtained telephone number or the like from the image memory 18, and causes a display part 14 to display this image. In this prior art, FIGS. 1 and 3 primarily illustrate the application of camera, however, this prior art does not disclose a communication device displaying a non-inverted image data when a CCD is facing the first direction and displaying an inverted image data when the CCD is facing the second direction as described hereinafter.

JP 2000-244673A introduces a portable telephone device to photograph a human body or an object or the like with a camera, and to transmit and receive the photographed picture, and to accurately recognize and call the name or telephone number of the destination. According to this prior art, a subject is photographed with a camera function having a shutter 101, an image pickup input part 102 and a camera control part 106, and the picked-up image is converted into picture data by a picked-up image inputting part 102, and the converted image data are transmitted to the destination of speech under the transmission control of a central control part 111. Also, a picture dial is prepared by making the destination of speech telephone number inputted by a key operating part 107 correspond to the picture data, and the prepared picture dial is stored in a picture dial memory part 113, and the stored picture dial is displayed at a display part 115, and a call is made with the picture dial selected according to the selecting operation of the key operating part 107 under the control of the central control part 111. In this prior art, FIGS. 1, 2, 4, 5, and 9 primarily illustrate the application of camera, however, this prior art does not disclose a communication device displaying a non-inverted image data when a CCD is facing the first direction and displaying an inverted image data when the CCD is facing the second direction as described hereinafter.

JP 2000-201335A introduces an electronic still camera with telephone function to recognize from what telephone set the image data is transmitted on the receiving side, in an electronic still camera to enable transmission of the photographed image data by integrating a camera and a portable telephone. According to this prior art, the electronic still camera is provided with a camera part 2 with a means to record the image data of a photographed image and a telephone circuit part 1 capable of transmitting the recorded image data by using a telephone line and the means to record the image data is constituted by constituting present station data to be set in the telephone circuit part 1 as recordable with the image data as additional information. When the image data to be obtained by photographing it by the camera part 2 is transmitted by the telephone circuit part 1, present station information to be set in the telephone circuit part 1 is added to the image data and by what camera the image data is photographed and transmitted is recognized on the side where the image data is received. In this prior art, FIGS. 1 through 5 primarily illustrate the application of camera, however, this prior art does not disclose a communication device displaying a non-inverted image data when a CCD is facing the first direction and displaying an inverted image data when the CCD is facing the second direction as described hereinafter.

JP 2000-197026A introduces a telephone set with camera which is easily carried.

SOLUTION: This portable equipment is integrally incorporated into a portable telephone set provided with a CCD camera 4, a display 6 for displaying an image by the camera, an antenna 1, a microphone 2, a speaker 3 and switches 5. With this configuration, photographing, call making, transmission of video, fax and video telephone or the like are executed when necessary only by carrying only a single equipment. In this prior art, FIG. 1 primarily illustrates the application of camera, however, this prior art does not disclose a communication device displaying a non-inverted image data when a CCD is facing the first direction and displaying an inverted image data when the CCD is facing the second direction as described hereinafter.

JP 2000-184013A introduces a portable telephone set with camera to suppress unpleasant feeling given to a periphery with a call tone by effectively using the camera part of a portable telephone set with camera. According to this prior art, when a call arrives, an image pickup signal obtained by a camera part 101 is inputted to a luminance detection part 102 with the control of a control part 108 if an incoming call by a sounder 105 is selected and the level of peripheral luminance is detected based on the signal. A comparator 103 compares the level detected by the luminance detection part 102 with a reference level which is previously set in the control part 108. In a level control part 104, the level of an incoming signal outputted to the sounder 105 by the control part 108 is controlled to be small when the comparator 103 judges that peripheral luminance is not less than reference, and the incoming signal outputted to the sounder 105 from the control part 108 is controlled to be transmitted at the level which is initially set when peripheral luminance is judged to be under reference. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP H11-298362A introduces a small portable terminal excellent in portability and capable of being easily used at the time of carrying. According to this prior art, a belt 4 is connected to a terminal main body 2 and the terminal main body 2 is mounted to the wrist by the belt 4. The terminal main body 2 is provided with a graphic color display part 10, a screen sensor 20, an interface 40 for communication, a microphone 5, a camera 60, a speaker 70, a battery 80, an operation button 90, a convex lens 100 for magnification, an external extension device attaching interface 110, a memory 120 and a CPU 130. Then, respective parts are driven by the control of the CPU 130 and the various kinds of processings as a small-sized information processor are performed. It is carried in the state of mounting the terminal main body 2 to the wrist by the belt 4 and is easily carried and the various kinds of operations are easily performed with one hand in the state. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP H11-205761A introduces a portable telephone set having camera function to allow one communicating part to send and receive voice information, character information and image information by switching sending and receiving methods in accordance with the voice information, character information and image information. According to this prior art, a communicating part 27 has functions which receive image information from image memory 22, character information from character memory 26 or a character information inputting part 25 and user's voice information from a voice input/output part 24 and outputs each information to other terminals. The part 27 has a switching means which switches sending methods in accordance with each information internally. Also, the part 27 receives image information, character information and voice information from other terminals and sends them to the memory 22, the memory 26 and the part 24 respectively. The part 27 switches receiving methods with the switching means in accordance with each information in the same way as the sending time. The part 27 consists, e.g. of data communication circuits. In this prior art, FIGS. 1 through 11 primarily illustrate the application of camera, however, this prior art does not disclose a communication device displaying a non-inverted image data when a CCD is facing the first direction and displaying an inverted image data when the CCD is facing the second direction as described hereinafter.

JP H11-136554A introduces a digital electronic camera of satisfactory operability, which automatically recognizes a function mode according to a direction where a photographing camera part faces at present and automatically selects a communication system corresponding to the function mode in the digital electronic camera having the function of a portable telephone set and PHS. According to this prior art, the digital electronic camera having the function of the portable telephone set and PHS is provided with a direction sensor 11 detecting the direction of the photographing camera part 21 where the photographing direction is variably provided. One function mode is selected according to the output of the direction sensor 11 and the communication system corresponding to the selected function mode is selected. An instruction is given to a communication system instruction circuit 12 and the camera functions as a television telephone mode under the management of a micro computer 7, for example. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP H10-065780A introduces a portable telephone equipment with a convenient video telephone equipment which can be miniaturized to a pocketable size and can execute various operations in spite of being miniaturized. According to this prior art, the equipment is provided with a picture and voice radio transmission and reception function and equipped with a video camera part 4, a picture display part 8 capable of displaying a picture picked up by the camera part, a received picture, etc., and a variable display touching operation part 10 capable of displaying a picture for various input operation and capable of touching input. Then a rotation pivoting part 5 combines the tip part of a first housing part 2 provided with the picture display part and a second housing part 3 provided with a variable display touching operation part to be capable of relatively rotating to each other. In addition the video camera part is arranged to be rotatable to the rotation pivoting part, and the first and second housing parts are provided with chamfers for allowing the rotation of the camera part. Thus, in the state of two-folding the first and second housing parts, the picture display part and the variable display touching operation part are not exposed to outside and the camera part can be positioned within the chamfers. In this prior art, FIGS. 4, 6, and 9–12 primarily illustrate the application of camera, however, this prior art does not disclose a communication device displaying a non-inverted image data when a CCD is facing the first direction and displaying an inverted image data when the CCD is facing the second direction as described hereinafter.

JP H09-186981A introduces a portable terminal equipment to suppress consumption of power supply battery. According to this prior art, when the terminal equipment is connected to a communication opposite party and a video conference is started, a CPU 10 receives image data to be sent from an image input device 20 and receives voice data to be sent from a voice input device 24 and uses a communication equipment 16 to send the image data and the voice data to the communication opposite party. A power supply management equipment 14 monitors a residual capacity of a battery 12 at all times and informs the battery residual capacity to the CPU 10 as required. When the residual capacity of the battery 12 reaches a prescribed capacity or below, the power supply management equipment 14 informs it to the CPU 10 that the residual capacity of the battery 12 is too small. The CPU 10 receiving the notice informs it to the communication opposite party via the communication equipment 16 that the transmission of the image data is stopped and only the voice data are sent at present. Then the CPU 1-0 gives a command to the power supply management equipment 14 to allow the equipment 14 to shut off supply of power to the image input device 20 and a camera 18. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP H08-294030A introduces a video camera integrated with portable telephone set to allow a video camera to be used by both a hand-free video telephone set and a handset telephone set while fingerprint and adhesion of dust are prevented. According to this prior art, a transparent cover 25 is journaled by a casing main body 2 to cover a video camera section 20 or a video display section 8. Furthermore, a camera case 5 with a video input means (video camera section) 20, an ear speaker 21 and a microphone 22 mounted integrally above the casing main body 2 is journaled with a shaft (tilted). The video camera with portable telephone set is configured by arranging the video display section 8 to a breast 7 of the casing main body 2, an operation button 10 to a waste 9, and a dynamic acoustic converter 12 to a lower part 11. The video input means 20 and the ear speaker 21 are arranged on sides turned nearly by 90° mutually and when the ear speaker 21 is in use (in the operating state as a handset telephone set), the video input means 20 is detoured the inside of the casing main body 2. In this prior art, FIGS. 1 through 13 primarily illustrate the application of camera, however, this prior art does not disclose a communication device displaying a non-inverted image data when a CCD is facing the first direction and displaying an inverted image data when the CCD is facing the second direction as described hereinafter.

JP H08-088841A introduces a portable video telephone to perform communication while viewing the expression of a called party anywhere by attaching a CCD camera and a liquid crystal or plasma screen to a portable telephone, using a compression technique, outputting moving pictures and performing the communication. According to this prior art, the CCD camera 1 and the liquid crystal screen or the plasma screen 2 are attached to the portable telephone 3, the compression technique is used and the communication is performed with the called party while outputting still pictures or the moving pictures. Also, when it is hard to listen to voice, an earphone or a headphone 4 provided in this portable video telephone 3 is pulled out and the voice is listened to. Thus, the communication is performed while viewing the face of the called party anytime and anywhere and telephone charges become inexpensive since the compression technique is utilized. In this prior art, FIGS. 1 and 2 primarily illustrate the application of camera, however, this prior art does not disclose a communication device displaying a non-inverted image data when a CCD is facing the first direction and displaying an inverted image data when the CCD is facing the second direction as described hereinafter.

JP H06-292197A introduces a portable radio type TV telephone capable of being used as an ordinary portable telephone by applying a earpiece provided at a main body device lower surface to the ear by closing a flip part when the other terminal party is the one with only a voice communications function. According to this prior art, an operating part 3 and a microphone 4 are provided to a device main body 1 upper surface, and the earpiece 14 and a second microphone 15 are provided to the device main body 1 lower surface. Also, the flip part 7 connected to the device main body 1 by a hinge 6 is provided, and a monitor 8, a CCD camera 9, and a speaker 10 are provided to the surface of the flip part 7 housed in the device main body 1 when it is closed. The telephone can be used as the radio type TV telephone by the speaker 10 and an earphone 12 while viewing the monitor by keeping a constant distance facing toward the monitor 8, the CCD camera 9, and the speaker 10 when the flip part 7 is opened, and also, it is used as the ordinary portable telephone by applying the earpiece 14 to the ear when the flip part 7 is closed and the monitor 8 is housed in the device main body 1 side. In this prior art, FIGS. 1 and 4 primarily illustrate the application of camera, however, this prior art does not disclose a communication device displaying a non-inverted image data when a CCD is facing the first direction and displaying an inverted image data when the CCD is facing the second direction as described hereinafter.

JP H06-133081A introduces an electronic still camera with portable telephone function to improve instantaneity by loading a portable telephone function to an electronic still camera and constituting the camera to be capable of immediately transmitting a taken picture to a large storage medium at another place through the use of a telehone line and to miniaturize the whole camera by making a display for confirming the taken picture attachable and detachable. According to this prior art, at the time of half-pushing a release button 12, power source is supplied to a camera part and a control circuit 25 controls for photographing. A subject is displayed on the display 8 through a lens 1, image pickup element 2, a picture processing circuit 4 and a driver 7. When a composition is decided and the release button 12 is pushed, picture data is recorded in an internal memory 26 and at the same time, a picture line ensuring means 24 instructs a control circuit 28 of the portable telephone set to call a previously-inputted telephone number to connect the line. When the line is connected, picture data of the internal memory 26 is read out. The control circuit 28 sends the piece of picture data to the line through a modulating circuit 29 and a transmission circuit 21. In this prior art, FIGS. 1 through 7, and 10 primarily illustrate the application of camera, however, this prior art does not disclose a communication device displaying a non-inverted image data when a CCD is facing the first direction and displaying an inverted image data when the CCD is facing the second direction as described hereinafter.

JP 2002-185589A introduces a portable telephone with which the 1st case by the side of the display screen and the 2nd case by the side of operation were connected possible to be folded. It has the 3rd case which mounts a camera unit and a receiver unit in the interior. The 1st case of the above While having the dead air space in which the 3rd case of the above is held near the edge, it connects with the 3rd case of the above possible rotation. The portable telephone is characterized by being prepared in the 3rd case of the above as the lens section of the aforementioned camera unit which can be covered by the end face of the 1st case of the above when the output section of the aforementioned receiver unit has turned to the display screen side. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP 2002-152339A introduces an image pck-up section in which is equipped with the following and the aforementioned animation motion picture camera photos an animation, and the photography memory which stores temporarily the video signal picturized in the aforementioned image pck-up section, the photography ON/OFF section which controls starting/halt of the function of the aforementioned image pck-up section, and CPU for motion picture cameras which controls the aforementioned animation motion picture camera, the baseband signal-processing section for motion picture cameras and the transceiver section for motion picture cameras which perform communication with the aforementioned main part of personal digital assistant equipment, and the antenna for motion picture cameras, personal digital assistant equipment with an image pck-up function which has a power supply means for motion picture cameras to supply power to the aforementioned animation motion picture camera, and the coupling means for combining with the aforementioned main part of personal digital assistant equipment removable, and is characterized by the ability to transmit an instruction of starting/halt of the aforementioned animation motion picture camera by the aforementioned operation means. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP 2002-141978A introduces a personal digital assistant equipment wherein a camera is connected to the main part of the personal digital assistant equipment. The specific key of two or more can be set to the control unit of the aforementioned personal digital assistant equipment. It considers as the state which can photo the aforementioned camera when long push operation which it continues pushing is performed. The control method of the personal digital assistant equipment characterized by performing operation corresponding to the photography function of the aforementioned camera assigned to the key when any one or two or more keys of two or more keys which can be set to the aforementioned control unit were further operated under this state. In this prior art, FIG. 1 primarily illustrates the application of camera, however, this prior art does not disclose a communication device displaying a non-inverted image data when a CCD is facing the first direction and displaying an inverted image data when the CCD is facing the second direction as described hereinafter.

JP 2002-132386A introduces a personal digital assistant equipment which provides a camera exposure/devotion means and a camera unit is built in the main part of the equipment, and the main part of a camera prepared in the head of this camera unit is interlocked within the personal digital assistant equipment with which two main parts of equipment are connected by the hinge unit, and make it absorbed to exposure/interior in the exterior of the main part of equipment. In this prior art, FIGS. 1 through 4 primarily illustrate the application of camera, however, this prior art does not disclose a communication device displaying a non-inverted image data when a CCD is facing the first direction and displaying an inverted image data when the CCD is facing the second direction as described hereinafter.

JP 2002-125208A introduces a picture telephone system which is a TV phone-type picture telephone system, which performs transmission and reception of voice and a picture between self-equipment-partner equipment, and is characterized by being constituted so that the image information which self-equipment or other equipments hold from partner equipment at the time of the arrival in a TV phone may be made from self-equipment with picture ready-for-sending ability to partner equipment. In this prior art, FIGS. 1 and 6 primarily illustrate the application of camera, however, this prior art does not disclose a communication device displaying a non-inverted image data when a CCD is facing the first direction and displaying an inverted image data when the CCD is facing the second direction as described hereinafter.

JP 2002-111834A introduces a fold-up formula cellular-phone equipment characterized by arranging in the mating face and tooth back of a main part side case the camera unit which carries out opening, and being constituted in the fold-up formula cellular-phone equipment with which two cases, a main part side case and the LCD side case, connect free rotation through the case rotation section, and are really constituted. In this prior art, FIGS. 1 through 3 primarily illustrate the application of camera, however, this prior art does not disclose a communication device displaying a non-inverted image data when a CCD is facing the first direction and displaying an inverted image data when the CCD is facing the second direction as described hereinafter.

JP 2002-111803A introduces a personal digital assistant equipped with the image pck-up module characterized by being the personal digital assistant which has the cellular-phone connection connector which connects a personal digital assistant with a cellular phone, and is equipped with an image pck-up module, and forming the aforementioned image pck-up module in a cellular-phone connection connector. In this prior art, FIGS. 2 and 3 primarily illustrate the application of camera, however, this prior art does not disclose a communication device displaying a non-inverted image data when a CCD is facing the first direction and displaying an inverted image data when the CCD is facing the second direction as described hereinafter.

JP 2002-111801A introduces a cellular-phone equipment equipped with the camera function and display function which are characterized by providing the following. The main part of equipment with which the loudspeaker and the microphone were installed, a distance detection means to detect the distance between this main part of equipment and user, a judgment means to judge whether the aforementioned main part of equipment is in the usual telephone call position based on the distance detected by this distance detection means, a control means which adjust the volume of the aforementioned loudspeaker, and the sensitivity of the aforementioned microphone while controlling operation of the aforementioned camera function and the aforementioned display function according to the judgment result by this judgment means. In this prior art, FIGS. 1, 4, and 6 primarily illustrate the application of camera, however, this prior art does not disclose a communication device displaying a non-inverted image data when a CCD is facing the first direction and displaying an inverted image data when the CCD is facing the second direction as described hereinafter.

JP 2002-107612A introduces a personal digital assistant characterized by having the picture acquisition section which is a personal digital assistant and acquires (a) photographic subject image, the lens unit to which image formation of the aforementioned photographic subject image is carried out in the (b) aforementioned picture acquisition section, and a lens move means to change the (c) aforementioned lens unit into the lens composition which performs macro photography. In this prior art, FIGS. 1, 2, 3, 5, and 6 primarily illustrate the application of camera, however, this prior art does not disclose a communication device displaying a non-inverted image data when a CCD is facing the first direction and displaying an inverted image data when the CCD is facing the second direction as described hereinafter.

SUMMARY OF THE INVENTION

It is an object of the present invention to provide a system and method to facilitate the user of the wireless communication device to see him/herself on the display therein as if he/she is seeing him/herself in a mirror.

Still another object is to overcome the aforementioned shortcomings associated with the prior art.

A wireless communication device comprising a camera, a display, an image data producing means, a wireless transmitting means, wherein said camera is capable of facing a first direction and a second direction, said image data producing means is capable of producing a non-inverted image data and an inverted image data, said image data producing means produces said non-inverted image data which is displayed on said display when said camera is facing said first direction and produces said inverted image data which is displayed on said display when said camera is facing said second direction, while said non-inverted image data is transferred in a wireless fashion from said wireless transmitting means.

BRIEF DESCRIPTION OF THE DRAWINGS

The above and other aspects, features, and advantages of the invention will be better understood by reading the following more particular description of the invention, presented in conjunction with the following drawings, wherein:

FIG. 5 is a flowchart illustrating an exemplary embodiment of the present invention.

FIG. 8 is a simplified illustration illustrating an exemplary embodiment of the present invention.

FIG. 9 is a simplified illustration illustrating an exemplary embodiment of the present invention.

FIG. 10 is a simplified illustration illustrating an exemplary embodiment of the present invention.

FIG. 27$a$ is a simplified illustration illustrating an exemplary embodiment of the present invention.

FIG. 27$b$ is a simplified illustration illustrating an exemplary embodiment of the present invention.

FIG. 28 is a flowchart illustrating an exemplary embodiment of the present invention.

FIG. 32$a$ is a block diagram illustrating an exemplary embodiment of the present invention.

FIG. 32$b$ is a flowchart illustrating an exemplary embodiment of the present invention.

FIG. 32$c$ is a flowchart illustrating an exemplary embodiment of the present invention.

FIG. 32$d$ is a flowchart illustrating an exemplary embodiment of the present invention.

FIG. 32$e$ is a flowchart illustrating an exemplary embodiment of the present invention.

FIG. 32$f$ is a simplified illustration illustrating an exemplary embodiment of the present invention.

FIG. 32$g$ is a flowchart illustrating an exemplary embodiment of the present invention.

FIG. 35$b$ is a flowchart illustrating an exemplary embodiment of the present invention.

FIG. 44$b$ is a flowchart illustrating an exemplary embodiment of the present invention.

FIG. 44$c$ is a simplified illustration illustrating an exemplary embodiment of the present invention.

FIG. 44$d$ is a simplified illustration illustrating an exemplary embodiment of the present invention.

FIG. 44$e$ is a simplified illustration illustrating an exemplary embodiment of the present invention.

FIG. 45 is a block diagram illustrating an exemplary embodiment of the present invention.

FIG. 46 is a flowchart illustrating an exemplary embodiment of the present invention.

FIG. 53$b$ is a flowchart illustrating an exemplary embodiment of the present invention.

FIG. 61$b$ is a flowchart illustrating an exemplary embodiment of the present invention.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example "RAM 206 (FIG. 1)". It is done so merely to assist the readers to have a better understanding of this specification, and must not be used to limit the scope of the claims in any manner since the figure numbers cited are not exclusive. The scope of the invention should be determined by referencing the appended claims.

Figure 1:
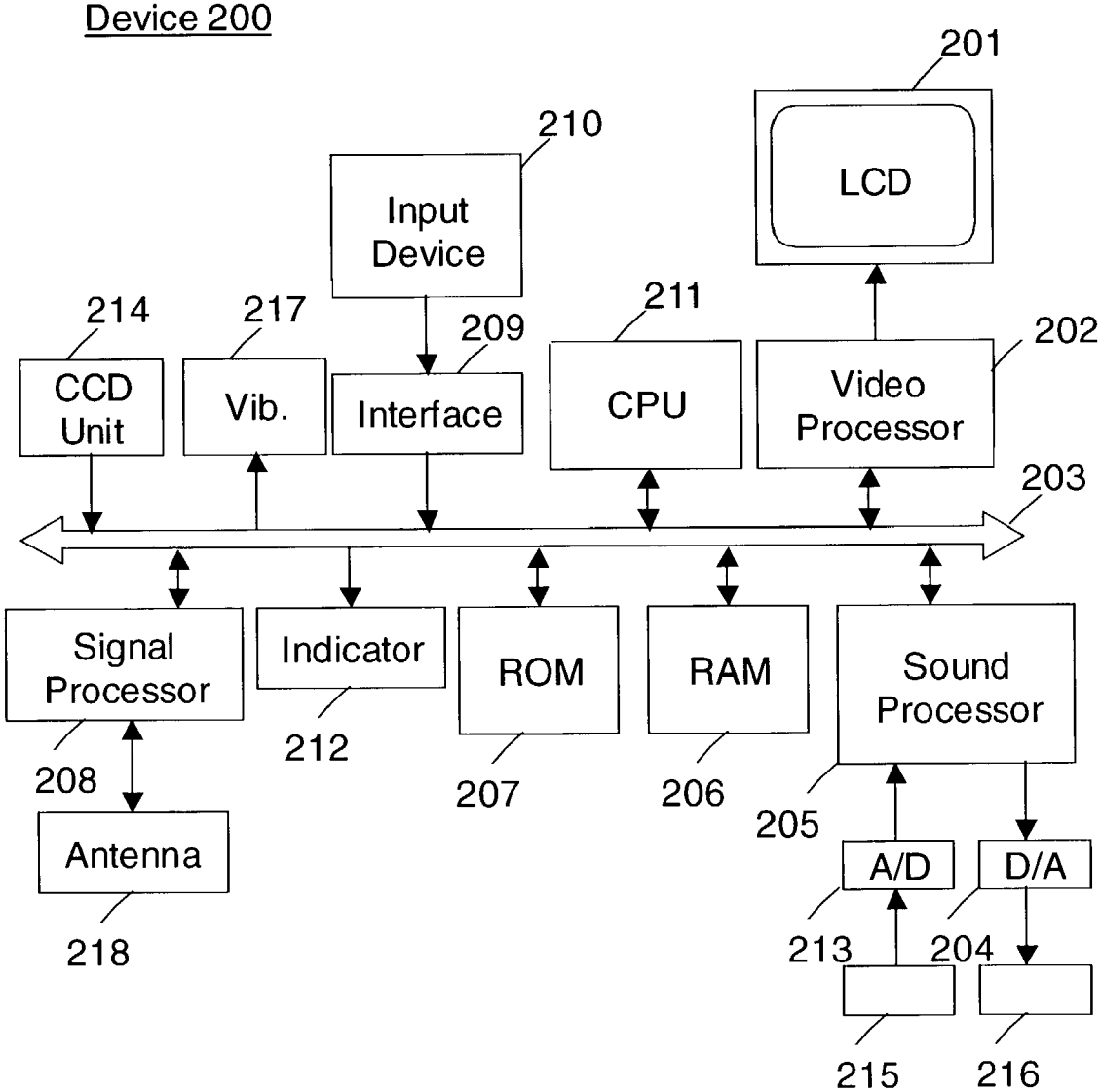
FIG. 1 is a block diagram illustrating an exemplary embodiment of the present invention.

FIG. 1 is a simplified block diagram of the communication device 200 utilized in the present invention. In FIG. 1 communication device 200 includes CPU 211 which controls and administers the overall function and operation of communication device 200. CPU 211 uses RAM 206 to temporarily store data and/or to perform calculation to perform its function, and to implement the present invention, modes, and functions explained hereinafter. Video processor 202 generates analog and/or digital video signals which are displayed on LCD 201. ROM 207 stores data and programs which are essential to operate communication device 200. Wireless signals are received by antenna 218 and processed by signal processor 208. Input signals are input by input device 210, such as dial pad, joy stick, and/or keypad, and the signal is transferred via input interface 209 and data bus 203 to CPU 211. Indicator 212 is an LED lamp which is designed to output different colors (e.g., red, blue, green, etc). Analog audio data is input to microphone 215. A/D 213 converts the analog audio data into a digital format. Speaker 216 outputs analog audio data which is converted into an analog format from digital format by D/A 204. Sound processor 205 produces digital audio signals that are transferred to D/A 204 and also processes the digital audio signals transferred from A/D 213. CCD unit 214 captures video image which is stored in RAM 206 in a digital format. Vibrator 217 vibrates the entire device by the command from CPU 211. For the avoidance of doubt, the definition of communication device 200 includes so-called "PDA".

Figure 2A:
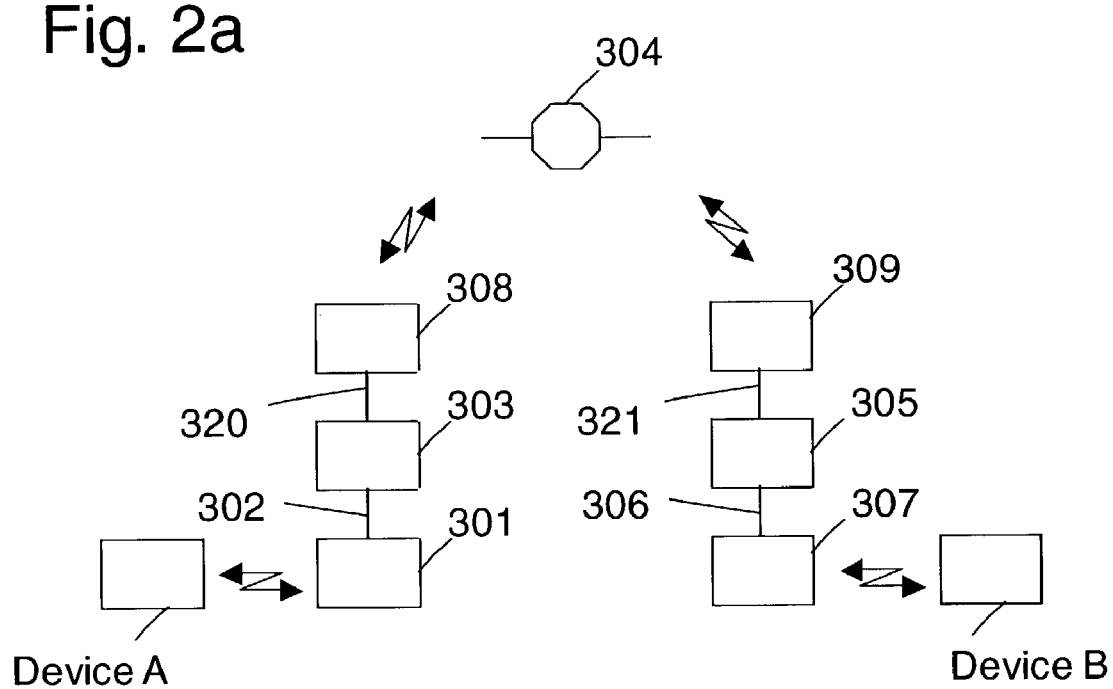
FIG. 2a is a simplified illustration illustrating an exemplary embodiment of the present invention.

FIG. 2a illustrates one of the preferred methods of the communication between two communication devices. In FIG. 2a, both device A and device B represents communication device 200 in FIG. 1. Device A transfers wireless data to transmitter 301 which relays the data to host H via cable 302. The data is transferred to transmitter 308 (e.g., a satellite dish) via cable 320 and then to artificial satellite 304. Artificial satellite 304 transfers the data to transmitter 309 which transfers the data to host H via cable 321. The data is then transferred to transmitter 307 via cable 306 and to device B in a wireless fashion. Device B transfers wireless data to device A in the same manner.

Figure 2B:
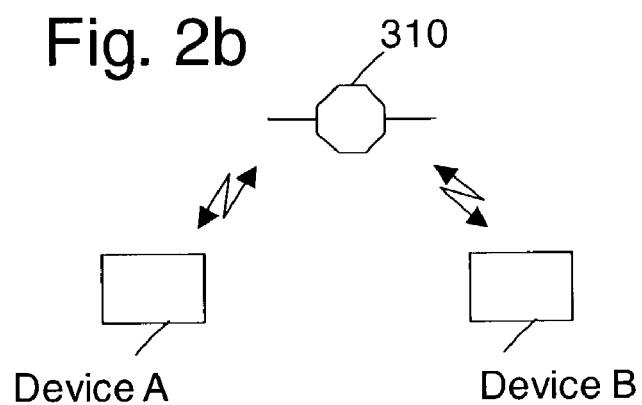
FIG. 2b is a simplified illustration illustrating an exemplary embodiment of the present invention.

FIG. 2b illustrates another preferred method of the communication between two communication devices. In this example, device A directly transfers the wireless data to host H, an artificial satellite, which transfers the data directly to device B. Device B transfers wireless data to device A in the same manner.

Figure 2C:
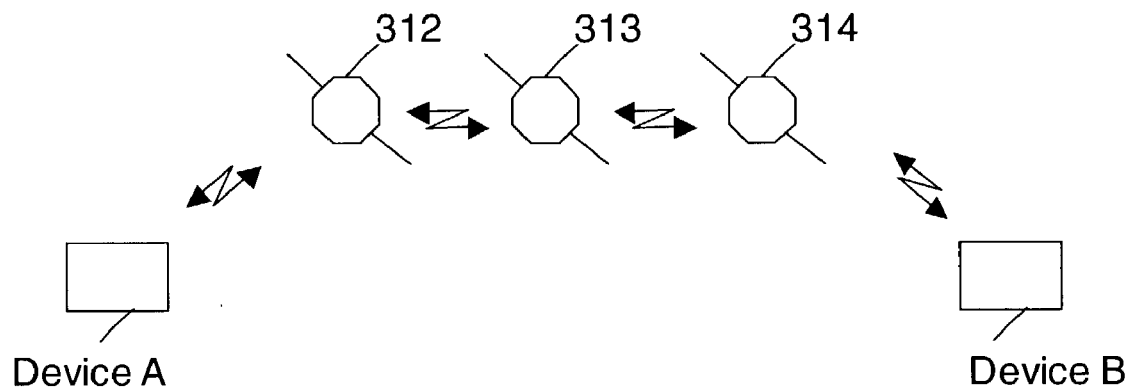
FIG. 2c is a simplified illustration illustrating an exemplary embodiment of the present invention.

FIG. 2c illustrates another preferred method of the communication between two communication devices. In this example, device A transfers wireless data to transmitter 312, an artificial satellite, which relays the data to host H, which is also an artificial satellite, in a wireless fashion. The data is transferred to transmitter 314, an artificial satellite, which relays the data to device B in a wireless fashion. Device B transfers wireless data to device A in the same manner.

<<Voice Recognition>>

Communication device 200 (FIG. 1) has a function to operate the device by the user's voice or convert the user's voice into a text format (i.e., the voice recognition). Such function can be enabled by the technologies primarily introduced in the following inventions and the references cited thereof: U.S. Pat. No. 6,282,268; U.S. Pat. No. 6,278,772; U.S. Pat. No. 6,269,335; U.S. Pat. No. 6,269,334; U.S. Pat. No. 6,260,015; U.S. Pat. No. 6,260,014; U.S. Pat. No. 6,253,177; U.S. Pat. No. 6,253,175; U.S. Pat. No. 6,249,763; U.S. Pat. No. 6,246,990; U.S. Pat. No. 6,233,560; U.S. Pat. No. 6,219,640; U.S. Pat. No. 6,219,407; U.S. Pat. No. 6,199,043; U.S. Pat. No. 6,199,041; U.S. Pat. No. 6,195,641; U.S. Pat. No. 6,192,343; U.S. Pat. No. 6,192,337; U.S. Pat. No. 6,188,976; U.S. Pat. No. 6,185,530; U.S. Pat. No. 6,185,529; U.S. Pat. No. 6,185,527; U.S. Pat. No. 6,182,037; U.S. Pat. No. 6,178,401; U.S. Pat. No. 6,175,820; U.S. Pat. No. 6,163,767; U.S. Pat. No. 6,157,910; U.S. Pat. No. 6,119,086; U.S. Pat. No. 6,119,085; U.S. Pat. No. 6,101,472; U.S. Pat. No. 6,100,882; U.S. Pat. No. 6,092,039; U.S. Pat. No. 6,088,669; U.S. Pat. No. 6,078,807; U.S. Pat. No. 6,075,534; U.S. Pat. No. 6,073,101; U.S. Pat. No. 6,073,096; U.S. Pat. No. 6,073,091; U.S. Pat. No. 6,067,517; U.S. Pat.

No. 6,067,514; U.S. Pat. No. 6,061,646; U.S. Pat. No. 6,044,344; U.S. Pat. No. 6,041,300; U.S. Pat. No. 6,035,271; U.S. Pat. No. 6,006,183; U.S. Pat. No. 5,995,934; U.S. Pat. No. 5,974,383; U.S. Pat. No. 5,970,239; U.S. Pat. No. 5,963,905; U.S. Pat. No. 5,956,671; U.S. Pat. No. 5,953,701; U.S. Pat. No. 5,953,700; U.S. Pat. No. 5,937,385; U.S. Pat. No. 5,937,383; U.S. Pat. No. 5,933,475; U.S. Pat. No. 5,930,749; U.S. Pat. No. 5,909,667; U.S. Pat. No. 5,899,973; U.S. Pat. No. 5,895,447; U.S. Pat. No. 5,884,263; U.S. Pat. No. 5,878,117; U.S. Pat. No. 5,864,819; U.S. Pat. No. 5,848,163; U.S. Pat. No. 5,819,225; U.S. Pat. No. 5,805,832; U.S. Pat. No. 5,802,251; U.S. Pat. No. 5,799,278; U.S. Pat. No. 5,797,122; U.S. Pat. No. 5,787,394; U.S. Pat. No. 5,768,603; U.S. Pat. No. 5,751,905; U.S. Pat. No. 5,729,656; U.S. Pat. No. 5,704,009; U.S. Pat. No. 5,671,328; U.S. Pat. No. 5,649,060; U.S. Pat. No. 5,615,299; U.S. Pat. No. 5,615,296; U.S. Pat. No. 5,544,277; U.S. Pat. No. 5,524,169; U.S. Pat. No. 5,522,011; U.S. Pat. No. 5,513,298; U.S. Pat. No. 5,502,791; U.S. Pat. No. 5,497,447; U.S. Pat. No. 5,477,451; U.S. Pat. No. 5,475,792; U.S. Pat. No. 5,465,317; U.S. Pat. No. 5,455,889; U.S. Pat. No. 5,440,663; U.S. Pat. No. 5,425,129; U.S. Pat. No. 5,353,377; U.S. Pat. No. 5,333,236; U.S. Pat. No. 5,313,531; U.S. Pat. No. 5,293,584; U.S. Pat. No. 5,293,451; U.S. Pat. No. 5,280,562; U.S. Pat. No. 5,278,942; U.S. Pat. No. 5,276,766; U.S. Pat. No. 5,267,345; U.S. Pat. No. 5,233,681; U.S. Pat. No. 5,222,146; U.S. Pat. No. 5,195,167; U.S. Pat. No. 5,182,773; U.S. Pat. No. 5,165,007; U.S. Pat. No. 5,129,001; U.S. Pat. No. 5,072,452; U.S. Pat. No. 5,067,166; U.S. Pat. No. 5,054,074; U.S. Pat. No. 5,050,215; U.S. Pat. No. 5,046,099; U.S. Pat. No. 5,033,087; U.S. Pat. No. 5,031,217; U.S. Pat. No. 5,018,201; U.S. Pat. No. 4,980,918; U.S. Pat. No. 4,977,599; U.S. Pat. No. 4,926,488; U.S. Pat. No. 4,914,704; U.S. Pat. No. 4,882,759; U.S. Pat. No. 4,876,720; U.S. Pat. No. 4,852,173; U.S. Pat. No. 4,833,712; U.S. Pat. No. 4,829,577; U.S. Pat. No. 4,827,521; U.S. Pat. No. 4,759,068; U.S. Pat. No. 4,748,670; U.S. Pat. No. 4,741,036; U.S. Pat. No. 4,718,094; U.S. Pat. No. 4,618,984; U.S. Pat. No. 4,348,553; U.S. Pat. No. 6,289,140; U.S. Pat. No. 6,275,803; U.S. Pat. No. 6,275,801; U.S. Pat. No. 6,272,146; U.S. Pat. No. 6,266,637; U.S. Pat. No. 6,266,571; U.S. Pat. No. 6,223,153; U.S. Pat. No. 6,219,638; U.S. Pat. No. 6,163,535; U.S. Pat. No. 6,115,820; U.S. Pat. No. 6,107,935; U.S. Pat. No. 6,092,034; U.S. Pat. No. 6,088,361; U.S. Pat. No. 6,073,103; U.S. Pat. No. 6,073,095; U.S. Pat. No. 6,067,084; U.S. Pat. No. 6,064,961; U.S. Pat. No. 6,055,306; U.S. Pat. No. 6,047,301; U.S. Pat. No. 6,023,678; U.S. Pat. No. 6,023,673; U.S. Pat. No. 6,009,392; U.S. Pat. No. 5,995,933; U.S. Pat. No. 5,995,931; U.S. Pat. No. 5,995,590; U.S. Pat. No. 5,991,723; U.S. Pat. No. 5,987,405; U.S. Pat. No. 5,974,382; U.S. Pat. No. 5,943,649; U.S. Pat. No. 5,916,302; U.S. Pat. No. 5,897,616; U.S. Pat. No. 5,897,614; U.S. Pat. No. 5,893,133; U.S. Pat. No. 5,873,064; U.S. Pat. No. 5,870,616; U.S. Pat. No. 5,864,805; U.S. Pat. No. 5,857,099; U.S. Pat. No. 5,809,471; U.S. Pat. No. 5,805,907; U.S. Pat. No. 5,799,273; U.S. Pat. No. 5,764,852; U.S. Pat. No. 5,715,469; U.S. Pat. No. 5,682,501; U.S. Pat. No. 5,680,509; U.S. Pat. No. 5,668,854; U.S. Pat. No. 5,664,097; U.S. Pat. No. 5,649,070; U.S. Pat. No. 5,640,487; U.S. Pat. No. 5,621,809; U.S. Pat. No. 5,577,249; U.S. Pat. No. 5,502,774; U.S. Pat. No. 5,471,521; U.S. Pat. No. 5,467,425; U.S. Pat. No. 5,444,617; U.S. Pat. No. 4,991,217; U.S. Pat. No. 4,817,158; U.S. Pat. No. 4,725,885; U.S. Pat. No. 4,528,659; U.S. Pat. No. 3,995,254; U.S. Pat. No. 3,969,700; U.S. Pat. No. 3,925,761; U.S. Pat. No. 3,770,892. The voice recognition function can be performed in terms of software by using area 261, the voice recognition working area, of RAM 206 (FIG. 1) which is specifically allocated to perform such function as described in FIG. 3, or can also be performed in terms of hardware circuit where such space is specifically allocated in area 282 of sound processor 205 (FIG. 1) for the voice recognition system as described in FIG. 4.

Figure 3:
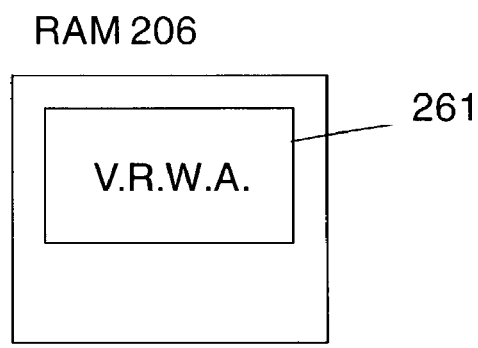
FIG. 3 is a block diagram illustrating an exemplary embodiment of the present invention.
Figure 4:
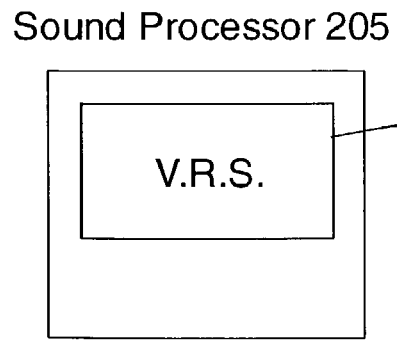
FIG. 4 is a block diagram illustrating an exemplary embodiment of the present invention.

FIG. 5 illustrates how the voice recognition function is activated. CPU 211 (FIG. 1) periodically checks the input status of input device 210 (FIG. 1) (S1). If the CPU 211 detects a specific signal input from input device 210 (S2) the voice recognition system which is described in FIG. 2 and/or FIG. 3 is activated. As another embodiment, the voice recognition system can also be activated by entering predetermined phrase, such as "start voice recognition system" via microphone 215 (FIG. 1).

<<Voice Recognition—Dialing/Auto-Off During Call>>

Figure 6A:
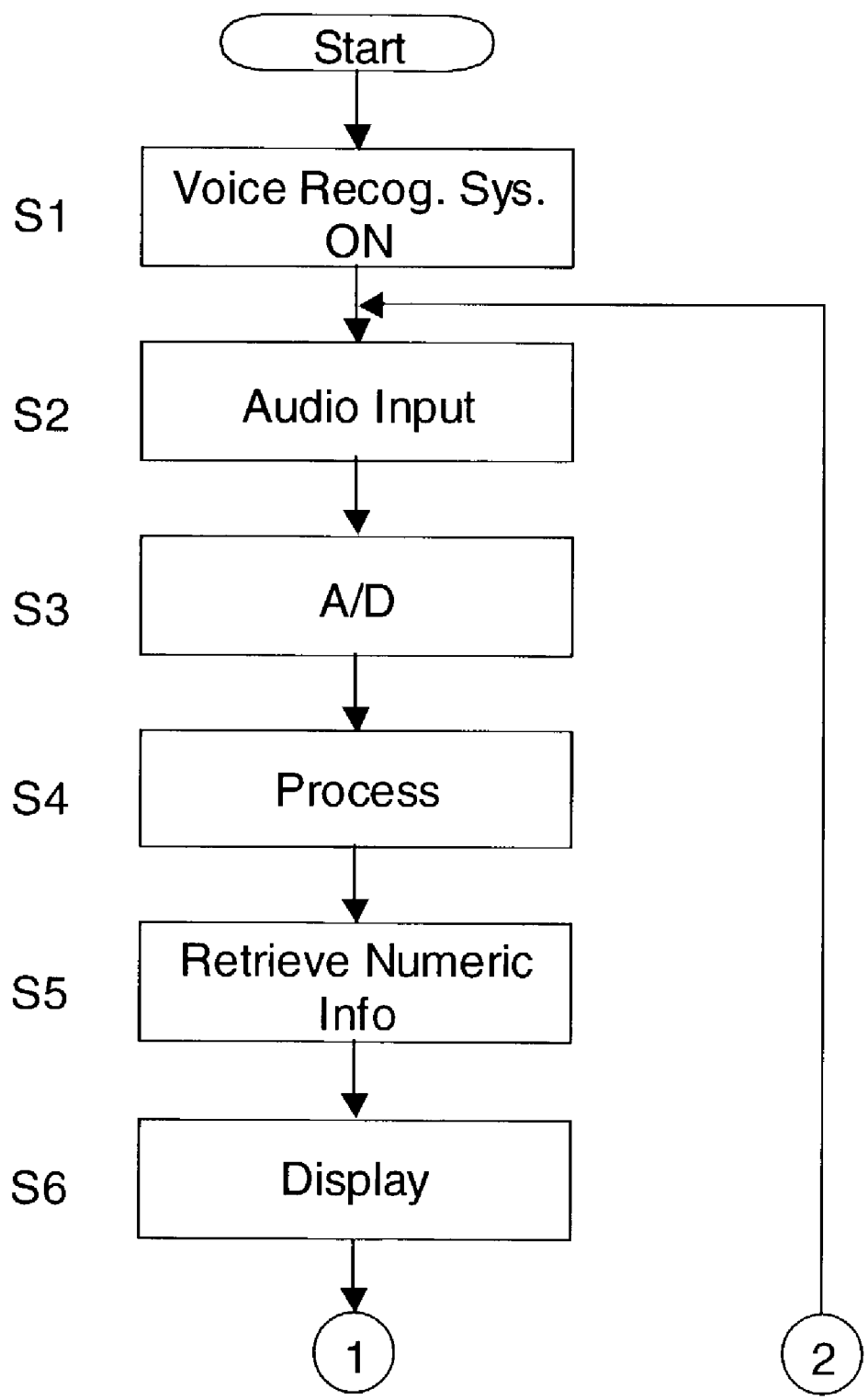
FIG. 6a is a flowchart illustrating an exemplary embodiment of the present invention.
Figure 6B:
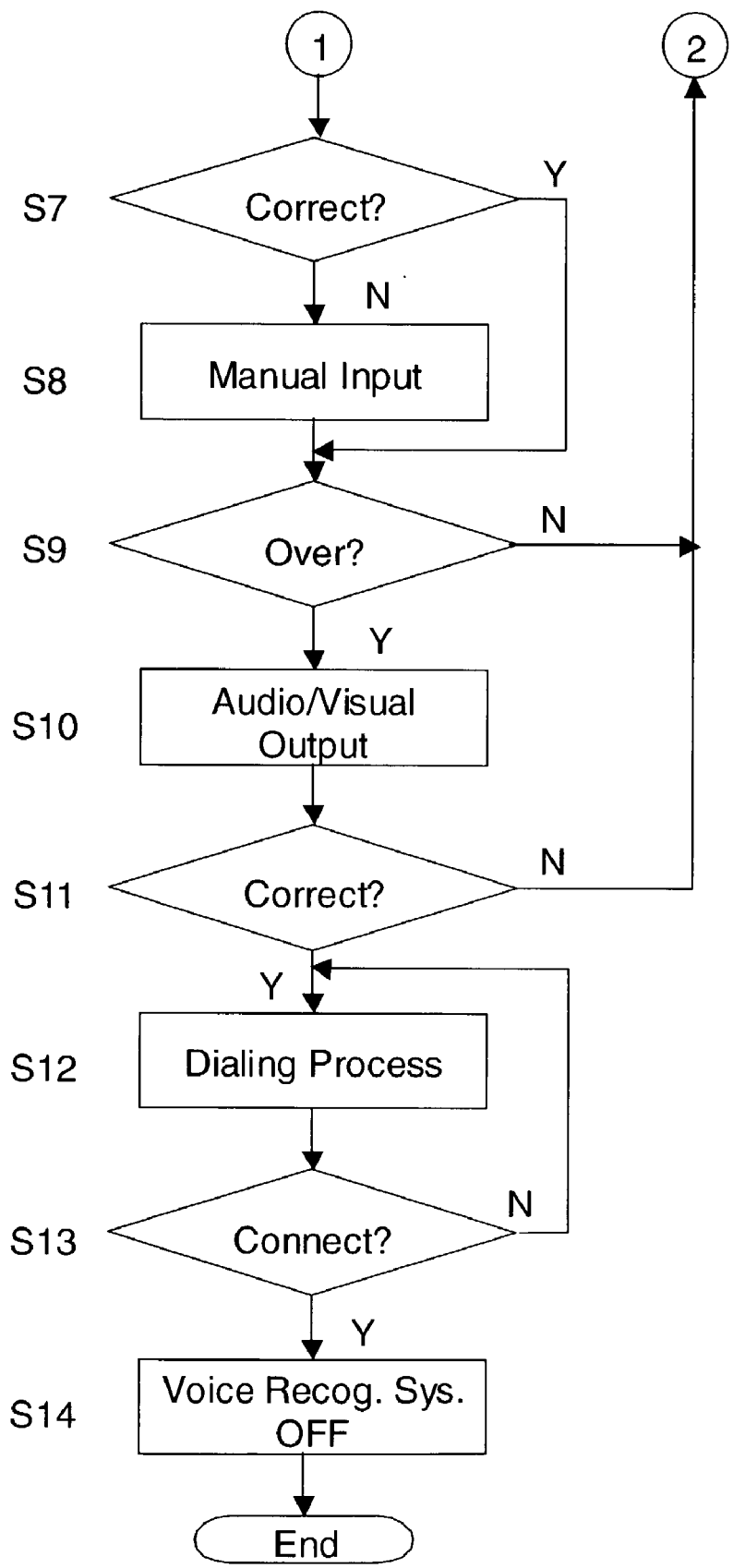
FIG. 6b is a flowchart illustrating an exemplary embodiment of the present invention.

FIG. 6a and FIG. 6b illustrate the operation of the voice recognition in the present invention. Once the voice recognition system is activated (S1) the analog audio data is input from microphone 215 (FIG. 1) (S2). The analog audio data is converted into digital data by A/D 213 (FIG. 1) (S3). The digital audio data is processed by sound processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using input device 210 (FIG. 1) (S8). Once the sequence of inputting the numeric information is completed and after the confirmation process is over (S9), the entire numeric information is displayed on LCD 201 and the sound is output from speaker 216 under control of CPU 211 (S10). If the numeric information is correct (S11), communication device 200 (FIG. 1) initiates the dialing process by utilizing the numeric information (S12). The dialing process continues until communication device 200 is connected to another device (S13). Once CPU 211 detects that the line is connected it automatically deactivates the voice recognition system (S14).

Figure 7:
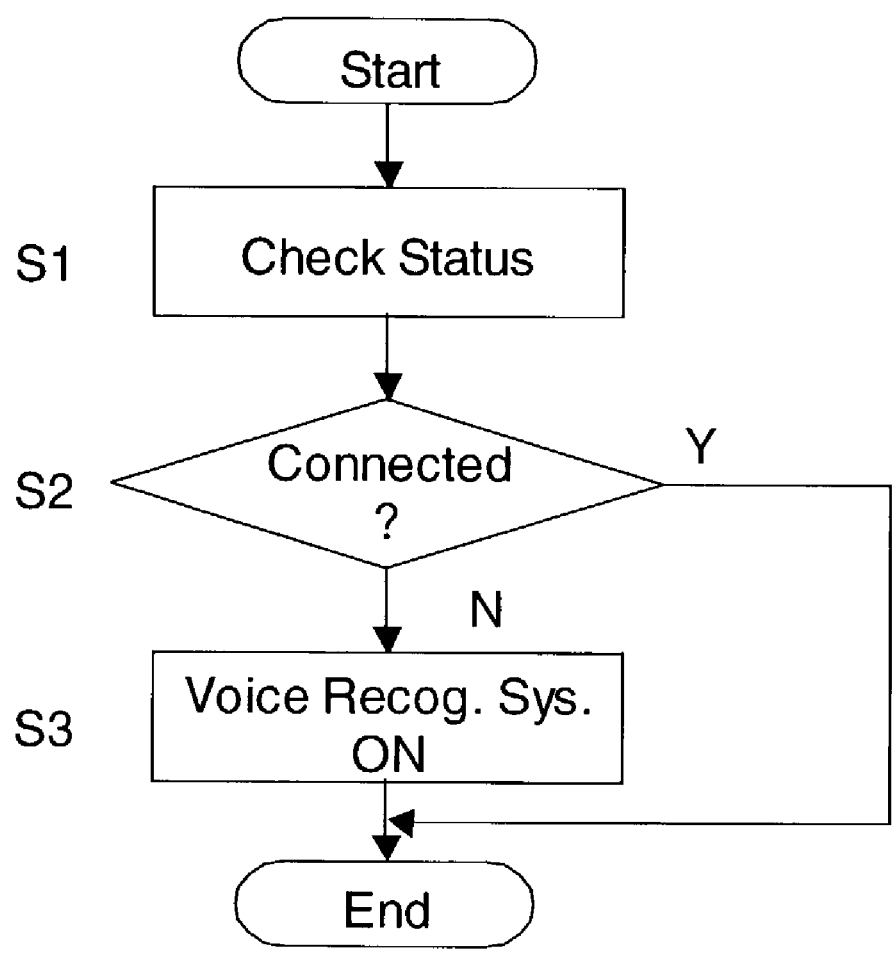
FIG. 7 is a flowchart illustrating an exemplary embodiment of the present invention.

As described in FIG. 7, CPU 211 (FIG. 1) checks the status of communication device 200 periodically (S1) and remains the voice recognition system offline during call (S2). If the connection is severed, i.e., user hangs up, then CPU 211 reactivates the voice recognition system (S3).

<<Voice Recognition—Tag>>

FIGS. 8 through 12 describes the method of inputting the numeric information in a convenient manner.

Figure 11:
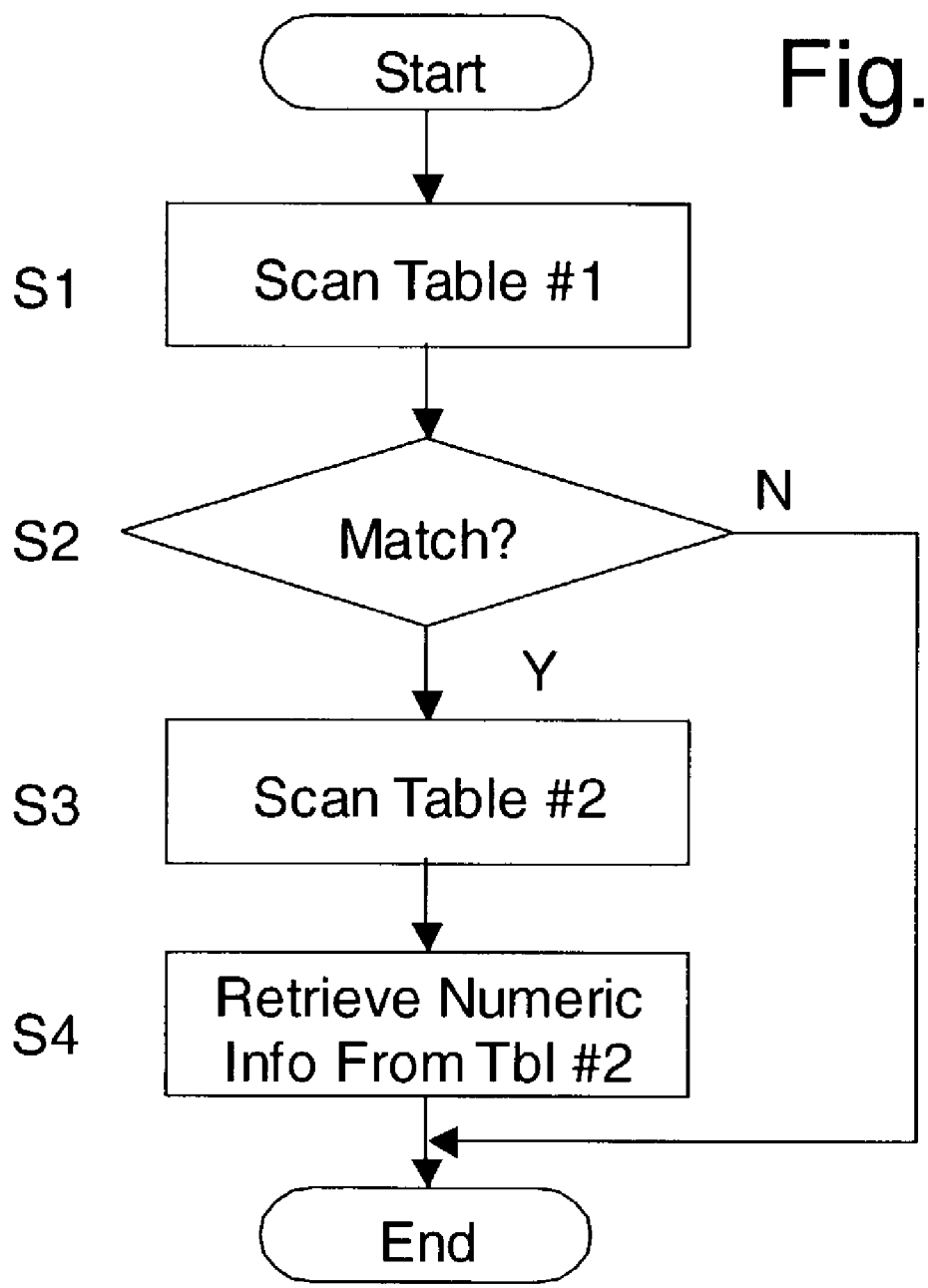
FIG. 11 is a flowchart illustrating an exemplary embodiment of the present invention.

As described in FIG. 8, RAM 206 includes Table #1 (FIG. 8) and Table #2 (FIG. 9). In FIG. 8, audio information #1 corresponds to tag "Scott." Namely audio information, such as wave data, which represents the sound of "Scott" (sounds like "S-ko-t") is registered in Table #1, which corresponds to tag "Scott". In the same manner audio information #2 corresponds to tag "Carol"; audio information #3 corresponds to tag "Peter"; audio information #4 corresponds to tag "Amy"; and audio information #5 corresponds to tag "Brian." In FIG. 9, tag "Scott" corresponds to numeric information "(916) 411-2526"; tag "Carol" corresponds to numeric information "(418) 675-6566"; tag "Peter" corresponds to numeric information "(220) 890-1567"; tag "Amy" corresponds to numeric information "(615) 125-3411"; and tag "Brian" corresponds to numeric information "(042) 645-2097." FIG. 11 illustrates how CPU 211 (FIG. 1) operates by utilizing both Table #1 and Table #2. Once the audio data is processed as described in S4 of FIG. 6, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Figure 12:
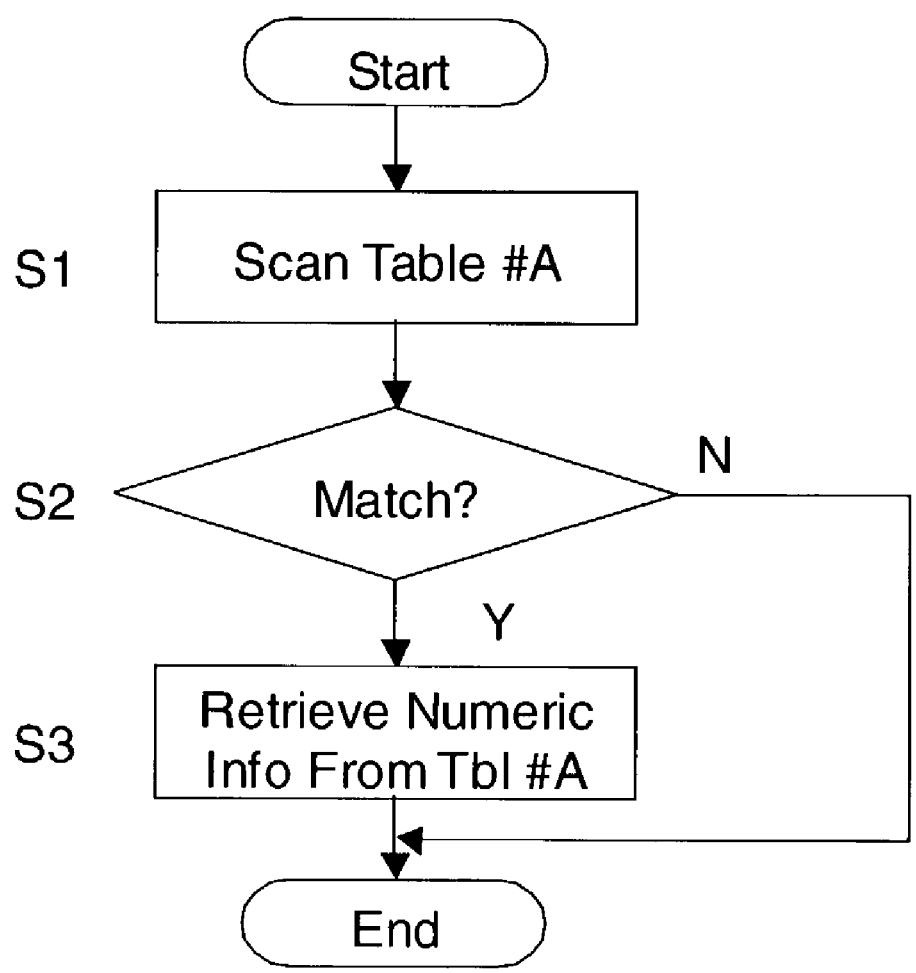
FIG. 12 is a flowchart illustrating an exemplary embodiment of the present invention.

FIG. 10 illustrates another embodiment of the present invention. Here, RAM 206 includes Table #A instead of Table #1 and Table #2 described above. In this embodiment, audio info #1 (i.e., wave data which represents the sound of "Scot") directly corresponds to numeric information "(916) 411-2526." In the same manner audio info #2 corresponds to numeric information "(410) 675-6566"; audio info #3 corresponds to numeric information "(220) 890-1567"; audio info #4 corresponds to numeric information "(615) 125-3411"; and audio info #5 corresponds to numeric information "(042)645-2097." FIG. 12 illustrates how CPU 211 (FIG. 1) operates by utilizing Table #A. Once the audio data is processed as described in S4 of FIG. 6, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in FIGS. 3 through 7. Namely, once the audio data is processed by CPU 211 (FIG. 1) as described in S4 of FIG. 6 and retrieves the text data therefrom and detects one of the tags registered in Table #2 (e.g., "Scot"), CPU 211 retrieves the corresponding numeric information (e.g., "(916) 411-2526") from the same table.

<<Voice Recognition—Background Noise Filter>>

Figure 13:
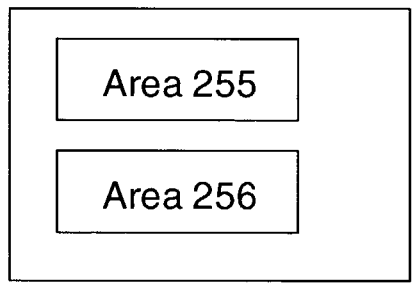
FIG. 13 is a block diagram illustrating an exemplary embodiment of the present invention.
Figure 14:
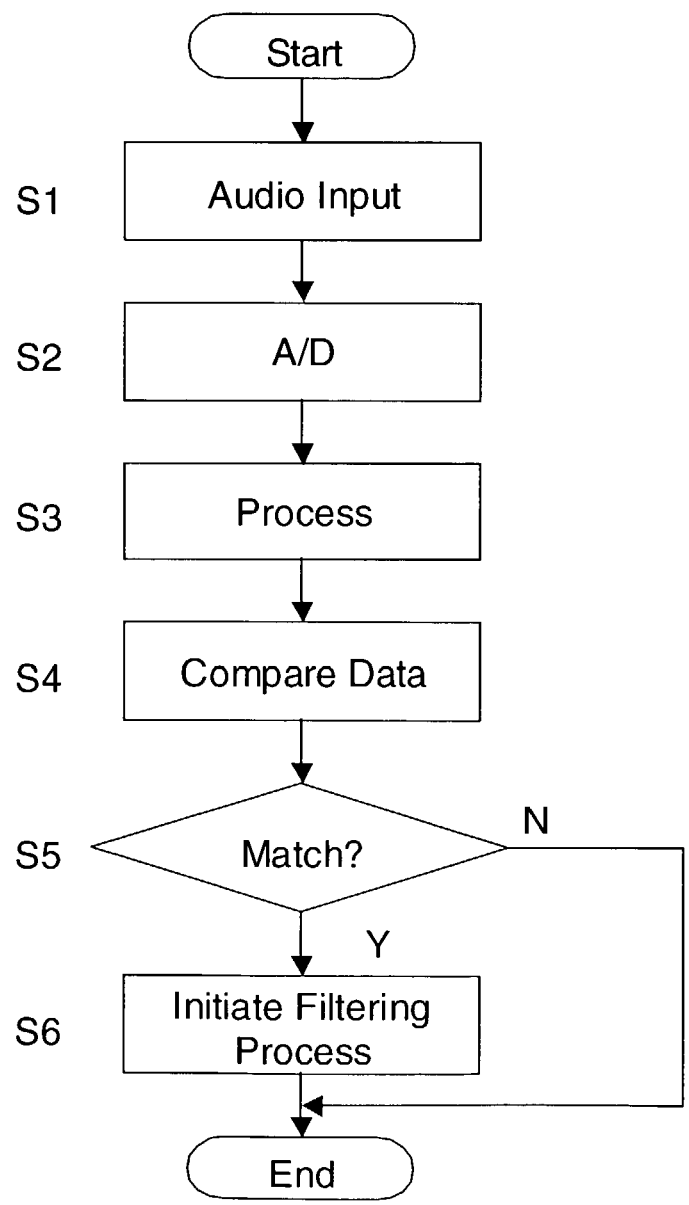
FIG. 14 is a flowchart illustrating an exemplary embodiment of the present invention.
Figure 15:
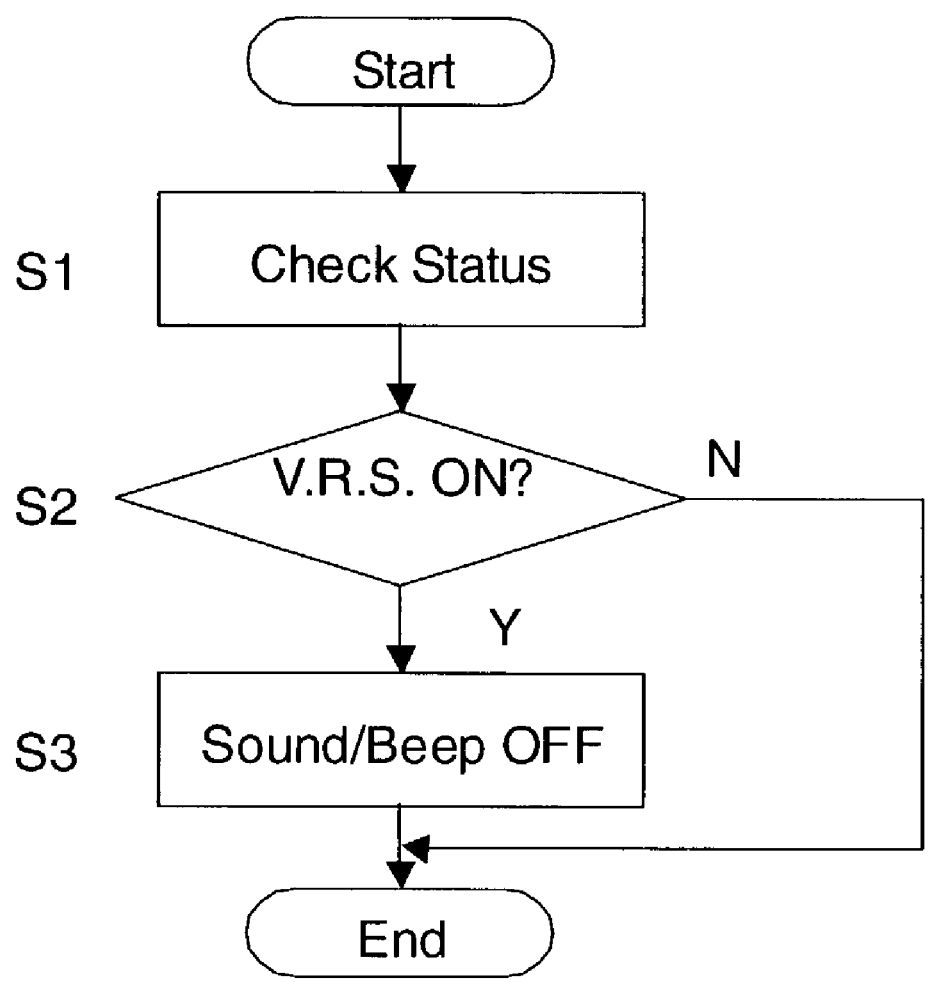
FIG. 15 is a flowchart illustrating an exemplary embodiment of the present invention.

FIGS. 13 through 15 describes the method of minimizing the undesired effect of the background noise when utilizing the voice recognition system.

As described in FIG. 13, RAM 206 (FIG. 1) includes area 255 and area 256. Sound audio data which represents background noise is stored in area 255, and sound audio data which represents the beep, ringing sound and other sounds which are emitted from the communication device 200 are stored in area 256.

FIG. 14 describes the method to utilize the data stored in area 255 and area 256 described in FIG. 13. When the voice recognition system is activated as described in FIG. 5, the analog audio data is input from microphone 215 (FIG. 1) (S1). The analog audio data is converted into digital data by A/D 213 (FIG. 1) (S2). The digital audio data is processed by sound processor 205 (FIG. 1) (S3) and compared to the data stored in area 255 and area 256 (S4). Such comparison can be done by either sound processor 205 or CPU 211 (FIG. 1). If the digital audio data matches to the data stored in area 255 and/or area 256, the filtering process is initiated and the matched portion of the digital audio data is deleted as background noise. Such sequence of process is done before retrieving text and numeric information from the digital audio data.

Figure 14A:
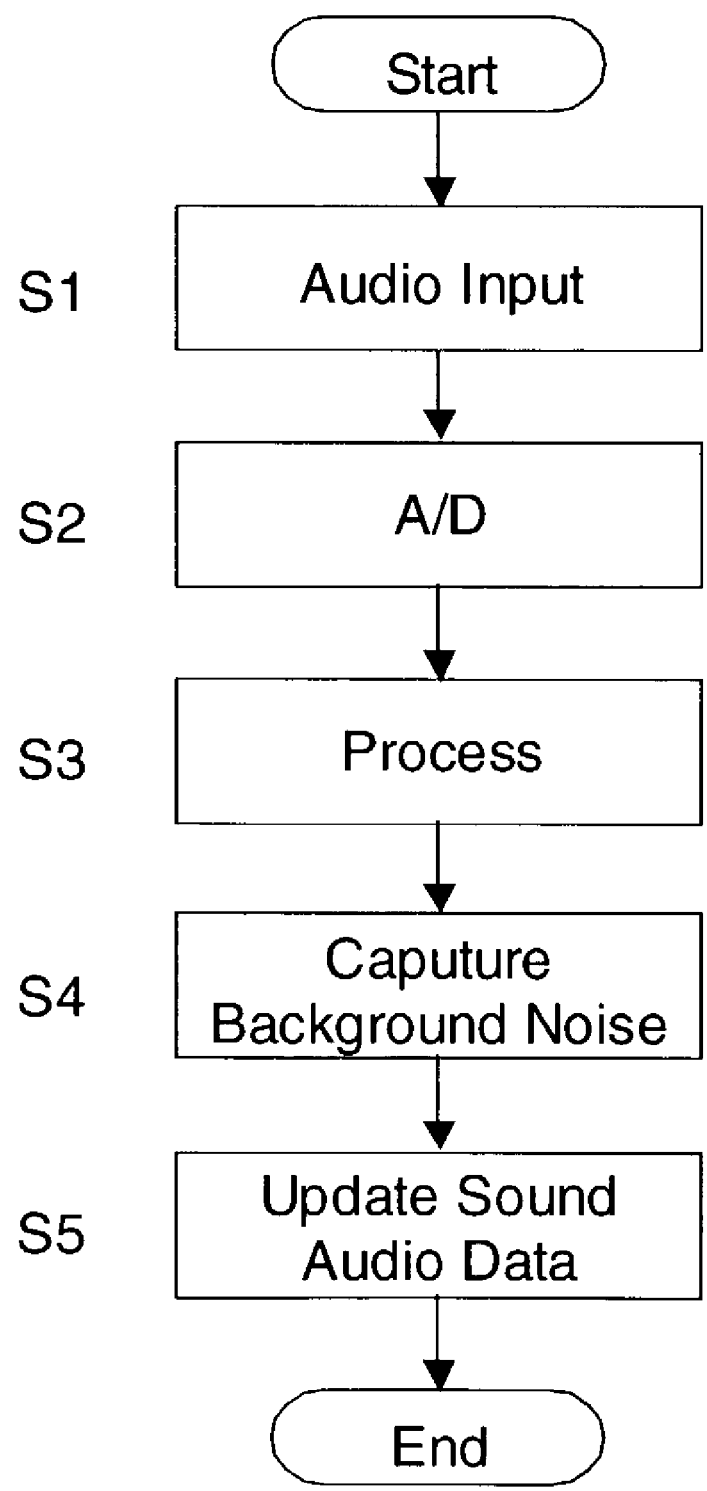
FIG. 14a is a flowchart illustrating an exemplary embodiment of the present invention.

FIG. 14a describes the method of updating area 255. When the voice recognition system is activated as described in FIG. 5, the analog audio data is input from microphone 215 (FIG. 1) (S1). The analog audio data is converted into digital data by A/D 213 (FIG. 1) (S2). The digital audio data is processed by sound processor 205 (FIG. 1) or CPU 211 (FIG. 1) (S3) and the background noise is captured (S4). CPU 211 (FIG. 1) scans area 255 and if the captured background noise is not registered in area 255, it updates the sound audio data stored therein (S5).

FIG. 15 describes another embodiment of the present invention. CPU 211 (FIG. 1) routinely checks whether the voice recognition system is activated (S1). If the system is activated (S2), the beep, ringing sound, and other sounds which are emitted from communication device 200 are automatically turned off in order to minimize the miss recognition process of the voice recognition system (S3).

<<Voice Recognition—Automatic Turn-Off>>

Figure 16:
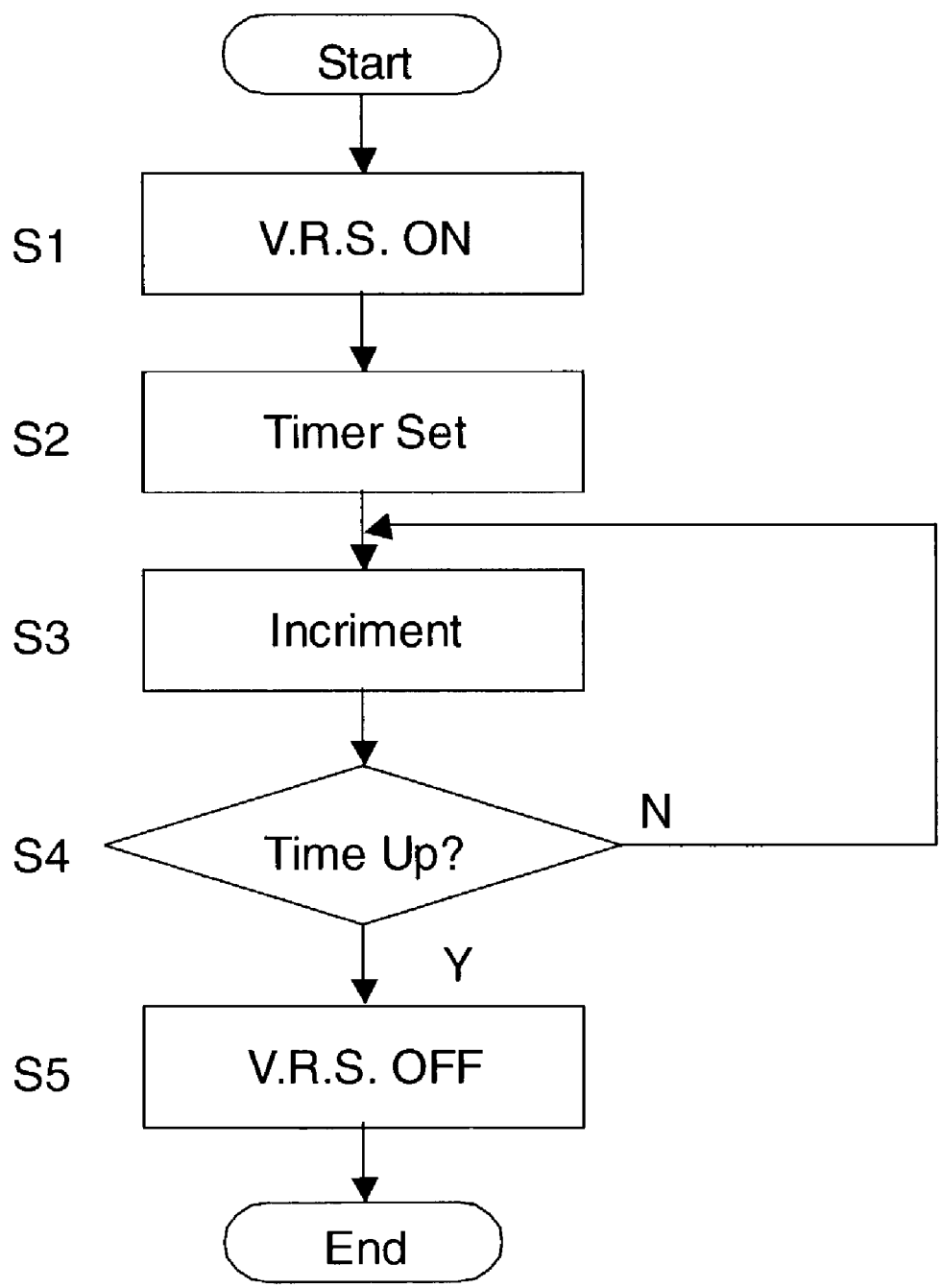
FIG. 16 is a flowchart illustrating an exemplary embodiment of the present invention.

The voice recognition system can be automatically turned off to avoid glitch as described in FIG. 16. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition—E-Mail (1)>>

Figure 17A:
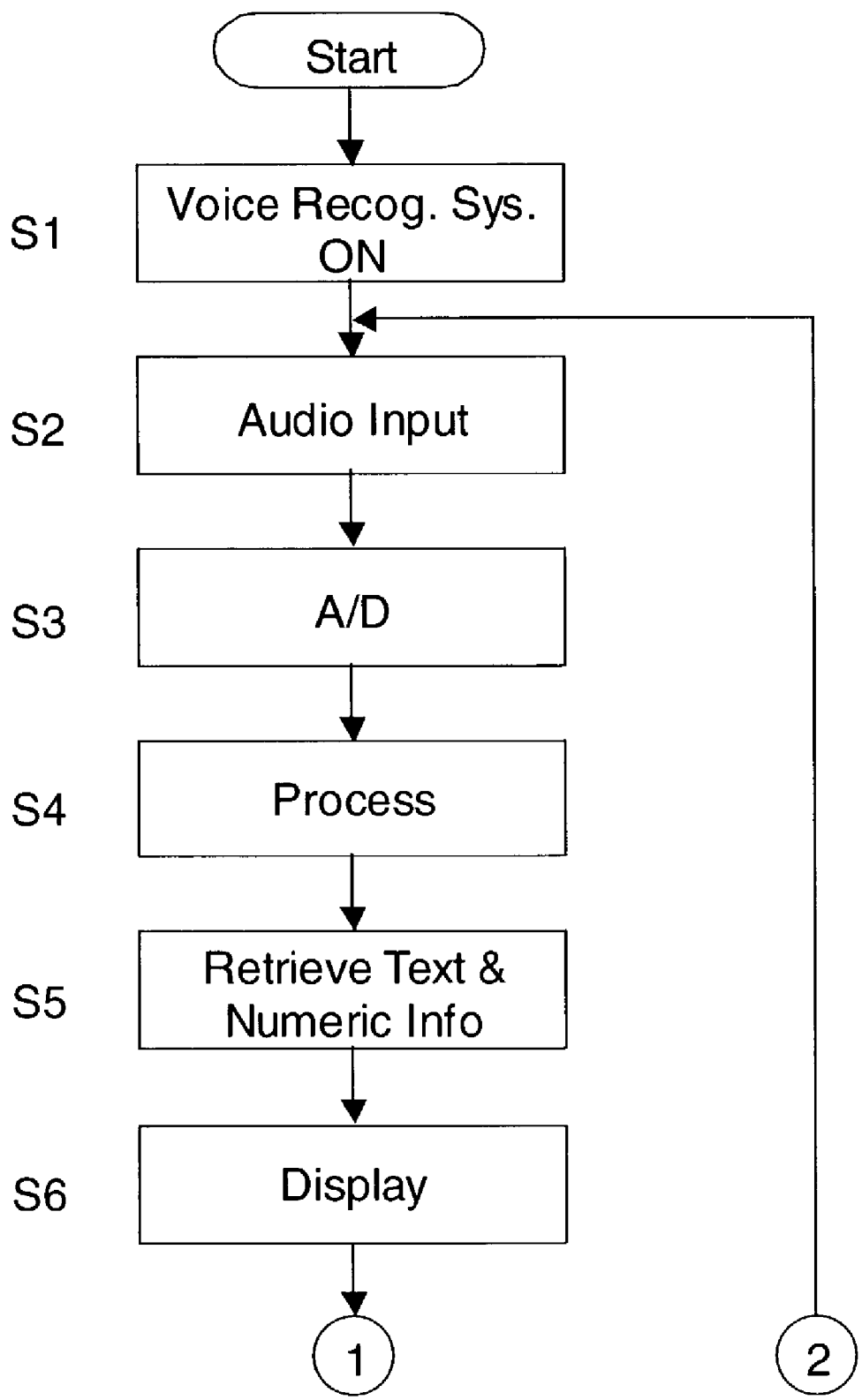
FIG. 17a is a flowchart illustrating an exemplary embodiment of the present invention.
Figure 17B:
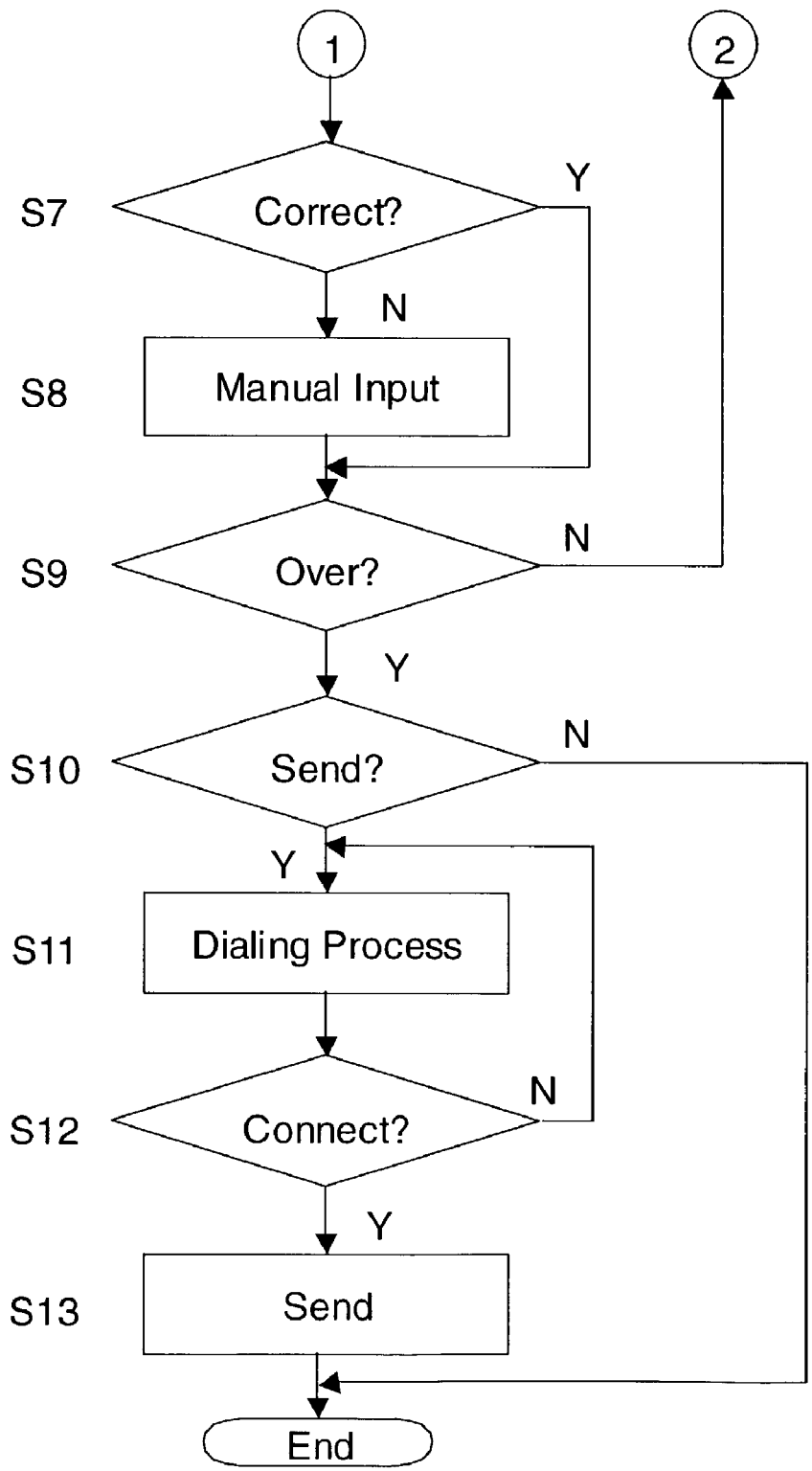
FIG. 17b is a flowchart illustrating an exemplary embodiment of the present invention.

FIGS. 17a and 17b illustrate the first embodiment of typing and sending e-mails by utilizing the voice recognition system. Once the voice recognition system is activated (S1), the analog audio data is input from microphone 215 (FIG. 1) (S2). The analog audio data is converted into digital data by A/D 213 (FIG. 1) (S3). The digital audio data is processed by sound processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the input device 210 (FIG. 1) (S8). If inputting the text and numeric information is completed (S9) and CPU 211 detects input signal from input device 210 to send the e-mail (S10), the dialing process is initiated (S11). The dialing process is repeated until communication device 200 is connected to host H (S12), and the e-mail is sent to the designated address (S13).

<<Voice Recognition—Speech-to-Text>>

Figure 18:
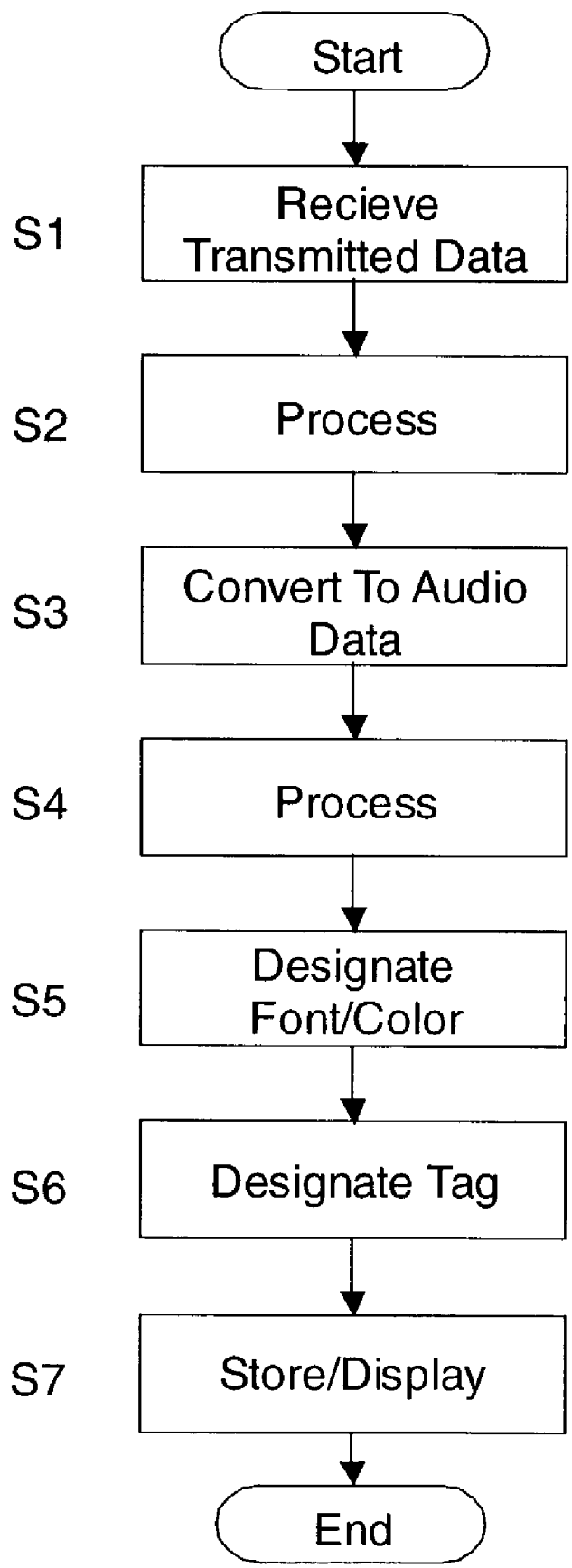
FIG. 18 is a flowchart illustrating an exemplary embodiment of the present invention.

FIG. 18 illustrates the speech-to-text function of communication device 200 (FIG. 1).

Once communication device 200 receives a transmitted data from another device via antenna 218 (FIG. 1) (S1), signal processor 208 (FIG. 1) processes the data (e.g., wireless signal error check and decompression) (S2), and the transmitted data is converted into digital audio data (S3). Such conversion can be rendered by either CPU 211 (FIG. 1) or signal processor 208. The digital audio data is transferred to sound processor 205 (FIG. 1) via data bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Figure 19:
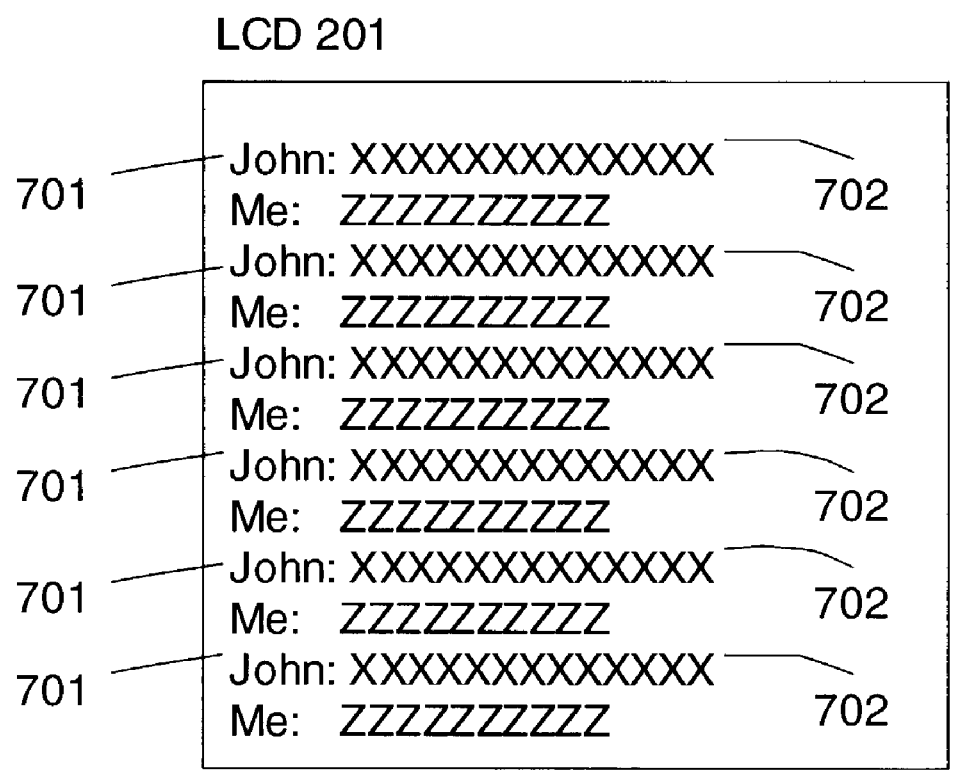
FIG. 19 is a simplified illustration illustrating an exemplary embodiment of the present invention.

FIG. 19 illustrates how the text and numeric information as well as the tag are displayed. On LCD 201 the text and numeric information 702 ("XXXXXXXXX") are displayed with the predetermined font and color as well as with the tag 701 ("John").

<<Voice Recognition—Summary>>

The foregoing inventions may be summarized as the following.

(1) A communication device which has a function to retrieve text and numeric information from a user's voice input from a microphone wherein said function is deactivated when said communication device is connected to another device in order to avoid undesired operation of said communication device.

(2) A communication device which has a function to retrieve text and numeric information from a user's voice input from a microphone wherein said communication device retrieves a numeric information from said user's voice and initiates a dialing process by utilizing said numeric information thereby enabling said user to initiate said dialing process only by his/her voice and/or by without physically contacting said communication device.

(3) A communication device which has a function to retrieve text and numeric information from a user's voice input from a microphone wherein said communication device retrieves audio information from which numeric information can not be retrieved from said user's voice and retrieves predetermined corresponding numeric information therefrom thereby enabling said user to initiate a dialing process in a convenient manner and without memorizing said numeric information or without referring to other sources for said information.

(4) A communication device which has a function to retrieve text and numeric information from a user's voice input from a microphone wherein said communication device compares audio information retrieved from said user's voice with pre-stored audio data and erases said audio data from said audio information before retrieving text and numeric information therefrom thereby enabling said function to be more accurate and minimizing error in retrieving said text and numeric information.

(5) A communication device which has a function to retrieve text and numeric information from a user's voice input from a microphone wherein said communication device retrieves text and numeric information from data transmitted from another device and displays said text and numeric information with predetermined font and color thereby enabling the user to visually confirm the content of conversation by way of observing the said text and numeric information displayed.

(6) A wireless communication device comprising a microphone, a display, an input device, an antenna, an alphanumeric data modification means and, a voice recognition system, wherein when said voice recognition system is activated and said wireless communication is in an email producing mode to produce an email, a series of audio data is input from said microphone and said voice recognition system converts said series of audio data into a first series of alphanumeric data which are displayed on said display, said first series of alphanumeric data are modified by said alphanumeric data modification means to a second series of alphanumeric data when said second series of alphanumeric data are input from said input device, said email including said second series of alphanumeric data is transmitted in a wireless manner from said antenna.

<<Positioning System>>

Figure 20A:
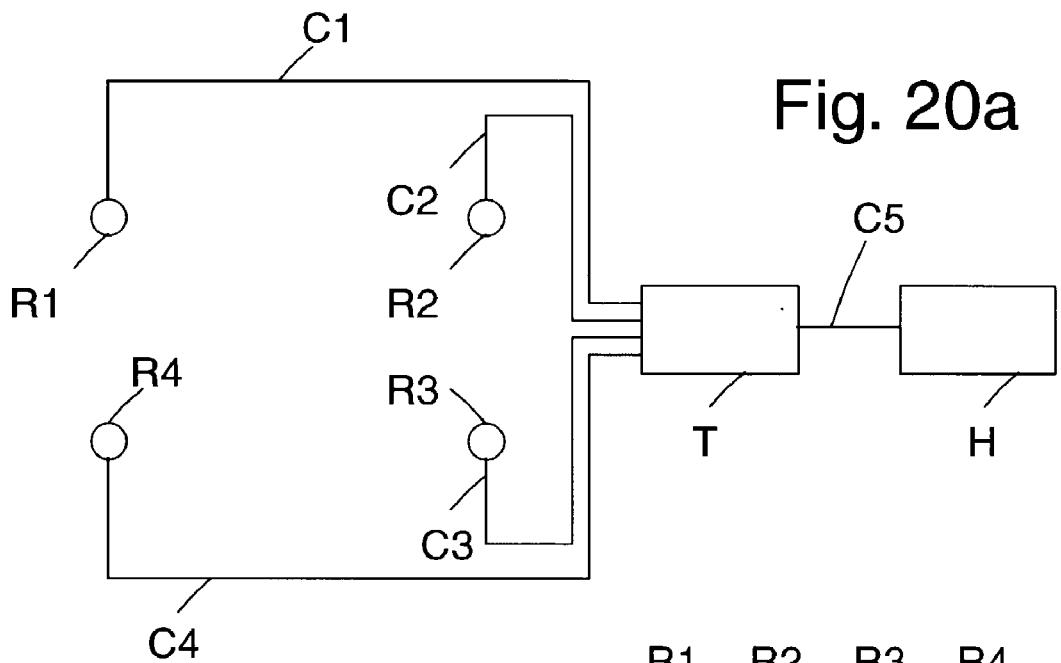
FIG. 20a is a simplified illustration illustrating an exemplary embodiment of the present invention.

FIG. 20a illustrates the simplified block diagram to detect the position of communication device 200 (FIG. 1).

Figure 20B:
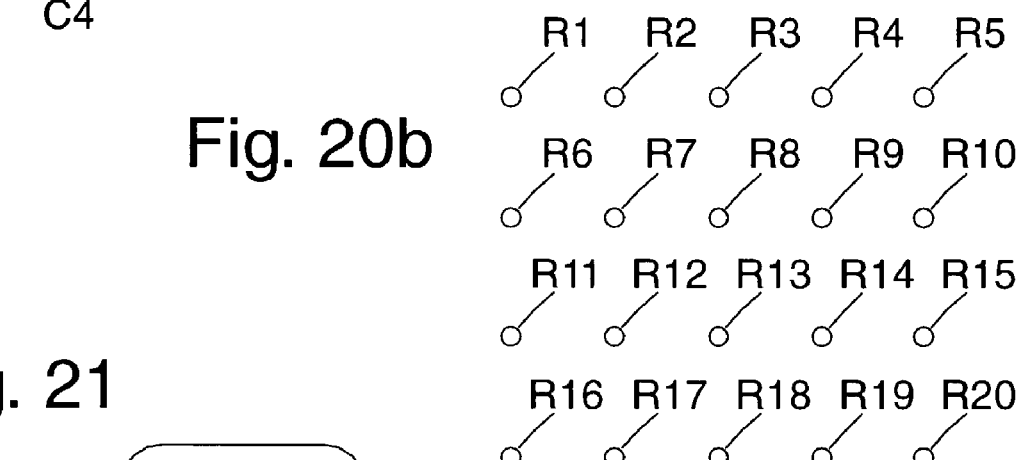
FIG. 20b is a simplified illustration illustrating an exemplary embodiment of the present invention.

In FIG. 20a, relay R1 is connected to cable C1, relay R2 is connected to cable C2, relay R3 is connected to cable C3, and relay R4 is connected to cable C4. Cables C1, C2, C3, and C4 are connected to transmitter T, which is connected to host H by cable C5. The relays (R 1–R 20) are located throughout the predetermined area in the pattern illustrated in FIG. 20b. The system illustrated in FIG. 20a and FIG. 20b is designed to pin-point the position of communication device 200 by using the method so-called "global positioning system" or "GPS." Such function can be enabled by the technologies primarily introduced in the following inventions and the references cited thereof: U.S. Pat. No. 6,429,814; U.S. Pat. No. 6,427,121; U.S. Pat. No. 6,427,120; U.S. Pat. No. 6,424,826; U.S. Pat. No. 6,415,227; U.S. Pat. No. 6,415,154; U.S. Pat. No. 6,411,811; U.S. Pat. No. 6,392,591; U.S. Pat. No. 6,389,291; U.S. Pat. No. 6,369,751; U.S. Pat. No. 6,347,113; U.S. Pat. No. 6,324,473; U.S. Pat. No. 6,301,545; U.S. Pat. No. 6,297,770; U.S. Pat. No. 6,278,404; U.S. Pat. No. 6,275,771; U.S. Pat. No. 6,272,349; U.S. Pat. No. 6,266,012; U.S. Pat. No. 6,259,401; U.S. Pat. No. 6,243,647; U.S. Pat. No. 6,236,354; U.S. Pat. No. 6,233,094; U.S. Pat. No. 6,232,922; U.S. Pat. No. 6,211,822; U.S. Pat. No. 6,188,351; U.S. Pat. No. 6,182,927; U.S. Pat. No. 6,163,567; U.S. Pat. No. 6,101,430; U.S. Pat. No. 6,084,542; U.S. Pat. No. 5,971,552; U.S. Pat. No. 5,963,167; U.S. Pat. No. 5,944,770; U.S. Pat. No. 5,890,091; U.S. Pat. No. 5,841,399; U.S. Pat. No. 5,808,582; U.S. Pat. No. 5,777,578; U.S. Pat. No. 5,774,831; U.S. Pat. No. 5,764,184; U.S. Pat. No. 5,757,786; U.S. Pat. No. 5,736,961; U.S. Pat. No. 5,736,960; U.S. Pat. No. 5,594,454; U.S. Pat. No. 5,585,800; U.S. Pat. No. 5,554,994; U.S. Pat. No. 5,535,278; U.S. Pat. No. 5,534,875; U.S. Pat. No. 5,519,620; U.S. Pat. No. 5,506,588; U.S. Pat. No. 5,446,465; U.S. Pat. No. 5,434,574; U.S. Pat. No. 5,402,441; U.S. Pat. No. 5,373,531; U.S. Pat. No. 5,349,531; U.S. Pat. No. 5,347,286; U.S. Pat. No. 5,341,301; U.S. Pat. No. 5,339,246; U.S. Pat. No. 5,293,170; U.S. Pat. No. 5,225,842; U.S. Pat. No. 5,223,843; U.S. Pat. No. 5,210,540; U.S. Pat. No. 5,193,064; U.S. Pat. No. 5,187,485; U.S. Pat. No. 5,175,557; U.S. Pat. No. 5,148,452; U.S. Pat. No. 5,134,407; U.S. Pat. No. 4,928,107; U.S. Pat. No. 4,928,106; U.S. Pat. No. 4,785,463; U.S. Pat. No. 4,754,465; U.S. Pat. No. 4,622,557; and U.S. Pat. No. 4,457,006. The relays R1–R20 are preferably located on ground, however, are also permitted to be installed in artificial satellites as described in the foregoing patents and the references cited thereof in order to cover wider geographical range. In addition, host H may be carried by an artificial satellite and utilize the formation as described in FIGS. 2a, 2b, and 2c.

FIGS. 21 through 26 illustrate how the positioning system is performed. Assuming that device A, communication device 200, seeks to detect the position of device B, another communication device 200, which is located somewhere in the matrix of relays illustrated in FIG. 20b.

Figure 21:
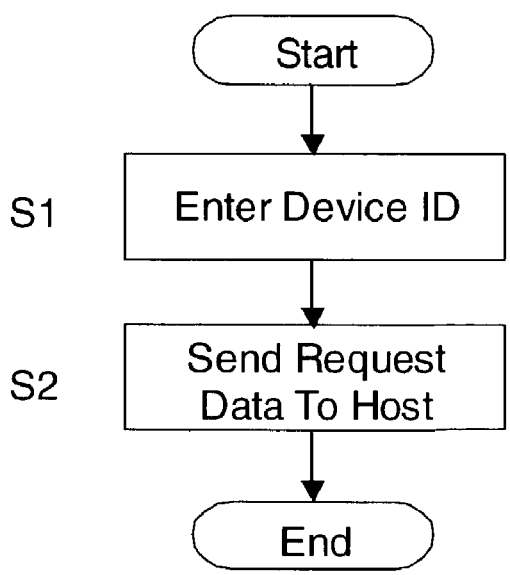
FIG. 21 is a flowchart illustrating an exemplary embodiment of the present invention.

As described in FIG. 21, first of all the device ID of device B is entered by utilizing input device 210 (FIG. 1) or the voice recognition system of device A installed therein (S1). The device ID may be its corresponding phone number. A request data including the device ID is sent to host H (FIG. 20a) from device A (S2).

Figure 22:
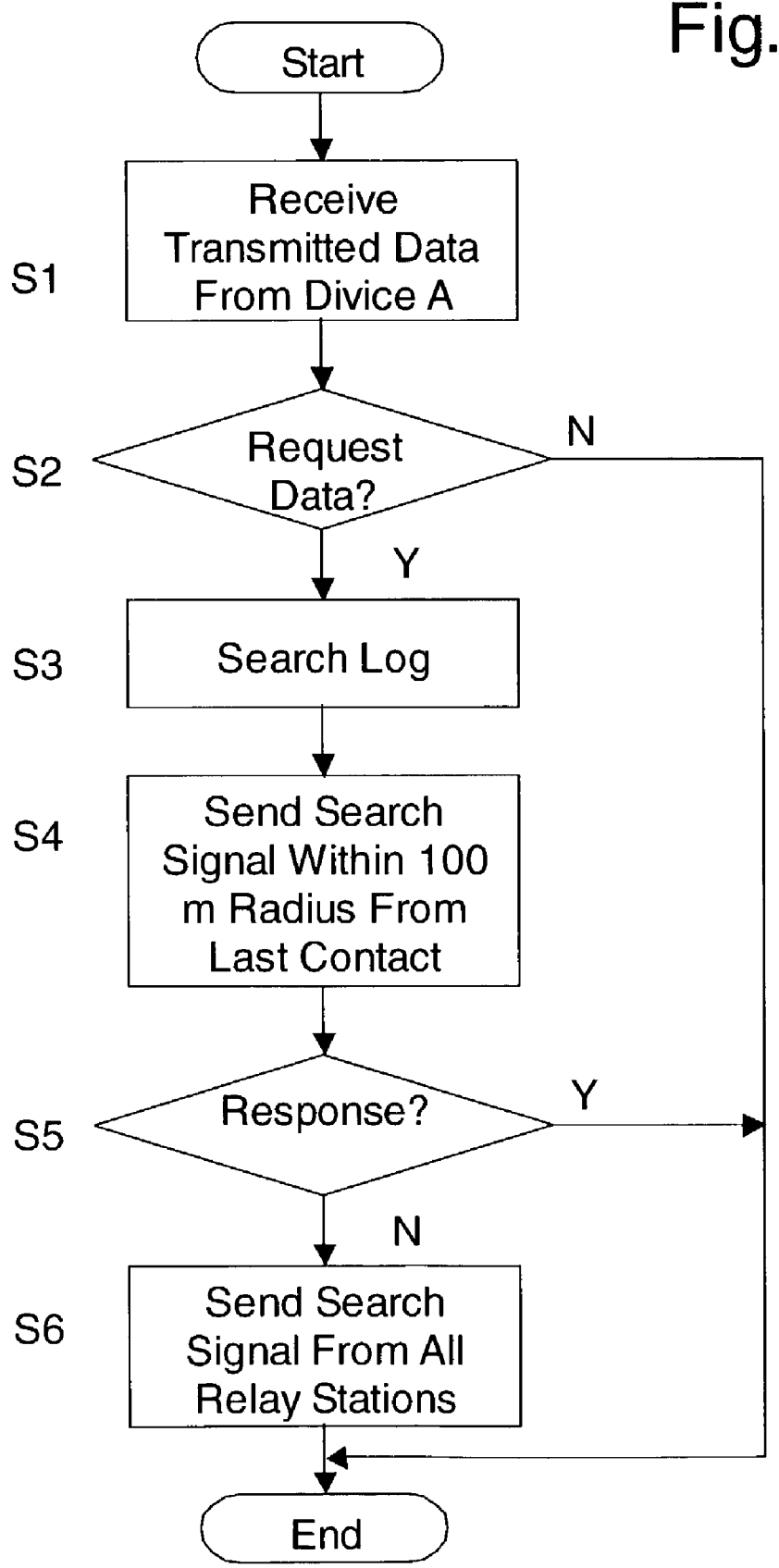
FIG. 22 is a flowchart illustrating an exemplary embodiment of the present invention.

As illustrated in FIG. 22, host H (FIG. 20a) periodically receives data from device A (S1). If the received data is a request data (S2), host H first of all searches its communication log which records the location of device B when it last communicated with host H (S3). Then host H sends search signal from the relays described in FIG. 20b which are located within 100 meter radius from the location registered in the communication log. If there is no response from Device B (S5), host H sends a search signal from all relays (from R1 to R20 in FIG. 20b) (S6).

Figures 23, 24:
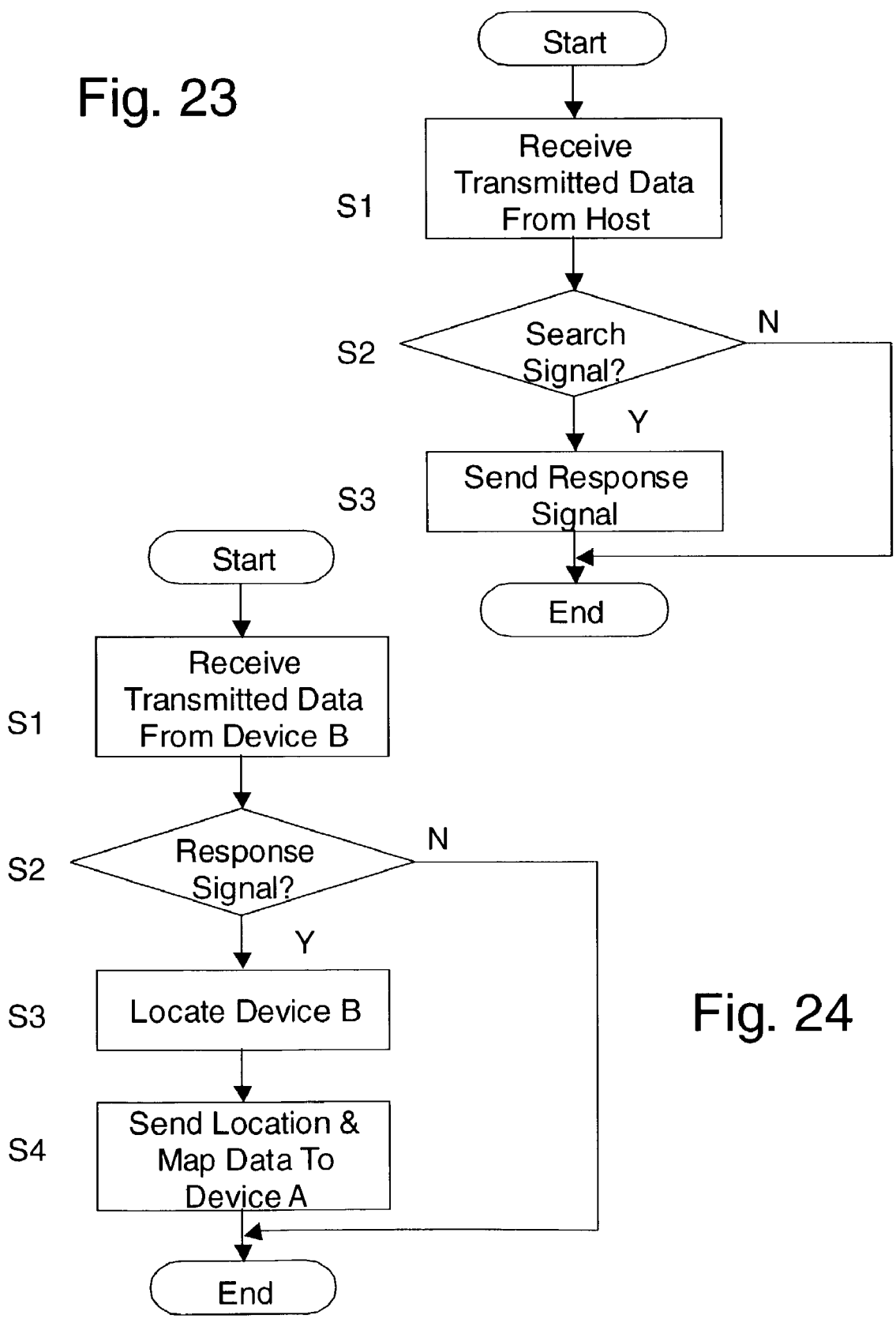
FIG. 23 is a flowchart illustrating an exemplary embodiment of the present invention.
FIG. 24 is a flowchart illustrating an exemplary embodiment of the present invention.

As illustrated in FIG. 23, device B periodically receives data from host H (FIG. 20a) (S1). If the data received is a search signal (S2), device B sends a response signal to host H (S3).

As illustrated in FIG. 24 host H (FIG. 20a) periodically receives data from device B (S1). If the data received is a response signal (S2), host H locates the geographic position of device B by utilizing the method described in FIGS. 20a and 20b (S3), and sends the location data and the relevant map data of the area where device B is located to device A (S4).

Figure 25:
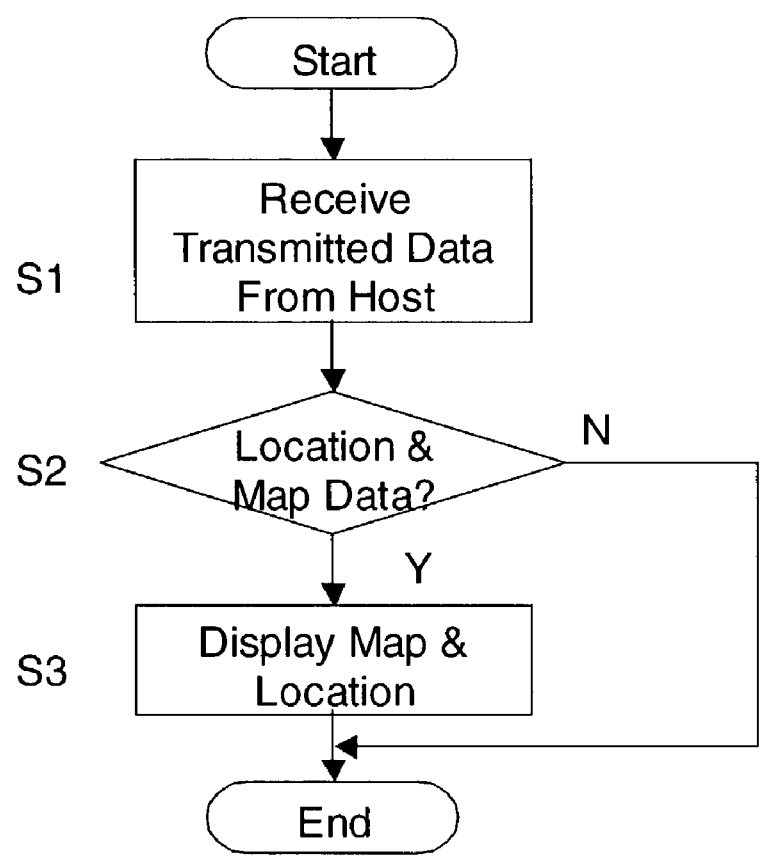
FIG. 25 is a flowchart illustrating an exemplary embodiment of the present invention.

As illustrated in FIG. 25, device A periodically receives data from host H (FIG. 20a) (S1). If the data received is the location data and the relevant map data mentioned above (S2), device A displays the map based on the relevant map data and indicates the current location of device B thereon based on the location data received (S3).

Figure 26:
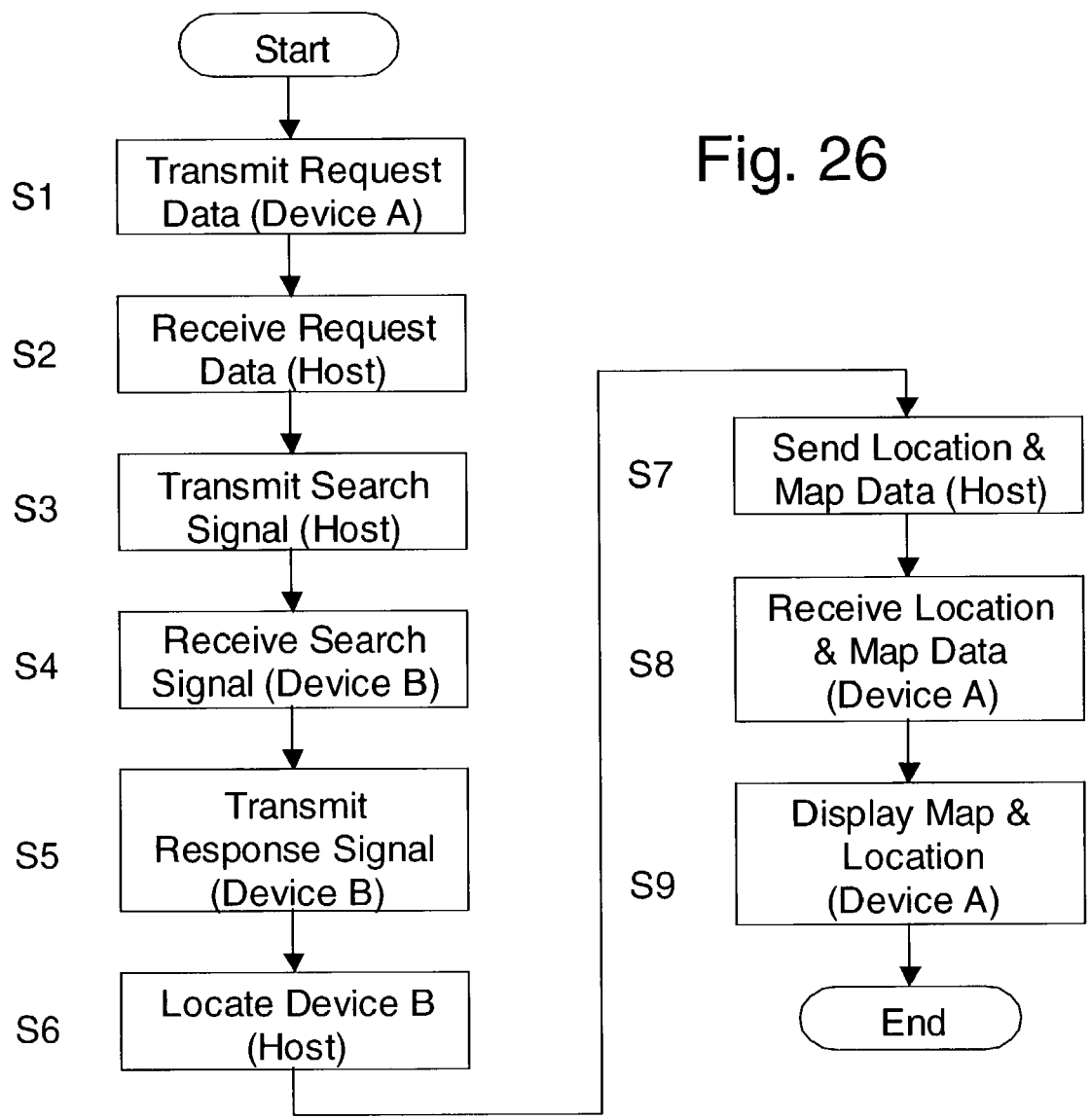
FIG. 26 is a flowchart illustrating an exemplary embodiment of the present invention.

Device A can continuously track down the current location of device B as illustrated in FIG. 26. First, device A sends a request data to host H (FIG. 20a) (S1). As soon as host H receives the request data (S2), it sends a search signal in the manner illustrated in FIG. 22 (S3). As soon as device B receives the search signal (S4), it sends a response signal to host H (S5). Based on the response signal, host H locates the geographic location of device B with the method described in FIGS. 20a and 20b (S6). Then host H sends to device A a renewed location data and a relevant map data of the area where device B is currently located (S7). As soon as these data are received (S8), device A displays the map based on the relevant map data and indicates the updated location based on the renewed location data (S9). If device B is still within the specified area device A may use the original relevant map data. As another embodiment of the present invention, S1 through S4 may be omitted and make device B send a response signal continuously to host H until host H sends a command signal to device B to cease sending the response signal.

<<Positioning System—Automatic Silent Mode>>

FIGS. 27a through 32g illustrate the automatic silent mode of communication device 200 (FIG. 1).

In FIG. 27a, relay R1 is connected to cable C1, relay R2 is connected to cable C2, relay R3 is connected to cable C3, and relay R4 is connected to cable C4. Cables C1, C2, C3, and C4 are connected to transmitter T, which is connected to host H by cable C5. The relays (R 1–R 20) are located throughout the predetermined area in the pattern illustrated in FIG. 27b. The system illustrated in FIGS. 27a and 27b is designed to pin-point the position of communication device 200 by using the method so-called "global positioning system" or "GPS." As stated hereinbefore, such function can be enabled by the technologies primarily introduced in the inventions in the foregoing patents and the references cited thereof. The relays R1–R20 are preferably located on ground, however, are also permitted to be installed in artificial satellites as described in the foregoing patents and the references cited thereof in order to cover wider geographical range. In addition, host H may be carried by an artificial satellite and utilize the formation as described in FIGS. 2a, 2b, and 2c.

As illustrated in FIG. 28, the user of communication device 200 may set the silent mode by input device 210 (FIG. 1) or by utilizing the voice recognition system installed therein. When communication device 200 is in the silent mode, (a) the ringing sound is turned off, (b) vibrator 217 (FIG. 1) activates when communication device 200 receives call, and/or (c) communication device 200 sends an automatic response to the caller device when a call is received (S1). The user may, at his discretion, select any of these predetermined function of the automatic silent mode.

Figure 29:
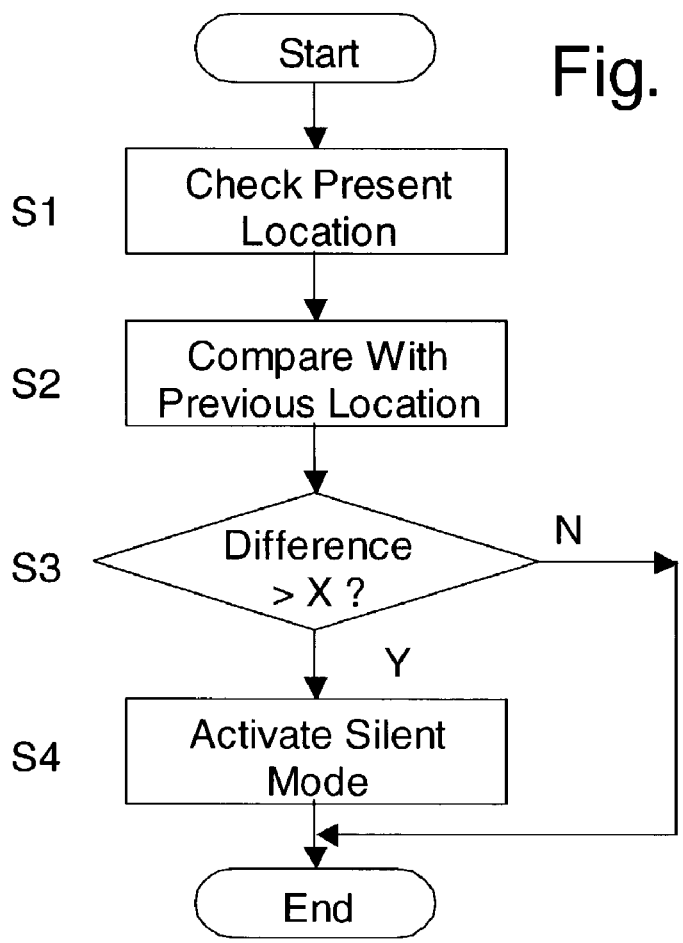
FIG. 29 is a flowchart illustrating an exemplary embodiment of the present invention.

FIG. 29 illustrates how the automatic silent mode is activated. Communication device 200 periodically checks its present location with the method so-called "global positioning system" or "GPS" by using the system illustrated in FIGS. 27a and 27b (S1). Communication device 200 then compares the present location and the previous location (S2). If the difference of the two values is more than the specified amount X, i.e., when the moving velocity of communication device 200 exceeds the predetermined value (S3), the silent mode is activated and (a) the ringing sound is automatically turned off, (b) vibrator 217 (FIG. 1) activates, and/or (c) communication device 200 sends an automatic response to the caller device according to the user's setting (S4). Here, the silent mode is automatically activated because the user of communication device 200 is presumed to be on an automobile and is not in a situation to freely answer the phone, or the user is presumed to be riding a train and does not want to disturb other passengers.

Figure 30:
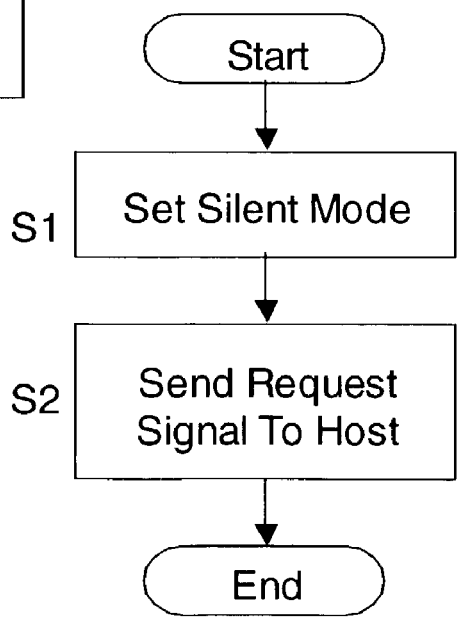
FIG. 30 is a flowchart illustrating an exemplary embodiment of the present invention.

As another embodiment of the present invention, the automatic silent mode may be administered by host H (FIG. 27a). As illustrated in FIG. 30, the silent mode is set in the manner described in FIG. 28 (S1) and communication device 200 sends to host H a request signal indicating that it is in the silent mode (S2).

Figure 31:
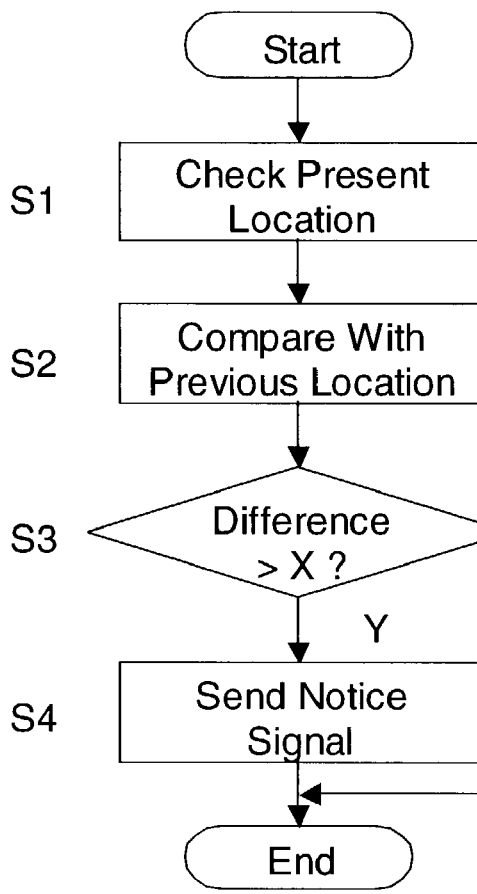
FIG. 31 is a flowchart illustrating an exemplary embodiment of the present invention.

As described in FIG. 31, when host H (FIG. 27a) detects a call to communication device 200 after receiving the request signal, it checks the current location of communication device 200 (S1) and compares it with the previous location (S2). If the difference of the two values is more than the specified amount X, i.e., when the moving velocity of communication device 200 exceeds the predetermined value (S3), host H sends a notice signal to communication device 200 indicating that it has received an incoming call (S4).

Figure 32:
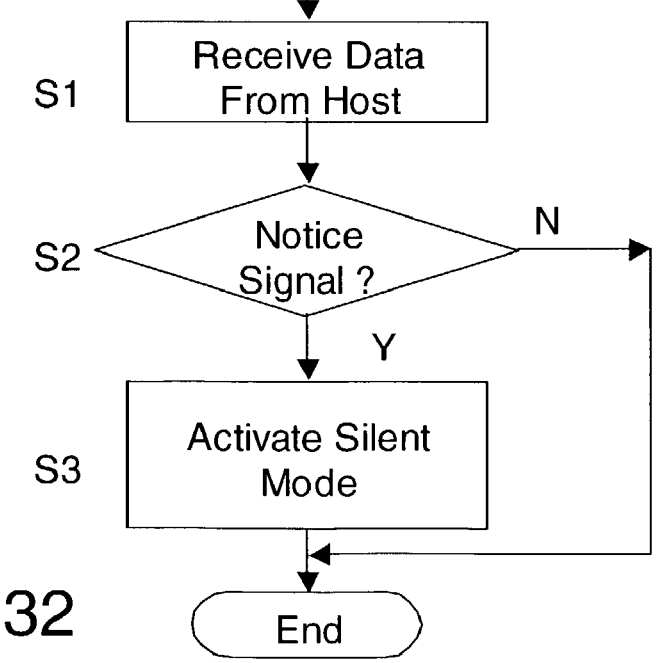
FIG. 32 is a flowchart illustrating an exemplary embodiment of the present invention.

As illustrated in FIG. 32, communication device 200 receives data periodically from host H (FIG. 27a) (S1). If the received data is a notice signal (S2), communication device 200 activates the silent mode (S3) and (a) the ringing sound is automatically turned off, (b) vibrator 217 (FIG. 1) activates, and/or (c) communication device 200 sends an automatic response to the caller device according to the user's setting. The automatic response may be sent from host H instead.

As another embodiment of the present invention, a train route data may be utilized. As illustrated in FIG. 32a, a train route data is stored in area 263 of RAM 206. The train route data contains three-dimensional train route map including the location data of the train route. FIG. 32b illustrates how the train route data is utilized. CPU 211 (FIG. 1) periodically checks the present location of communication device 200 by the method described in FIGS. 27a and 27b (S1). Then CPU 211 compares with the train route data stored in area 263 of RAM 206 (S2). If the present location of communication 200 matches the train route data (i.e., if communication device is located on the train route) (S3), the silent mode is activated in the manner described above (S4). The silent mode is activated because the user of communication device 200 is presumed to be currently on a train and may not want to disturb the other passengers on the same train.

Figure 32C:
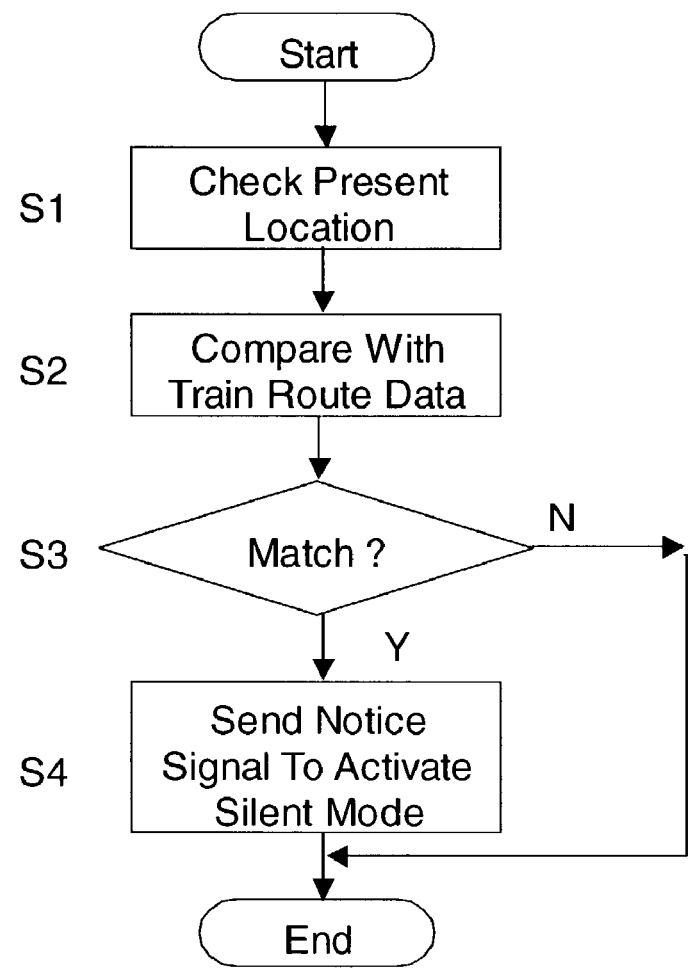

As another embodiment of the present invention, such function can be delegated to host H (FIG. 27a) as described in FIG. 32c. Namely, host H (FIG. 27a) periodically checks the present location of communication device 200 by the method described in FIGS. 27a and 27b (S1). Then host H compares the present location with the train route data stored in its own storage (not shown) (S2). If the present location of communication 200 matches the train route data (i.e., if communication device is located on the train route) (S3) host H sends a notice signal to communication device 200 thereby activating the silent mode in the manner described above (S4).

Figure 32E:
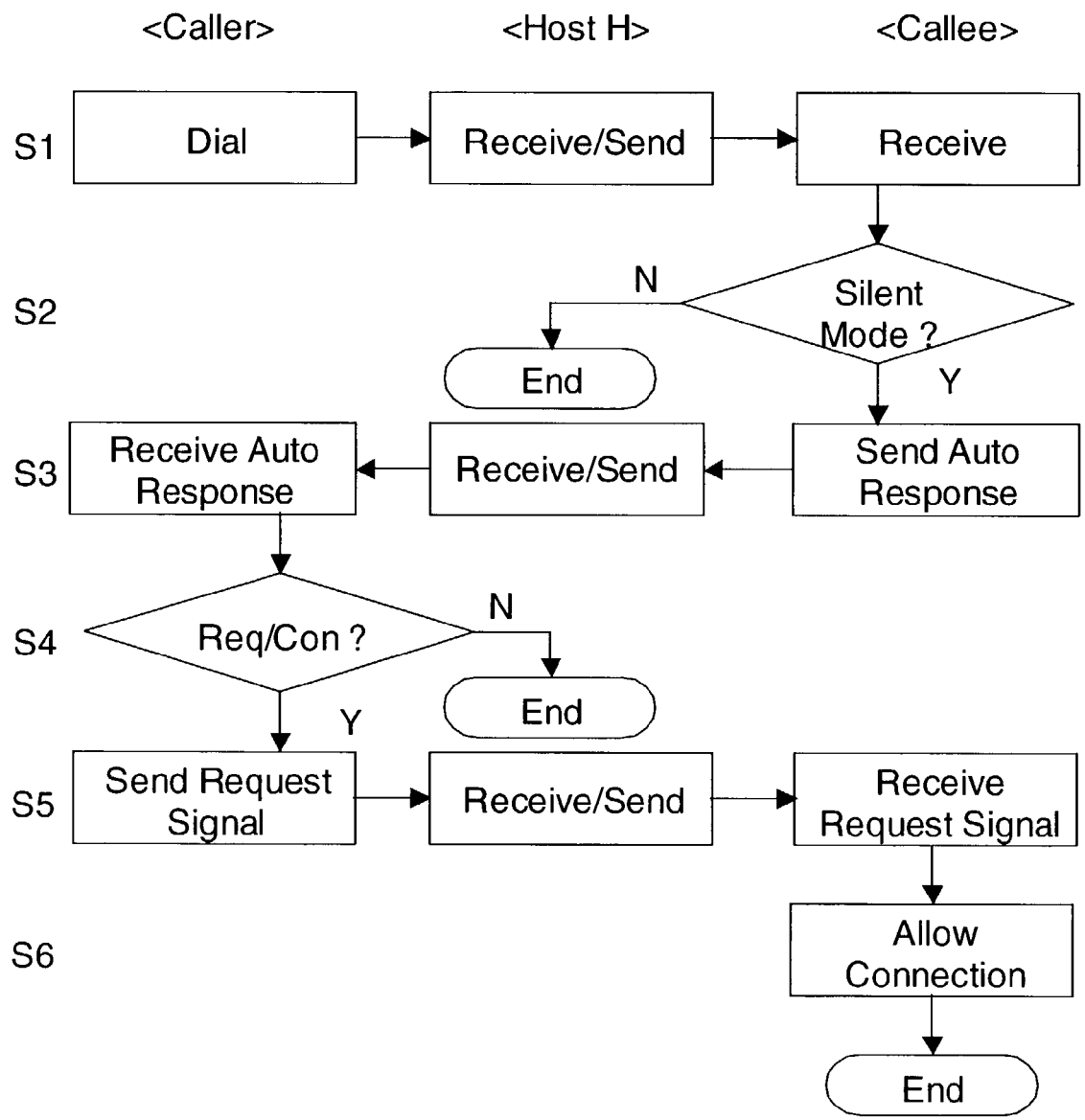
Figure 32F:
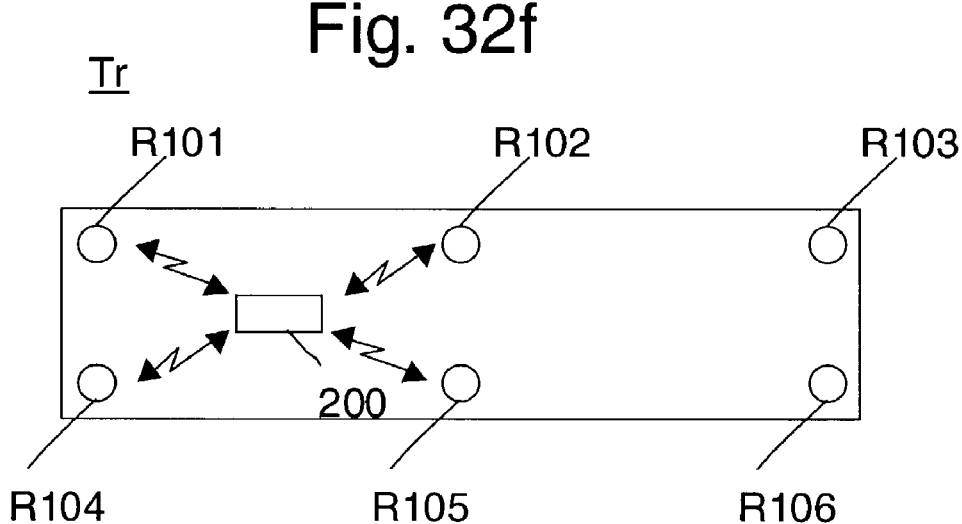
Figure 32G:
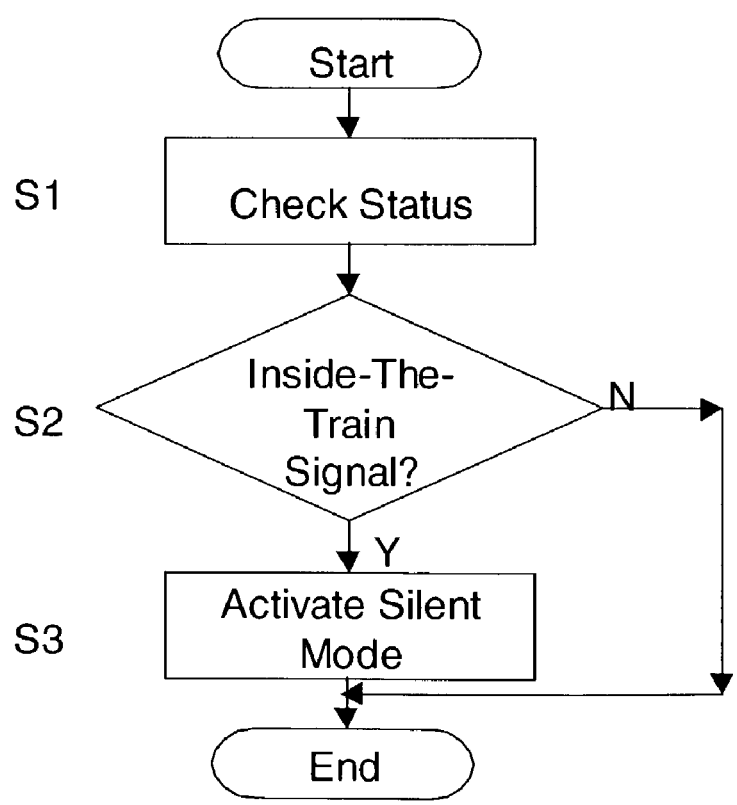

Another embodiment is illustrated in FIGS. 32f and 32g. As illustrated in FIG. 32f, relays R 101, R 102, R 103, R 104, R 105, R 106, which perform the same function to the relays described in FIG. 27a and FIG. 27b, are installed in train Tr. The signals from these relays are sent to host H illustrated in FIG. 27a. Relays R 101 through R 106 emit inside-the-train signals which are emitted only inside train Tr. FIG. 32g illustrates how communication device 200 operates inside train Tr. Communication device 200 periodically checks the signal received in train Tr (S1). If communication device 200 determines that the signal received is an inside-the-train signal (S2), it activates the silent mode in the manner described above (S3).

<<Positioning System—Auto Response>>

FIG. 32d and FIG. 32e illustrates the method to send an automatic response to a caller device when the silent mode is activated.

Assume that the caller device, a communication device 200, intends to call a callee device, another communication device 200 via host H (FIG. 27a). As illustrated in FIG. 32d, the caller device dials the callee device and the dialing signal is sent to host H (S1). Host H checks whether the callee device is in the silent mode (S2). If host H detects that the callee device is in the silent mode, it sends a predetermined auto response which indicates that the callee is probably on a train and may currently not be available, which is received by the caller device (S3). If the user of the caller device still desires to request for connection and certain code is input from input device 210 (FIG. 1) or by the voice recognition system (S4), a request signal for connection is sent and received by host H (S5), and the line is connected between the caller device and the callee device via host H (S6).

As another embodiment of the present invention, the task of host H (FIG. 27a) which is described in FIG. 32d may be delegated to the callee device as illustrated in FIG. 32e. The caller device dials the callee device and the dialing signal is sent to the callee device via host H (S1). The callee device checks whether it is in the silent mode (S2). If the callee device detects that it is in the silent mode, it sends an predetermined auto response which indicates that the callee is probably on a train and may currently not be available, which is sent to the caller device via host H (S3). If the user of the caller device still desires to request for connection and certain code is input from input device 210 (FIG. 1) or by the voice recognition system (S4), a request signal for connection is sent to the callee device via host H (S5), and the line is connected between the caller device and the callee device via host H (S6).

<<Positioning System—Summary>>

The foregoing inventions may be summarized as the following.

(1) A positioning system consisting of a first device, a host, and a second device wherein a device ID of said second device is input into said first device, said device ID is sent to said host, said host sends a search signal to which said second device responds, said host sends to the first device location data indicating the location of said second device, and said first device displays the location of said second device thereby enabling said first device to identify the location of said second device. Where said first device is a communication device, said first device includes an antenna, said antenna sends positioning signal to identify the location of said second device, and said antenna also sends communication signal thereby enabling the user of said first device to identify the location of said second device as well as utilizing said communication device for means of communication.

(2) A communication device wherein the moving velocity of said communication device is checked and when said moving velocity exceeds a predetermined value said communication device refrains from emitting sound thereby preventing other persons being present near said communication device from being disturbed.

(3) A communication device wherein the location of said communication device is compared to a route data and said communication device refrains from emitting sound if said location of said communication device is determined to match said route data thereby preventing other persons being present near said communication device from being disturbed.

(4) A communication system consisting of a first communication device and a second communication device wherein said first communication device receives an automatic response if said second communication device is in a certain mode and said first communication device is enable to be connected to said second communication device upon said second device sending a request thereby preventing other persons being present near said first communication device from being disturbed.

(5) A communication system consisting of a communication device and a plurality of signal emitter wherein said communication device refrains from emitting sound upon receiving a certain signal from said signal emitter thereby preventing other persons being present near said communication device from being disturbed.

<<Auto Backup>>

FIGS. 33 through 37 illustrate the automatic backup system of communication device 200 (FIG. 1).

Figure 33:
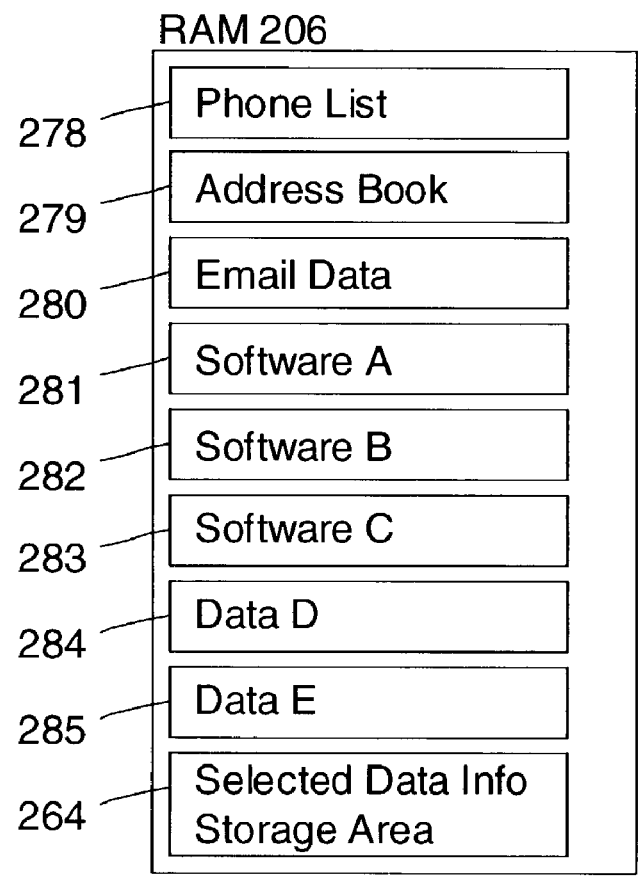
FIG. 33 is a block diagram illustrating an exemplary embodiment of the present invention.

As illustrated in FIG. 33, RAM 206 (FIG. 1) includes areas to store the data essential to the user of communication device 200, such as area 278 for a phone list, area 279 for an address book, area 280 for email data, area 281 for software A, area 282 for software B, area 283 for software C, area 284 for data D, area 285 for data E. RAM 206 also includes area 264, i.e., the selected data info storage area, which will be explained in details hereinafter.

Figure 34:
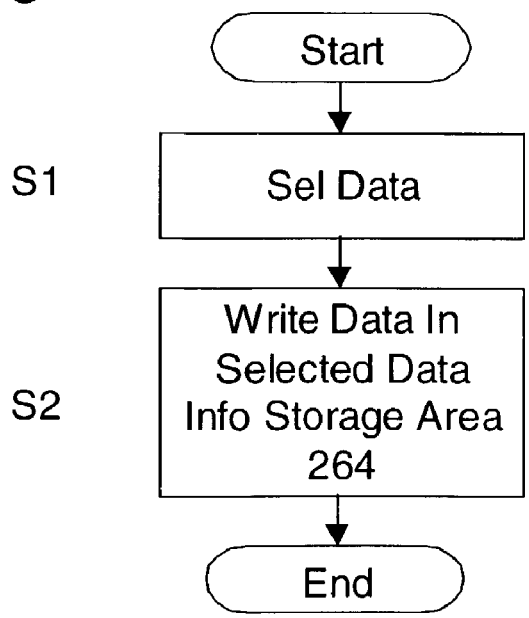
FIG. 34 is a flowchart illustrating an exemplary embodiment of the present invention.

As described in FIG. 34, the user selects data by utilizing input device 210 (FIG. 1) or the voice recognition system which he/she intends to be automatically backed up (S1). The selected data are written in area 264, the selected data info storage area (S2).

Figure 35A:
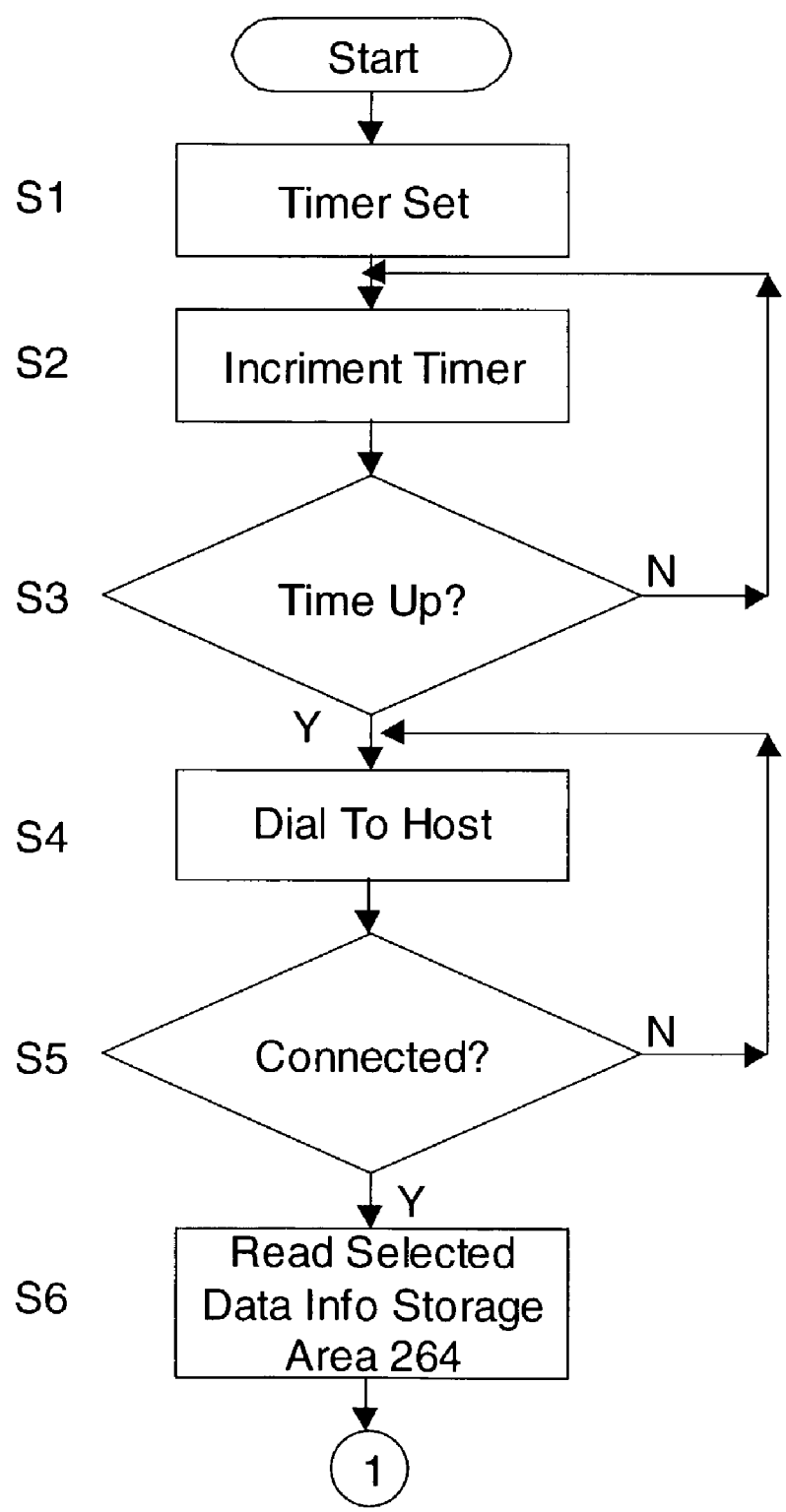
FIG. 35$a$ is a flowchart illustrating an exemplary embodiment of the present invention.
Figure 35B:
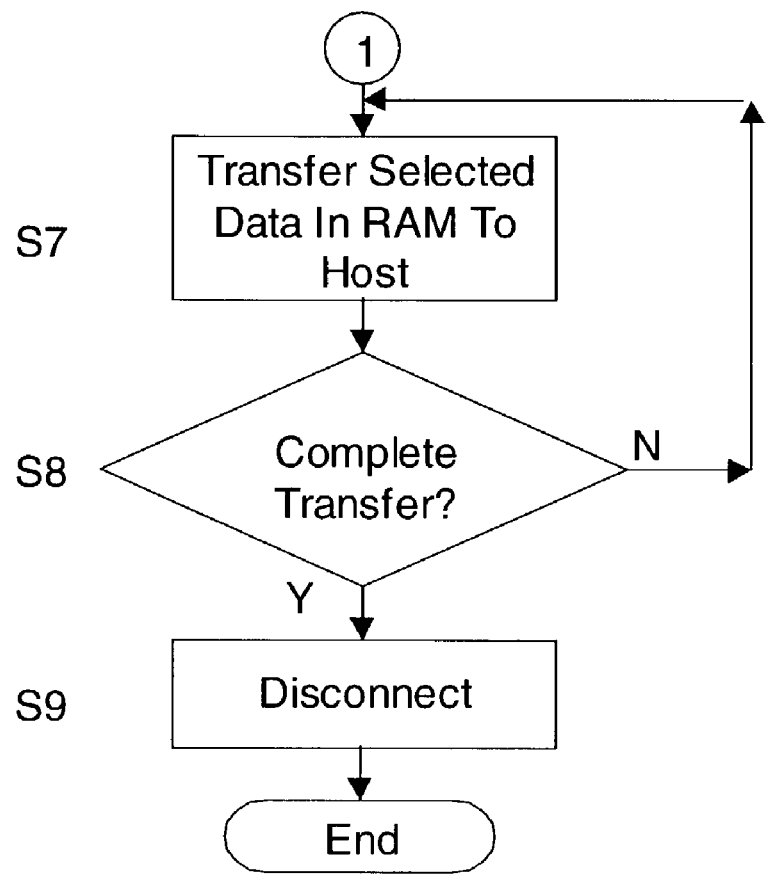

The overall operation of this function is illustrated in FIGS. 35a and 35b. First of all, a timer (not shown) is set by a specific input signal produced by input device 210 (FIG. 1) or by the voice recognition system (S1). The timer is incremented periodically (S2) and when the incremented value equals the predetermined value (S3), CPU 211 (FIG. 1) initiates the dialing process (S4). The dialing process continues until communication device 200 is connected to host H explained in FIG. 37 (S5). Once the line is connected, CPU 211 reads the information stored in area 264 (S6) and based on such information it initiates to transfer the selected data from RAM 206 to host H (S7). The transfer continues until all of the selected data are transferred to host H (S8), and the line is disconnected thereafter (S9). This backup sequence can be initiated automatically and periodically by using a timer or manually. As another embodiment of the present invention, instead of selecting the data that are to be backed up, all data in RAM 206 (FIG. 1) can be transferred to host H.

Figure 36:
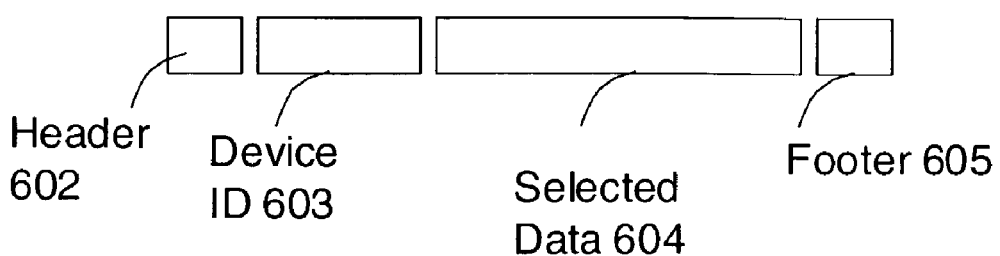
FIG. 36 is a simplified illustration illustrating an exemplary embodiment of the present invention.

FIG. 36 illustrates the basic structure of the data transferred to host H. Transferred data 601 includes header 602, device ID 603, selected data 604 and footer 605. Device ID 603 is the identification number of communication device 200 preferably its phone number, and selected data 604 is a pack of data which is transferred from RAM 206 to host H based on information stored in area 264. Header 602 and footer 605 indicates the beginning and the end of the transferred data 601 respectively.

Figure 37:
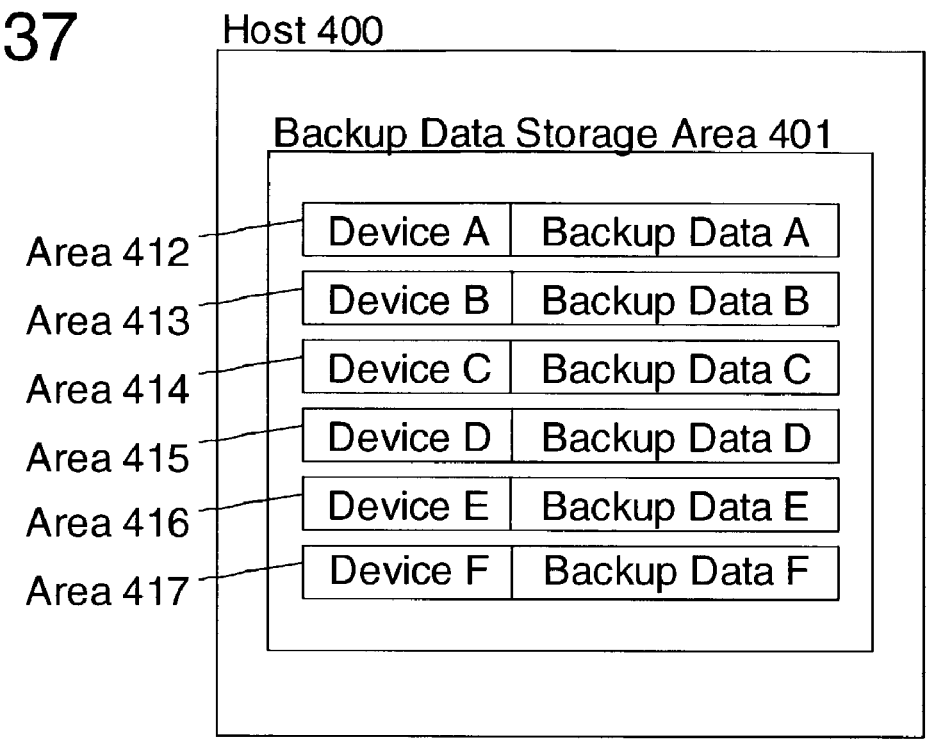
FIG. 37 is a block diagram illustrating an exemplary embodiment of the present invention.

FIG. 37 illustrates the basic structure of host H. Host H includes backup data storage area 401 which is used to backup all of the backup data transferred from all communication devices. Host H stores the transferred data 601 (FIG. 36) to the designated area based on the device ID included in transferred data 601. For example, transferred data 601 transferred from device A is stored in area 412 as backup data A. In the same manner transferred data 601 transferred from device B is stored in area 413 as backup data B; transferred data 601 transferred from device C is stored in area 414 as backup data C; transferred data 601 transferred from device D is stored in area 415 as backup data D; transferred data 601 transferred from device E is stored in area 416 as backup data E; and transferred data 601 transferred from device F is stored in area 417 as backup data F.

<<Auto Backup—Summary>>

The foregoing invention may be summarized as the following.

A communication system consisting of a host and a plurality of communication device wherein said host includes a plurality of storage areas and each of said plurality of communication device includes a storage area, and data stored in said storage area of said communication device are manually and/or periodically transferred to one of the designated storage areas of said host thereby enabling the users of said plurality of communication device to retrieve data when said plurality of communication device are lost or broken.

<<Signal Amplifier>>

Figure 38:
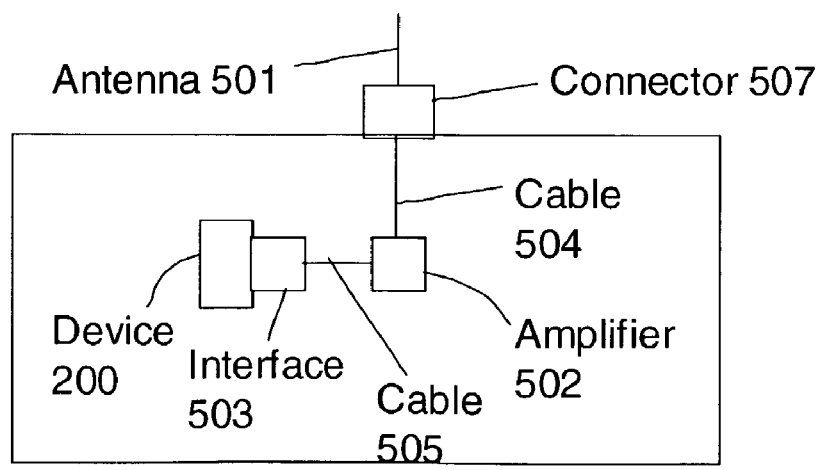
FIG. 38 is a simplified illustration illustrating an exemplary embodiment of the present invention.

FIG. 38 illustrates a signal amplifier utilized for automobiles and other transportation carriers, such as trains, airplanes, space shuttles, and motor cycles.

As described in FIG. 38, automobile 835 includes interface 503, an interface detachably connectable to communication device 200, which is connected to amplifier 502 via cable 505. Amplifier 502 is connected to antenna 501 via cable 504 and connector 507 as described in this drawing. The signal produced by communication device 200 is transferred to interface 503. Then the signal is transferred to amplifier 502 via cable 505 where the signal is amplified. The amplified signal is transferred to antenna 501 via cable 504 and connector 507, which transmits the amplified signal to host H (not shown). The receiving signal is received by antenna 501 and transferred to amplifier 502 via connector 507 and cable 504, and then is transferred to interface 503 via cable 505, which transfers the amplified signal to communication device 200.

<<Signal Amplifier—Summary>>

The foregoing invention may be summarized as the following.

A transportation carrier which is primarily designed to carry person or persons consisting of an interface which is detachably connectable to a communication device, an amplifier which is connected to said interface and which amplifies the signal produced by said communication device, and an transmitter which is connected to said amplifier and which transmits said signal amplified by said amplifier.

<<Audio/Video Data Capturing System>>

FIGS. 39 through 44 illustrate the audio/video capturing system of communication device 200 (FIG. 1).

Assuming that device A, a communication device 200, captures audio/video data and transfers such data to device B, another communication device 200, via a host (not shown). Primarily video data is input from CCD unit 214 (FIG. 1) and audio data is input from microphone 215 of (FIG. 1) of device A.

Figure 39:
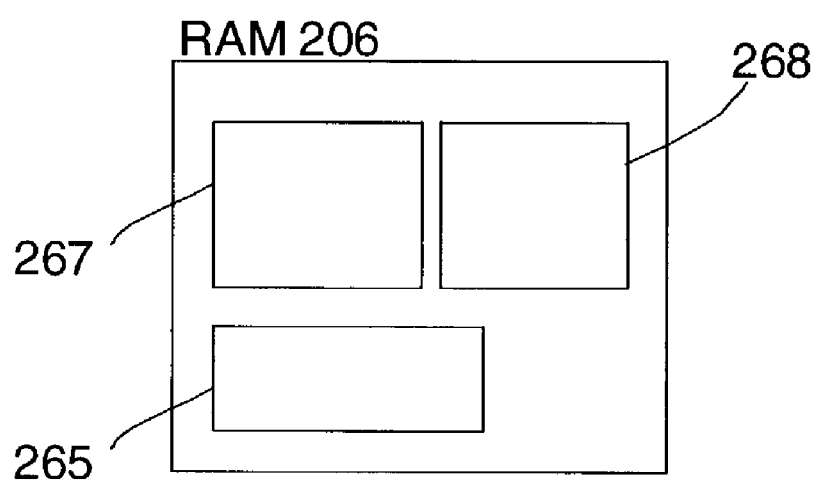
FIG. 39 is a block diagram illustrating an exemplary embodiment of the present invention.

As illustrated in FIG. 39, RAM 206 (FIG. 1) includes area 267 which stores video data, area 268 which stores audio data, and area 265 which is a work area utilized for the process explained hereinafter.

Figure 40:
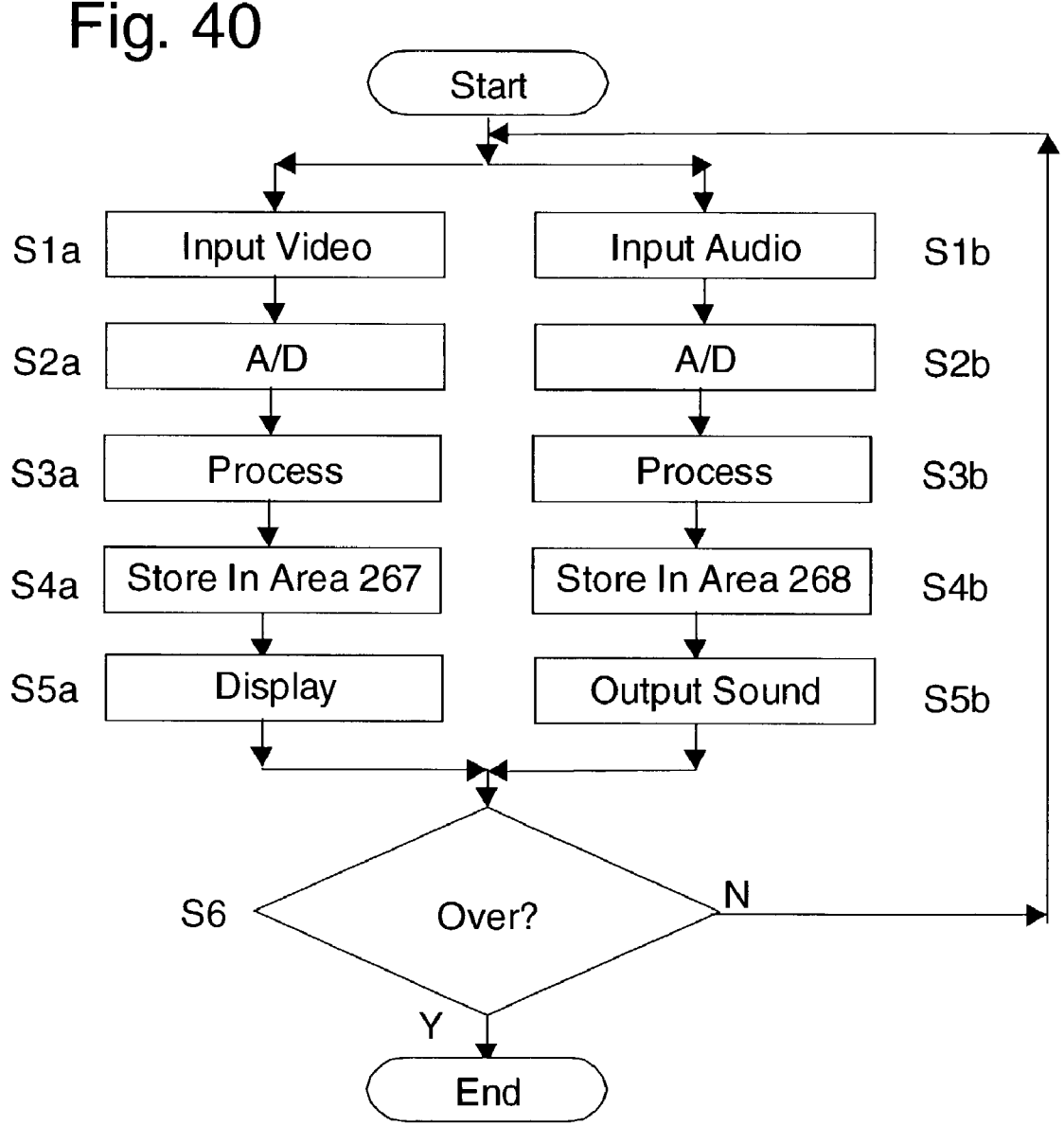
FIG. 40 is a flowchart illustrating an exemplary embodiment of the present invention.

As described in FIG. 40, the video data input from CCD unit 214 (FIG. 1) (S1a) is converted from analog data to digital data (S2a) and is processed by video processor 202 (FIG. 1) (S3a). Area 265 (FIG. 39) is used as work area for such process. The processed video data is stored in area 267 (FIG. 39) of RAM 206 (S4a) and is displayed on LCD 201 (FIG. 1) (S5a). As described in the same drawing, the audio data input from microphone 215 (FIG. 1) (S1b) is converted from analog data to digital data by A/D 213 (FIG. 1) (S2b) and is processed by sound processor 205 (FIG. 1) (S3b). Area 265 is used as work area for such process. The processed audio data is stored in area 268 (FIG. 39) of RAM 206 (S4b) and is transferred to sound processor 205 and is output from speaker 216 (FIG. 1) via D/A 204 (FIG. 1) (S5b). The sequences of S1a through S5a and S1b through S5b are continued until a specific signal indicating to stop such sequence is input from input device 210 (FIG. 1) or by the voice recognition system (S6).

Figure 41:
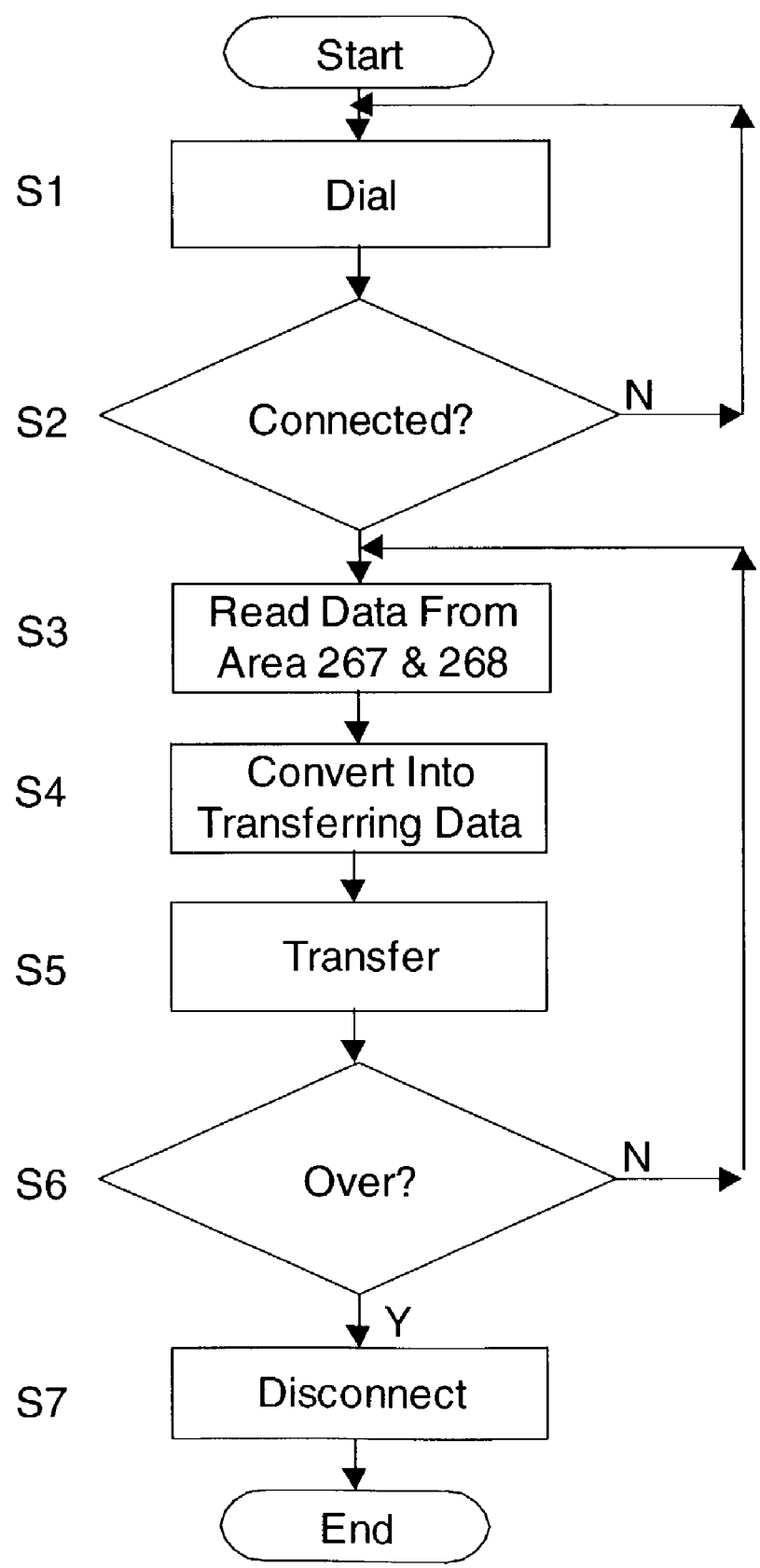
FIG. 41 is a flowchart illustrating an exemplary embodiment of the present invention.

FIG. 41 illustrates the sequence to transfer the video data and the audio data via antenna 218 (FIG. 1) in a wireless fashion. As described in FIG. 41, CPU 211 (FIG. 1) of device A initiates a dialing process (S1) until the line is connected to a host (not shown) (S2). As soon as the line is connected, CPU 211 reads the video data and the audio data stored in area 267 (FIG. 39) and area 268 (FIG. 39) (S3) and transfer them to signal processor 208 (FIG. 1) where the data are converted into a transferring data (S4). The transferring data is transferred from antenna 218 (FIG. 1) in a wireless fashion (S5). The sequence of S1 through S5 is continued until a specific signal indicating to stop such sequence is input from input device 210 (FIG. 1) or via the voice recognition system (S6). The line is disconnected thereafter (S7).

Figure 42:
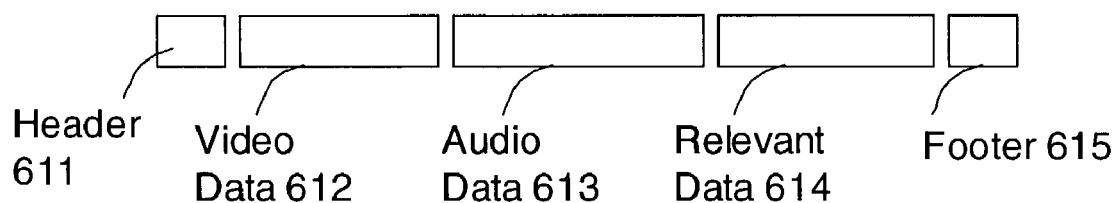
FIG. 42 is a simplified illustration illustrating an exemplary embodiment of the present invention.

FIG. 42 illustrates the basic structure of the transferred data which is transferred from device A as described in S4 and S5 of FIG. 41. Transferred data 610 is primarily composed of header 611, video data 612, audio data 613, relevant data 614, and footer 615. Video data 612 corresponds to the video data stored in area 267 (FIG. 39) of RAM 206, and audio data 613 corresponds to the audio data stored in area 268 (FIG. 39) of RAM 206. Relevant data 614 includes various types of data, such as the identification numbers of device A (i.e., transferor device) and device B (i.e., transferee device), a location data which represents the location of device A, email data transferred from device A to device B, etc. Header 611 and footer 615 represent the beginning and the end of transferred data 610 respectively.

Figure 43:
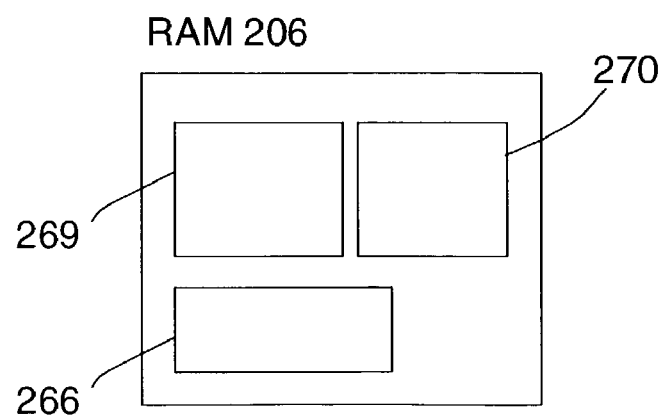
FIG. 43 is a block diagram illustrating an exemplary embodiment of the present invention.

FIG. 43 illustrates the data contained in RAM 206 (FIG. 1) of device B. As illustrated in FIG. 43, RAM 206 includes area 269 which stores video data, area 270 which stores audio data, and area 266 which is a work area utilized for the process explained hereinafter.

Figure 44A:
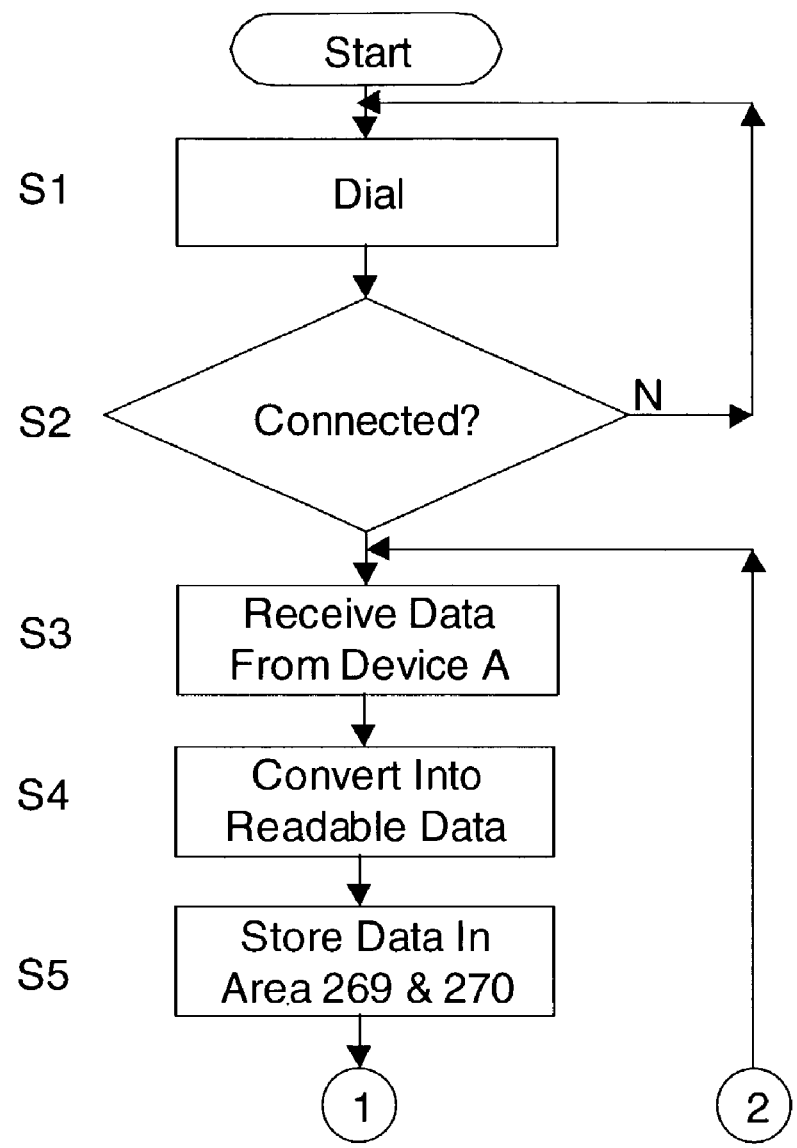
FIG. 44$a$ is a flowchart illustrating an exemplary embodiment of the present invention.
Figure 44B:
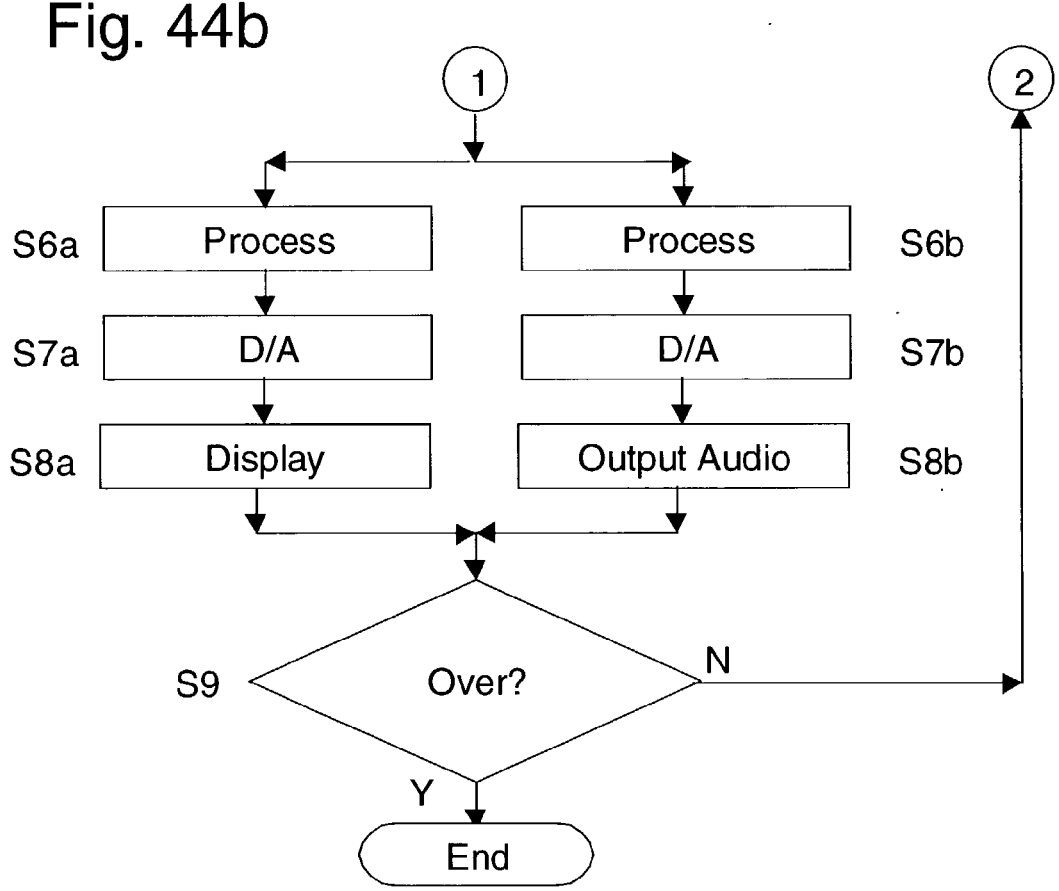

As described in FIG. 44a and FIG. 44b, CPU 211 (FIG. 1) of device B initiates a dialing process (S1) until device B is connected to a host (not shown) (S2). Transferred data 610 is received by antenna 218 (FIG. 1) of device B (S3) and is converted by signal processor 208 (FIG. 1) into data readable by CPU 211 (S4). Video data and audio data are retrieved from transferred data 610 and stored into area 269 (FIG. 43) and area 270 (FIG. 43) of RAM 206 respectively (S5). The video data stored in area 269 is processed by video processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in area 270 is processed by sound processor 205 (FIG. 1) (S6b). The processed audio data is converted into analog data by D/A

204 (FIG. 1) (S7*b*) and output from speaker 216 (FIG. 1) (S8*b*). The sequences of S6*a* through S8*a* and S6*b* through S8*b* are continued until a specific signal indicating to stop such sequence is input from input device 210 (FIG. 1) or via the voice recognition system (S9).

<<Audio/Video Data Capturing System—Summary>>

The foregoing invention may be summarized as the following.

(1) A communication system consisting of a first communication device and a second communication device wherein said first communication consists of a video input means to input video information, a microphone, and a first antenna, said second communication device consists of a display means to output said video information, a speaker, and a second antenna, said first communication device inputs said video information and said audio information from said video input means and said microphone respectively, said video information and said audio information are sent to said second communication device from said first antenna in a wireless fashion, said second communication device receives said video information and said audio information in a wireless fashion from said second antenna, and said video information and said audio information are output from said display means and said speaker of said second communication device respectively thereby enabling the user of said first communication device and the user of said second communication device to communicate at any location wherever they desire.

(2) A communication device consisting of a video input means to input video information, a microphone, and an antenna wherein said communication device inputs said video information and said audio information from said video input means and said microphone respectively, said video information is sent to another device in a wireless fashion from said antenna, said audio information is also sent to said other device in a wireless fashion from said antenna thereby enabling the user of said communication device to communicate with said other device by utilizing said video information and said audio information in any location wherever he/she desires.

<<Digital Mirror (1)>>

Figure 44C:
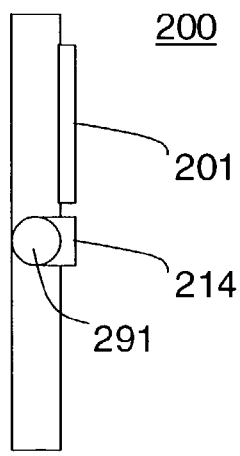
Figure 44D:
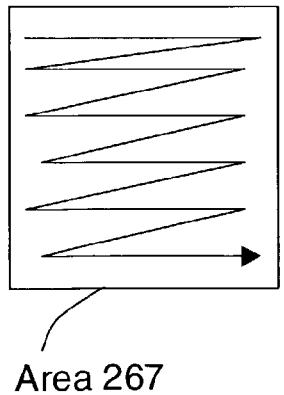
Figure 44E:
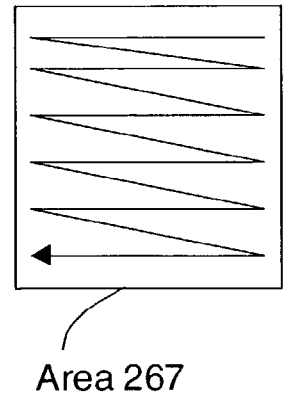

FIGS. 44*c* through 44*e* illustrate the first embodiment of digital mirror function of communication device 200 (FIG. 1).

In this embodiment communication device 200 includes rotator 291 as described in FIG. 44*c*. Rotator 291 is fixed to the side of communication device 200 and rotates CCD unit 214 (FIG. 1) and thereby CCD unit 214 is enabled to face multi-direction. CPU 211 (FIG. 1) reads the video data stored in area 267 (FIG. 39) from left to right as described in FIG. 44*d* when CCD unit 214 is facing the opposite direction from LCD 201 (FIG. 1). However, when CCD unit 214 is facing the same direction with LCD 201, CPU 211 reads the video data stored in area 267 from right to left as described in FIG. 44*e* thereby producing a "mirror image" on LCD 201.

As another embodiment of the present invention more than one CCD units which face multi-direction may be utilized instead of enabling one CCD unit to rotate in the manner described above.

<<Digital Mirror—Summary>>

The foregoing inventions may be summarized as the following.

(1) A wireless communication device comprising a camera, a display, an image data producing means, a wireless transmitting means, wherein said camera is capable of facing a first direction and a second direction, said image data producing means is capable of producing a non-inverted image data and an inverted image data, said image data producing means produces said non-inverted image data which is displayed on said display when said camera is facing said first direction and produces said inverted image data which is displayed on said display when said camera is facing said second direction, while said non-inverted image data is transferred in a wireless fashion from said wireless transmitting means.

(2) A communication device consisting of a display and a video input means wherein said display outputs video image which is input from said video input means and said video image is output in a symmetric fashion when said video input means is facing the same direction with said display thereby enabling the user of said communication device to utilize said communication device as a digital mirror.

<<Caller ID>>

Figure 47:
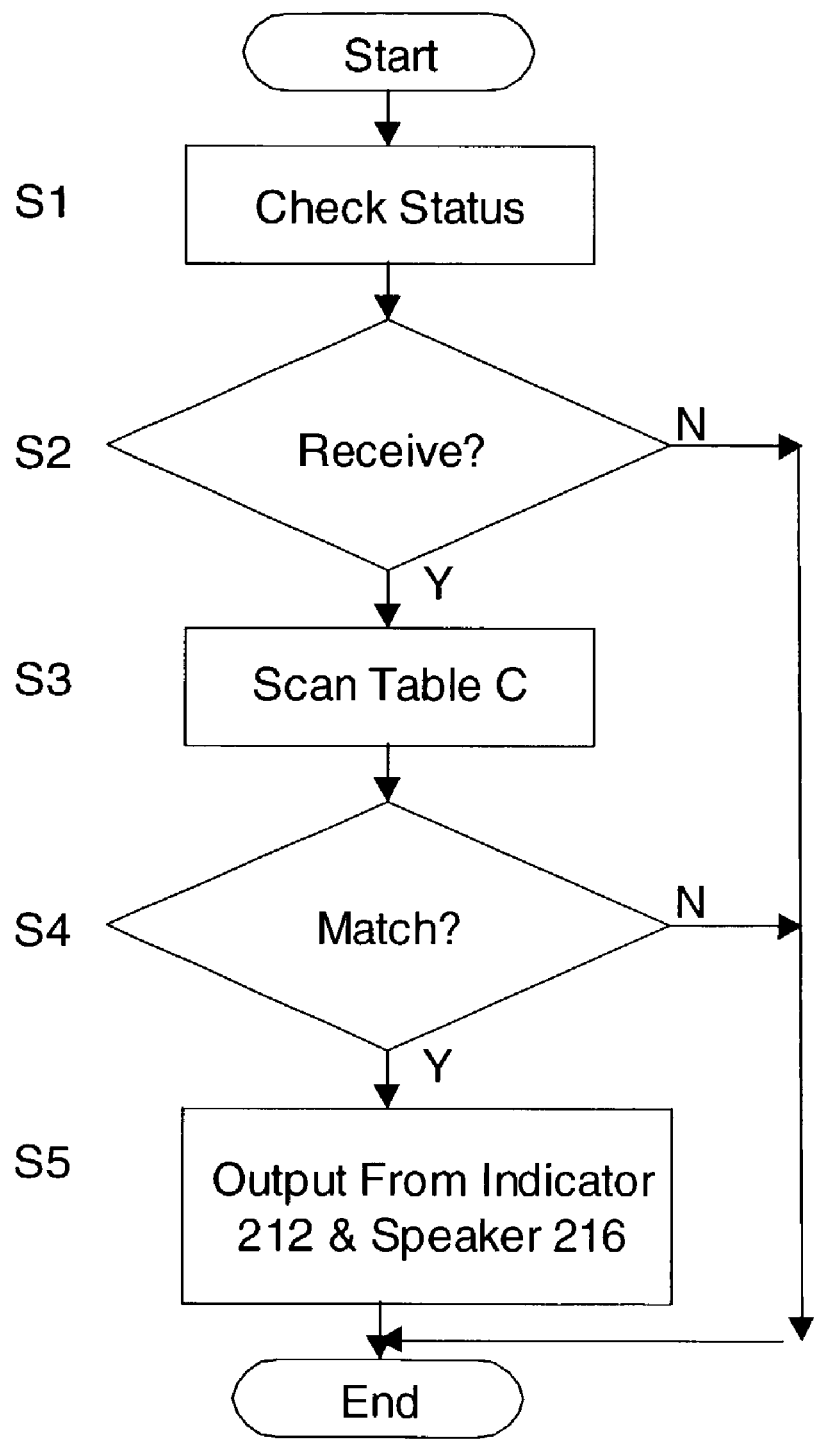
FIG. 47 is a flowchart illustrating an exemplary embodiment of the present invention.

FIGS. 45 through 47 illustrate the caller ID system of communication device 200 (FIG. 1).

As illustrated in FIG. 45, RAM 206 includes Table C. As shown in the drawing, each phone number corresponds to a specific color and sound. For example phone #1 corresponds to color A and sound E; phone #2 corresponds to color B and sound F; phone #3 corresponds to color C and sound G; and phone #4 corresponds to color D and sound H.

As illustrated in FIG. 46, the user of communication device 200 selects or inputs a phone number (S1) and selects a specific color (S2) and a specific sound (S3) designated for that phone number by utilizing input device 210 (FIG. 1). Such sequence can be repeated until there is a specific input signal from input device 210 ordering to do otherwise (S4).

As illustrated in FIG. 47, CPU 211 (FIG. 1) periodically checks whether it has received a call from other communication devices (S1). If it receives a call (S2), CPU 211 scans Table C (FIG. 45) to see whether the phone number of the caller device is registered in the table (S3). If there is a match (S4), the designated color is output from indicator 212 (FIG. 1) and the designated sound is output from speaker 216 (FIG. 1) (S5). For example if the incoming call is from phone #1, color A is output from indicator 212 and sound E is output from speaker 216.

<<Caller ID—Summary>>

The foregoing invention may be summarized as the following.

A communication device consisting of a color emitting means which outputs more than one type of color and a speaker which outputs more than one audio information wherein said communication device stores information regarding a plurality of phone numbers, a specific color and/or a specific audio information is designated to each phone number respectively, and said specific color is output from said color emitting means and/or said specific audio information is output from said speaker according to the phone number of an incoming call thereby enabling the user of said communication device to perceive the identification of the caller of said incoming call in advance of answering thereto.

<<Stock Purchase>>

FIGS. 48 through 52 illustrate the method of purchasing stocks by utilizing communication device 200 (FIG. 1).

Figure 48:
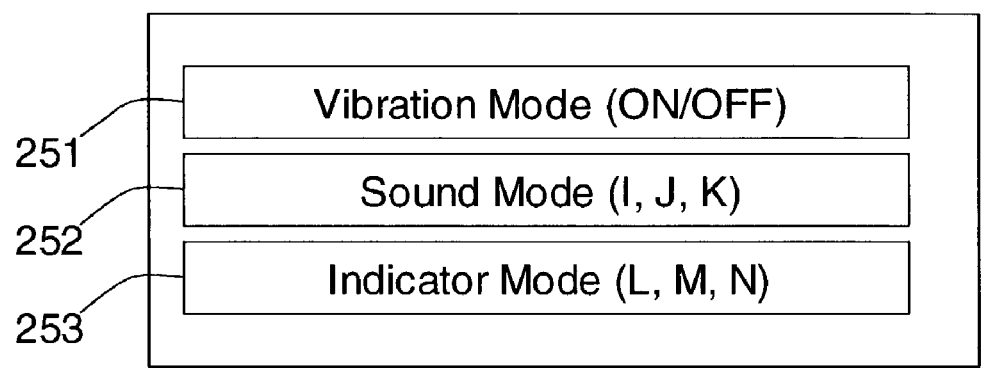
FIG. 48 is a block diagram illustrating an exemplary embodiment of the present invention.

FIG. 48 illustrates the data stored in ROM 207 (FIG. 1) necessary to set the notice mode. Area 251 stores the program regarding the vibration mode (i.e., vibration mode ON/vibration mode OFF); area 252 stores the program regarding sound which is emitted from speaker 216 (FIG. 1) and several types of sound data, such as sound data I, sound data J, and sound data K are stored therein; area 253 stores the program regarding the color emitted from indicator 212 (FIG. 1) and several types of color data, such as color data L, color data, M, and color data N are stored therein.

Figure 49:
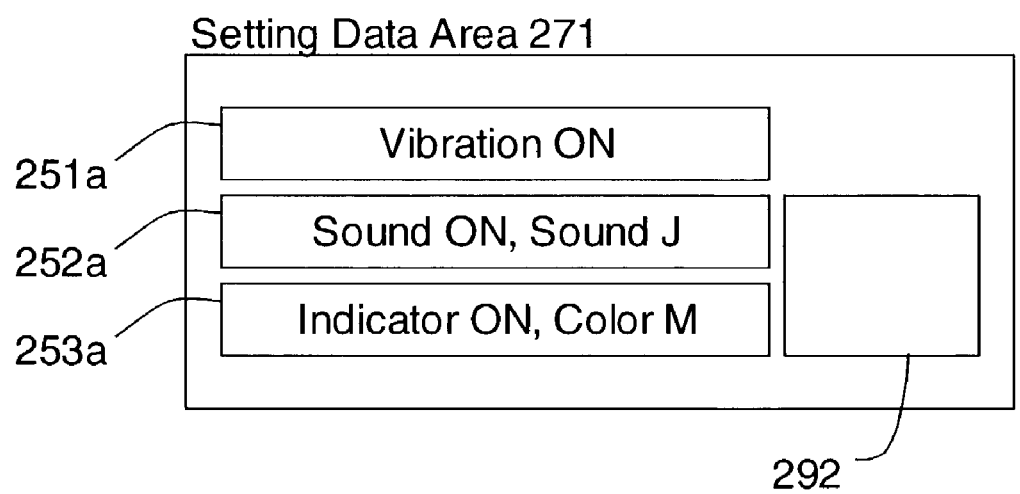
FIG. 49 is a block diagram illustrating an exemplary embodiment of the present invention.

As illustrated in FIG. 49, the notice mode is activated in the manner in compliance with the settings stored in setting data area 271 of RAM 206 (FIG. 1). In the example illustrated in FIG. 49, when the notice mode is activated, vibrator 217 (FIG. 1) is turned on in compliance with the data stored in area 251*a*, speaker 216 (FIG. 1) is turned on and sound data J is emitted therefrom in compliance with the data stored in area 252*a*, and indicator 212 (FIG. 1) is turned on and color M is emitted therefrom in compliance with the data stored in area 253*a*. Area 292 stores the stock purchase data, i.e., the name of the brand, the amount of limited price, the name of the stock market (such as NASDAQ and/or NYSE) and other relevant information regarding the stock purchase.

Figure 50:
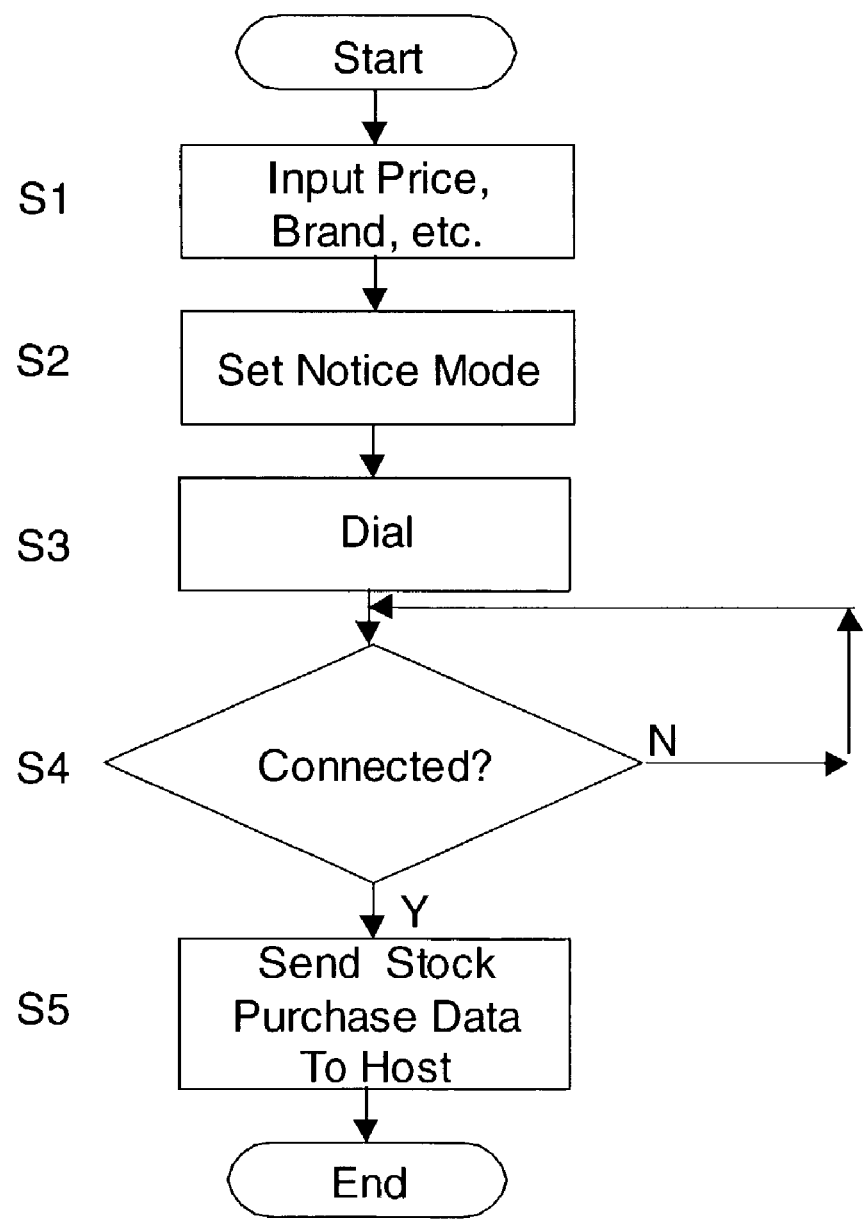
FIG. 50 is a flowchart illustrating an exemplary embodiment of the present invention.

As illustrated in FIG. 50, the user of communication device 200 inputs the stock purchase data from input device 210 (FIG. 1) or by the voice recognition system, which is stored in area 292 of RAM 206 (FIG. 49) (S1). By way of inputting specific data from input device 210, the property of notice mode (i.e., vibration ON/OFF, sound ON/OFF and the type of sound, indicator ON/OFF, and the type of color) is set and the relevant data are stored in area 271 (i.e., areas 251*a*, 252*a*, 253*a*) (FIG. 49) of RAM 206 by the programs stored in areas 251, 252, 253 of ROM 207 (FIG. 48) (S2). Communication device 200 initiates a dialing process (S3) until it is connected to host H (described hereinafter) (S4) and sends the stock purchase data thereto.

Figure 51:
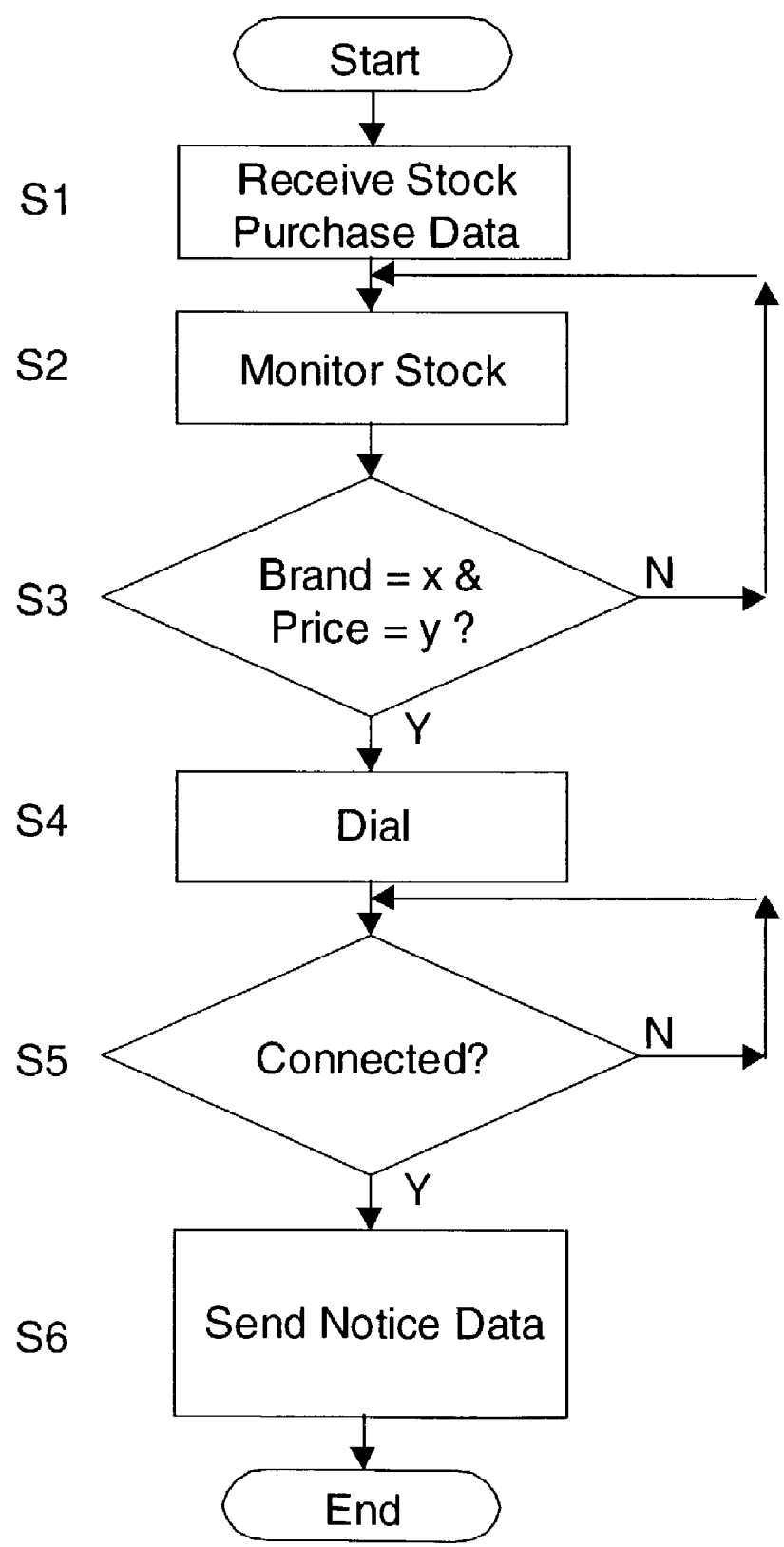
FIG. 51 is a flowchart illustrating an exemplary embodiment of the present invention.

FIG. 51 illustrates the operation of host H (not shown). As soon as host H receives the stock purchase data from communication device 200 (S1), it initiates to monitor the stock markets which is specified in the stock purchase data (S2). If host H detects that the price of the certain brand specified in the stock purchase data meets the limited price specified in the stock purchase data, (in the present example if the price of brand x is y) (S3), it initiates a dialing process (S4) until it is connected to communication device 200 (S5) and sends a notice data thereto (S6).

Figure 52:
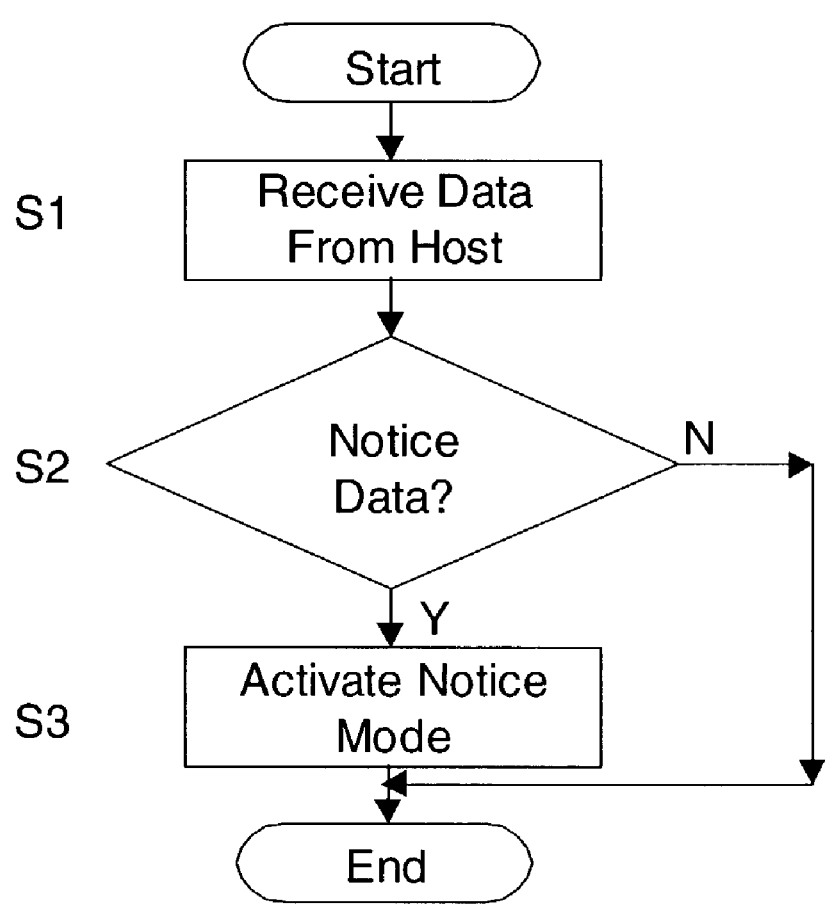
FIG. 52 is a flowchart illustrating an exemplary embodiment of the present invention.

As illustrated in FIG. 52, communication device 200 periodically monitors the data received from host H (not shown) (S1). If the data received is a notice data (S2), the notice mode is activated in the manner in compliance with the settings stored in setting data area 271 (FIG. 49) of RAM 206 (S3). In the example illustrated in FIG. 49, vibrator 217 (FIG. 1) is turned on, sound data J is emitted from speaker 216 (FIG. 1), and indicator 212 (FIG. 1) emits color M.

<<Stock Purchase—Summary>>

The foregoing invention may be summarized as the following.

A communication system consisting of a first computer and a second computer wherein said second computer is a wireless communication device including an antenna, a stock purchase data is input to said second computer, said first computer monitors one or more stock markets specified in said stock purchase data and sends a notice to said second computer, and said second computer responds in a specified manner upon receiving said notice from said antenna in a wireless fashion thereby enabling the user of said second computer to receive said notice regarding said stock purchase data in any location wherever he/she desires.

<<Timer Email>>

Figure 53A:
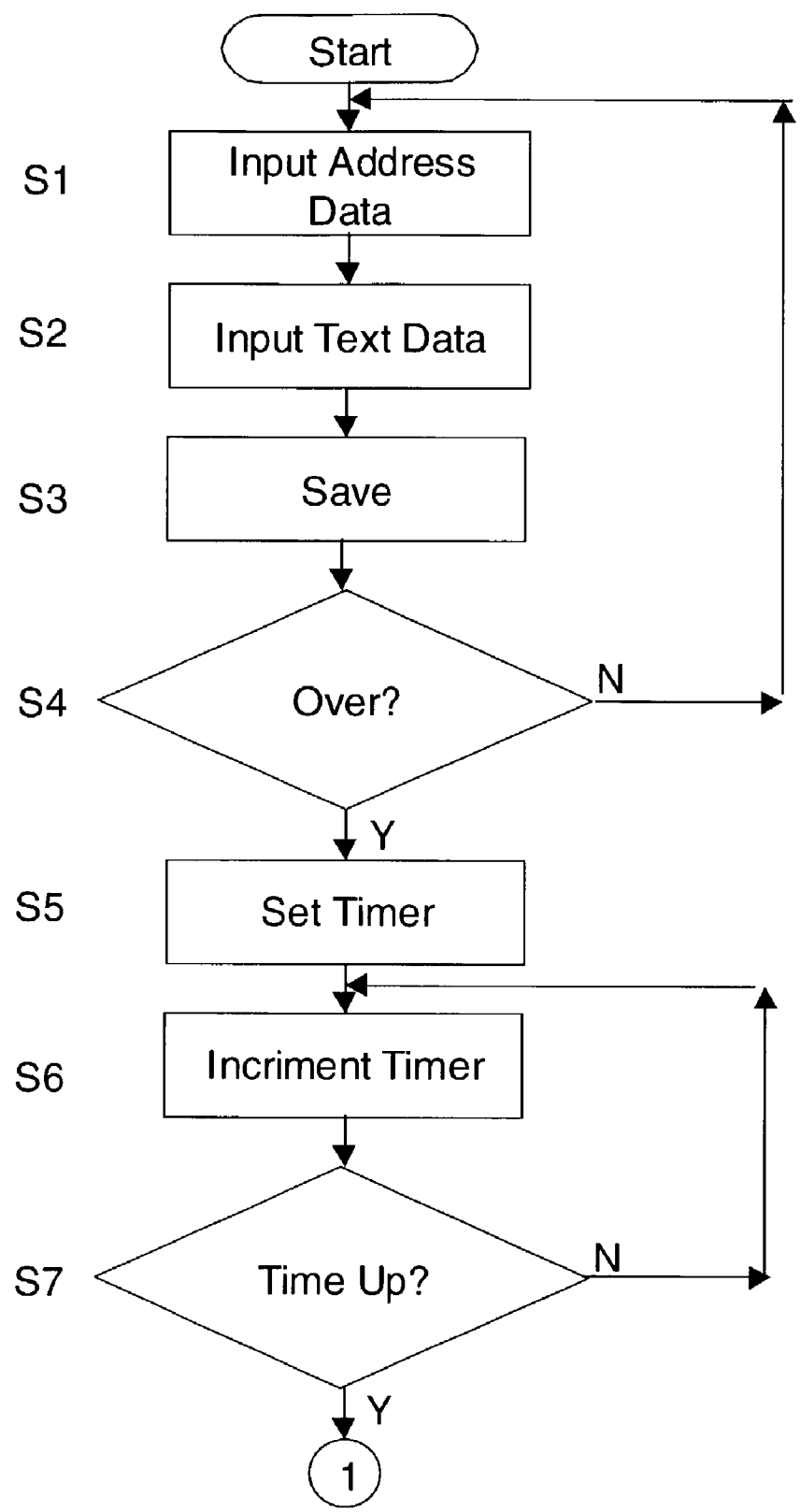
FIG. 53$a$ is a flowchart illustrating an exemplary embodiment of the present invention.
Figure 53B:
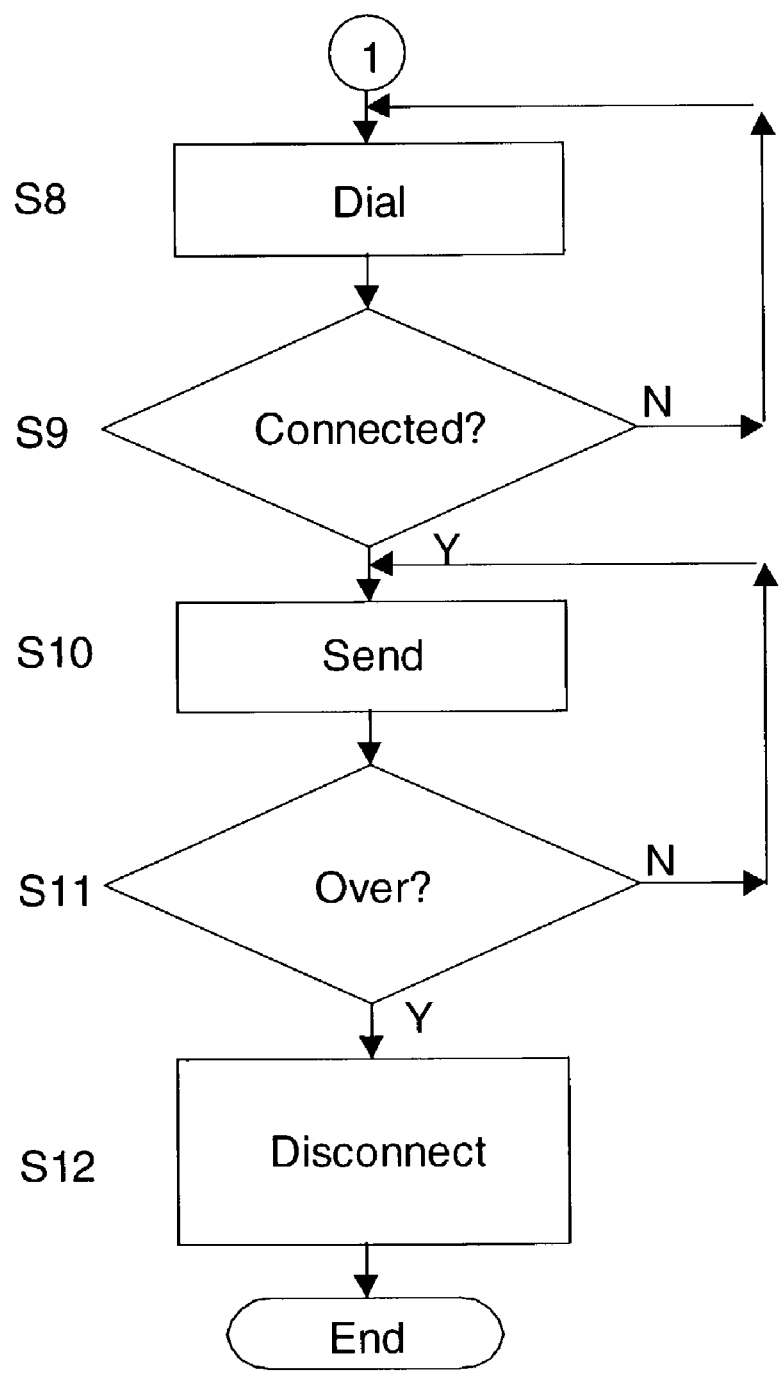

FIGS. 53*a* and 53*b* illustrate the method of sending emails from communication device 200 (FIG. 1) by utilizing a timer.

Address data, i.e., email address is input by input device 210 or by voice recognition system explained in FIG. 3, FIG. 4, FIG. 5, FIG. 13, FIG. 14, FIG. 14*a*, FIG. 15, FIG. 16 and/or FIG. 17 (S1) and the text data, the text of the email message is input by the same manner (S2). The address data and the text data are automatically saved in RAM 206 (FIG. 1) (S3). The sequence of S1 through S3 is repeated (i.e., writing more than one email) until a specified input signal is input from input device 210 (FIG. 1) or by utilizing the voice recognition system explained above. Once inputting both the address data and the text data (which also includes numeric data, images and programs) are completed a timer (not shown) is set by input device 210 or by utilizing the voice recognition system (S5), and the timer is incremented periodically (S6) until the timer value equals the predetermined value specified in S5 (S7). A dialing process is continued (S8) until the line is connected (S9) and the text data are sent thereafter to email addresses specified in S1 (S10). All of the emails are sent (S11) and the line is disconnected thereafter (S12).

As another embodiment of the present invention a specific time may be input by input device 210 and send the text data on the specific time (i.e., a broad meaning of "timer").

<<Timer Email—Summary>>

The foregoing invention may be summarized as the following.

A communication device consisting of a text data input means which inputs one or more text data, a storage means which stores said text data, a sending means which sends said text data which is input by said input means, and a timer means which activates said sending means at a predetermined time wherein said text data input means input said text data, said storage means stores said text data input by said text data input means, said timer means activates said sending means at said predetermined time, and said sending means sends said text data at said predetermined time thereby enabling the user of said communication device to send said text data at said predetermined time at which said user is not able to send said text data.

<<Call Blocking>>

Figure 54:
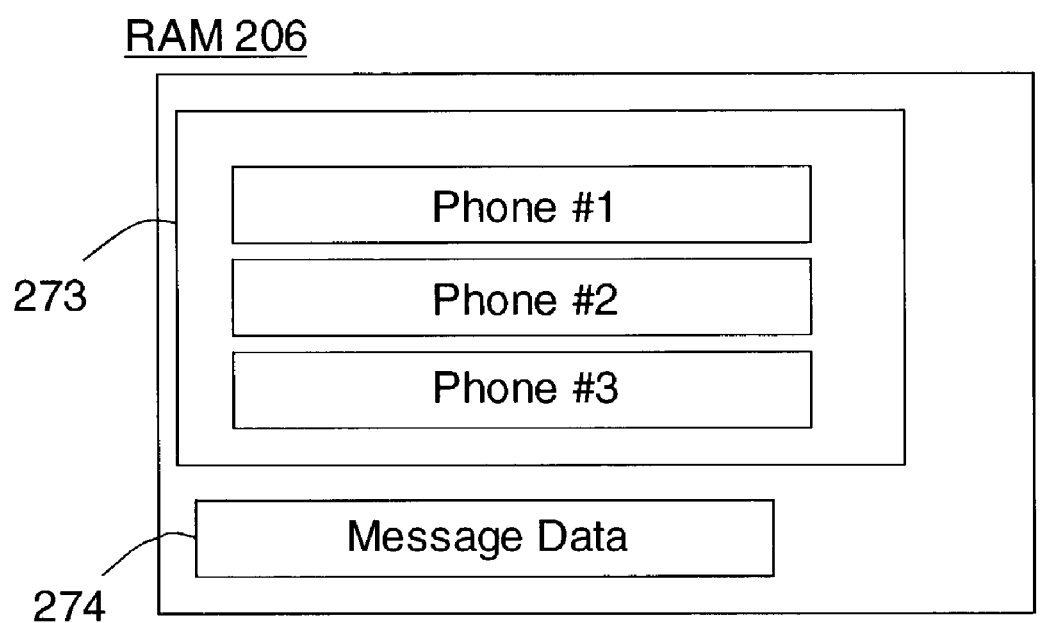
FIG. 54 is a block diagram illustrating an exemplary embodiment of the present invention.
Figure 55:
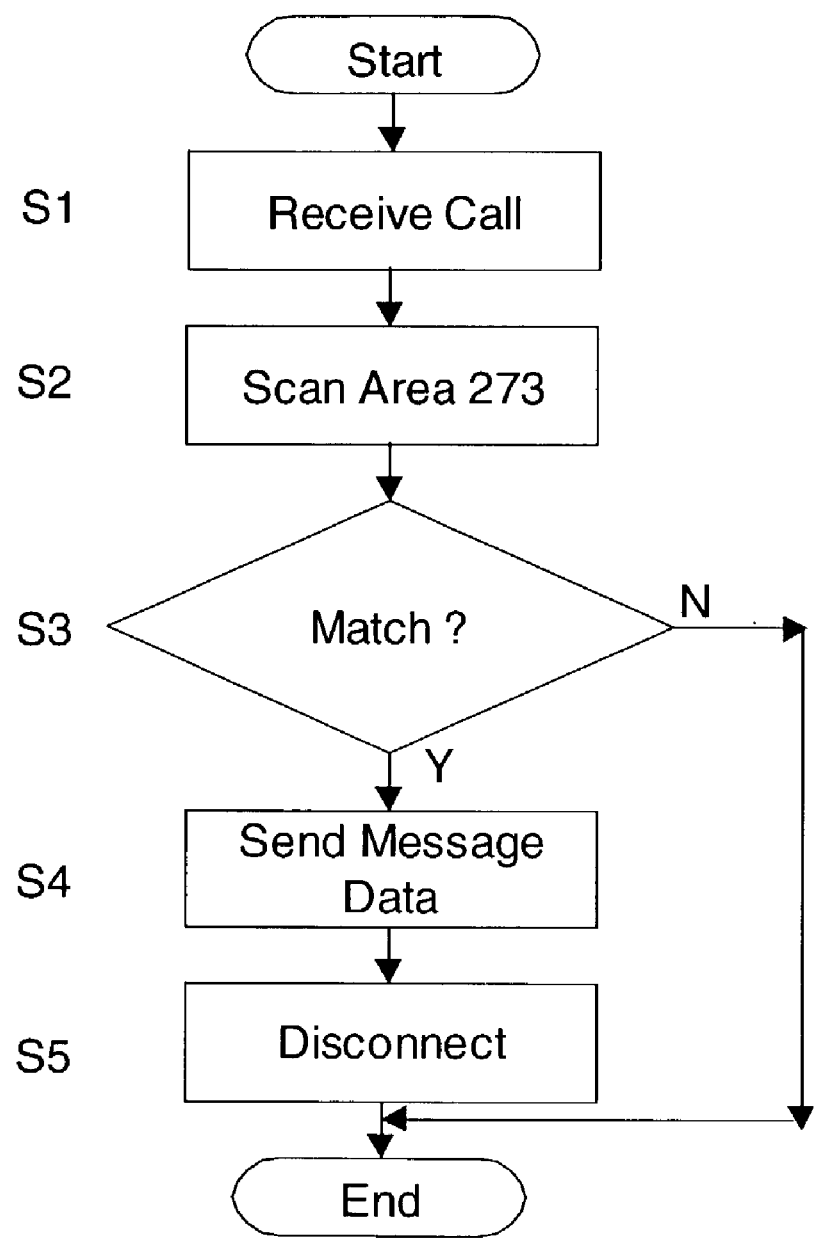
FIG. 55 is a flowchart illustrating an exemplary embodiment of the present invention.
Figure 56:
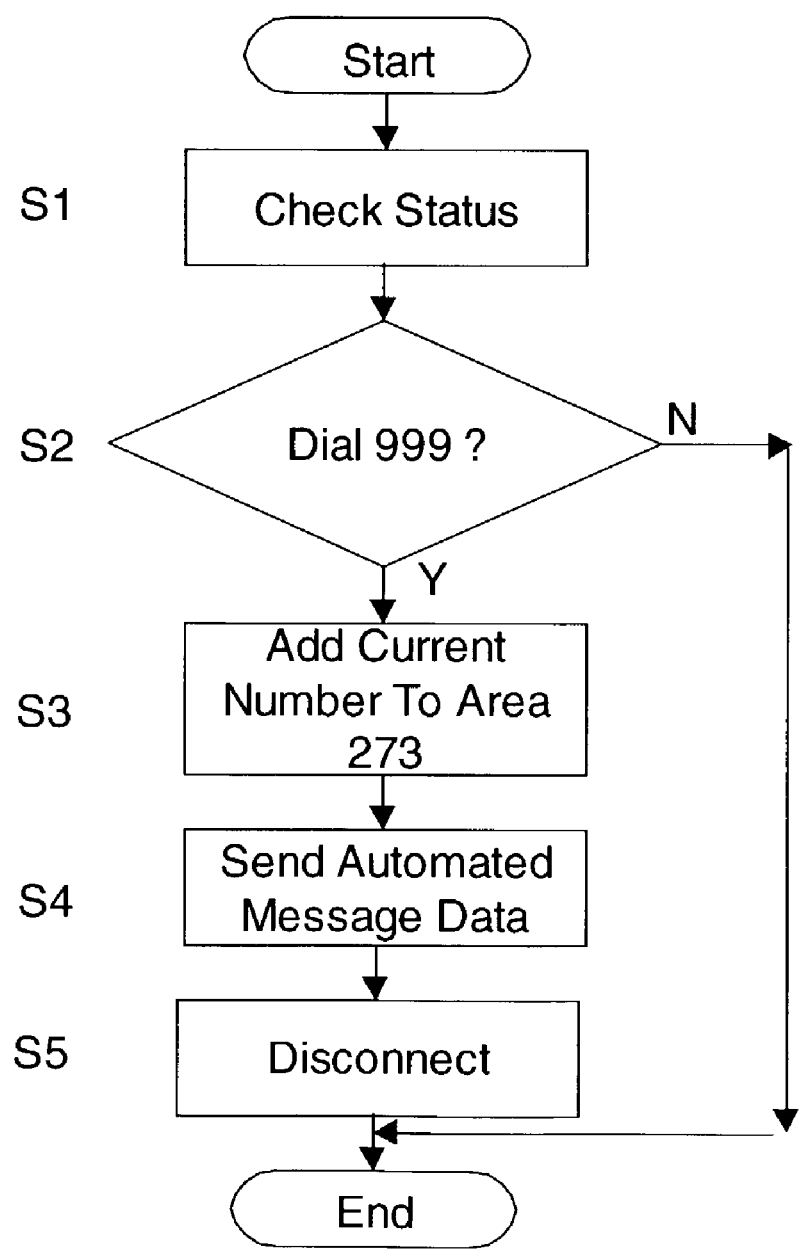
FIG. 56 is a flowchart illustrating an exemplary embodiment of the present invention.

FIGS. 54 through 56 illustrates the so-called "call blocking" function of communication device 200 (FIG. 1).

As illustrated in FIG. 54, RAM 206 (FIG. 1) includes area 273 and area 274. Area 273 stores phone numbers that should be blocked. In the example illustrated in FIG. 54, phone #1, phone #2, and phone #3 are blocked. Area 274 stores a message data, preferably a wave data, stating that the phone can not be connected.

FIG. 55 illustrates the operation of communication device 200. When communication device 200 receives a call (S1), CPU 211 (FIG. 1) scans area 273 (FIG. 54) of RAM 206 (S2). If the phone number of the incoming call matches one of the phone numbers stored in area 273 (S3), CPU 211 sends the message data stored in area 274 (FIG. 54) of RAM 206 to the caller device (S4) and disconnects the line (S5).

FIG. 56 illustrates the method of updating area 273 (FIG. 54) of RAM 206. Assuming that the phone number of the incoming call does not match any of the phone numbers stored in area 273 of RAM 206 (see S3 of FIG. 55). In that case, communication device 200 is connected to the caller device. However, the user of communication device 200 may decide to have such number "blocked" after all. If that is the case, the user dials "999" while the line is connected. Technically CPU 211 (FIG. 1) periodically checks the signals input from input device 210 (FIG. 1) (S1). If the input signal represents a numerical data "999"! from input device 210 (S2), CPU 211 adds the phone number of the pending call to area 273 (S3) and sends the message data stored in area 274 (FIG. 54) of RAM 206 to the caller device (S4). The line is disconnected thereafter (S5).

Figure 57:
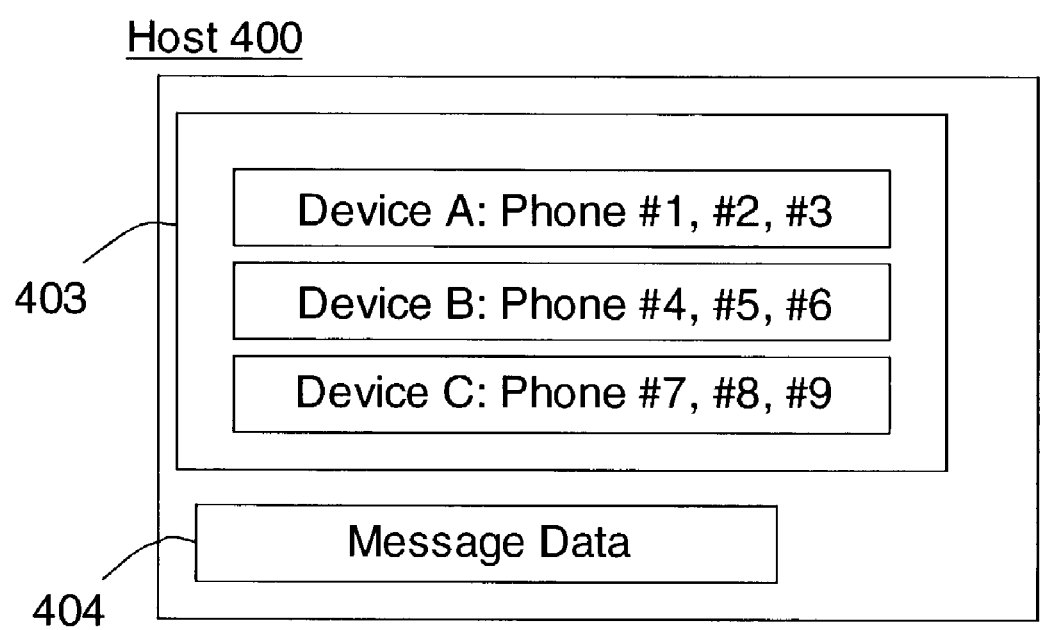
FIG. 57 is a block diagram illustrating an exemplary embodiment of the present invention.
Figure 58:
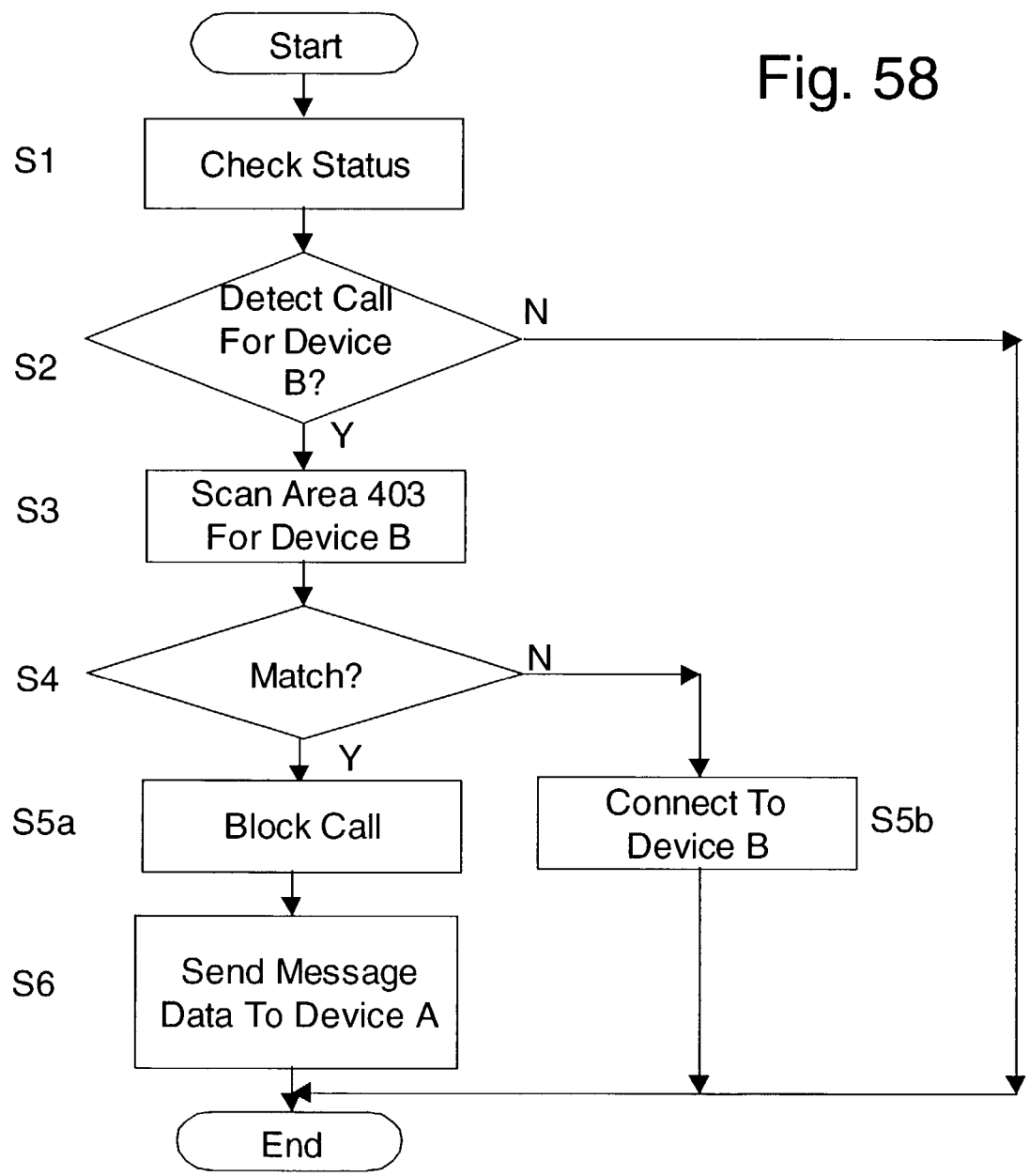
FIG. 58 is a flowchart illustrating an exemplary embodiment of the present invention.
Figure 59:
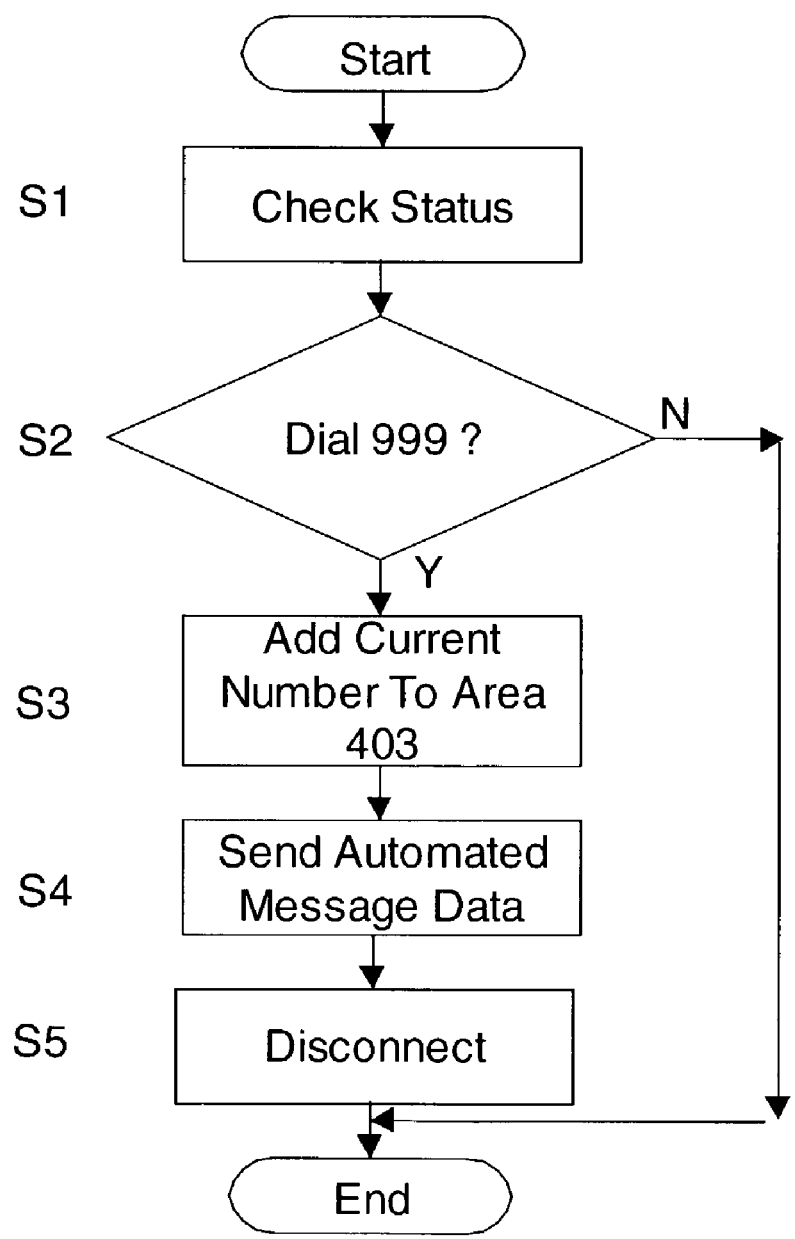
FIG. 59 is a flowchart illustrating an exemplary embodiment of the present invention.

FIGS. 57 through 59 illustrate another embodiment of the present invention.

As illustrated in FIG. 57, host H (not shown) includes area 403 and area 404. Area 403 stores phone numbers that should be blocked to be connected to communication device 200. In the example illustrated in FIG. 57, phone #1, phone #2, and phone #3 are blocked for device A; phone #4, phone #5, and phone #6 are blocked for device B; and phone #7, phone #8, and phone #9 are blocked for device C. Area 404 stores a message data stating that the phone can not be connected.

FIG. 58 illustrates the operation of host H (not shown). Assuming that the caller device is attempting to connect to device B, communication device. Host H periodically checks the signals from all communication device 200 (S1). If host H detects a call for device B (S2), it scans area 403 (FIG. 57) (S3) and checks whether the phone number of the incoming call matches one of the phone numbers stored therein for device B (S4). If the phone number of the incoming call does not match any of the phone numbers stored in area 403, the line is connected to device B (S5b). On the other hand, if the phone number of the incoming call matches one of the phone numbers stored in area 403, the line is "blocked," i.e., not connected to device B (S5a) and host H sends the massage data-stored in area 404 (FIG. 57) to the caller device (S6).

FIG. 59 illustrates the method of updating area 403 (FIG. 57) of host H. Assuming that the phone number of the incoming call does not match any of the phone numbers stored in area 403 (see S4 of FIG. 58). In that case, host H allows the connection between the caller device and communication device 200, however, the user of communication device 200 may decide to have such number "blocked" after all. If that is the case, the user simply dials "999" while the line is connected. Technically host H (FIG. 57) periodically checks the signals input from input device 210 (FIG. 1) (S1). If the input signal represents "999" from input device 210 (FIG. 1) (S2), host H adds the phone number of the pending call to area 403 (S3) and sends the message data stored in area 404 (FIG. 57) to the caller device (S4). The line is disconnected thereafter (S5).

As another embodiment of the method illustrated in FIG. 59, host H (FIG. 57) may delegate some of its tasks to communication device 200 (this embodiment is not shown in drawings). Namely, communication device 200 periodically checks the signals input from input device 210 (FIG. 1). If the input signal represents a numeric data "999" from input device 210, communication device 200 sends to host H a block request signal as well as with the phone number of the pending call. Host H, upon receiving the block request signal from communication device 200, adds the phone number of the pending call to area 403 (FIG. 57) and sends the message data stored in area 404 (FIG. 57) to the caller device. The line is disconnected thereafter.

<<Call Blocking—Summary>>

The foregoing invention may be summarized as the following.

(1) A communication system consisting of a communication device and a blocked number storage means wherein an incoming call is prevented from being connected to said communication device if the phone number of said incoming call is included in said blocked number storage means thereby preventing the user of said communication device from being disturbed from unnecessary calls.

(2) A communication system consisting of a communication device and a blocked number storage means wherein a pending call is disconnected from said communication device if a predetermined signal is input to said communication device and the phone number of said pending call is included in said blocked number storage means thereby preventing the user of said communication device from being disturbed from unnecessary calls.

<<Online Payment>>

FIGS. 60 through 64 illustrate the method of online payment by utilizing communication device 200 (FIG. 1).

Figure 60:
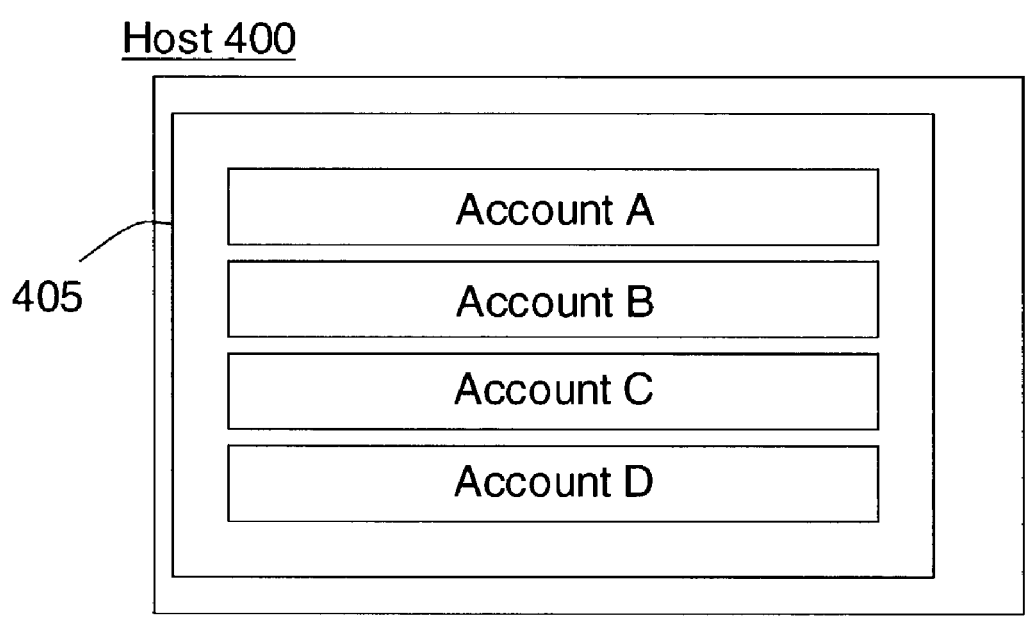
FIG. 60 is a block diagram illustrating an exemplary embodiment of the present invention.

As illustrated in FIG. 60, host H includes account data storage area 405. All of the account data of the users of communication device 200 who have signed up for the online payment service are stored in area 405. In the example described in FIG. 60, account A stores the relevant account data of the user using device A; account B stores the relevant account data of the user using device B; account C stores the relevant account data of the user using device C; and account D stores the relevant account data of the user using device D. Here, device A, B, C, and D are communication device 200.

Figure 61A:
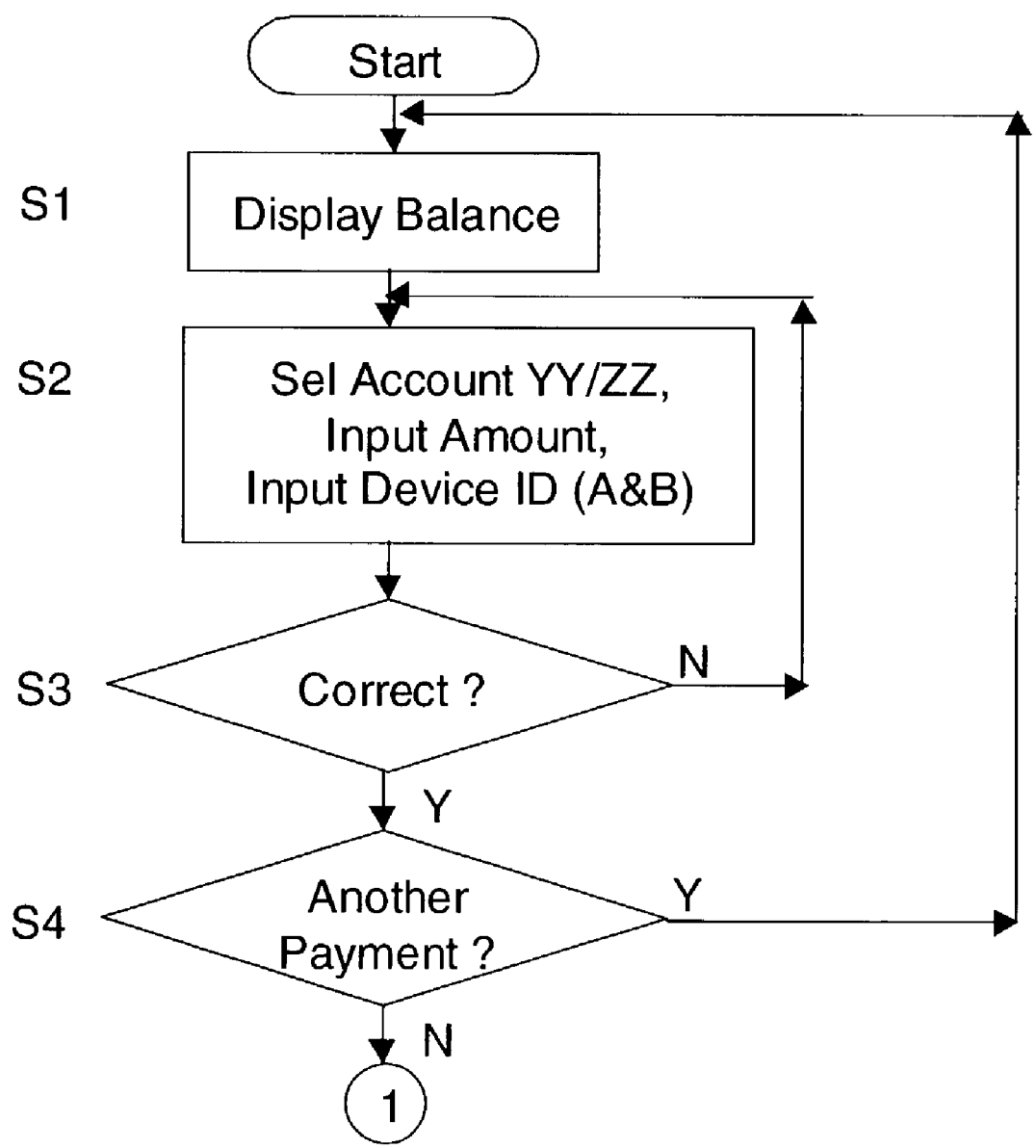
FIG. 61$a$ is a flowchart illustrating an exemplary embodiment of the present invention.
Figure 61B:
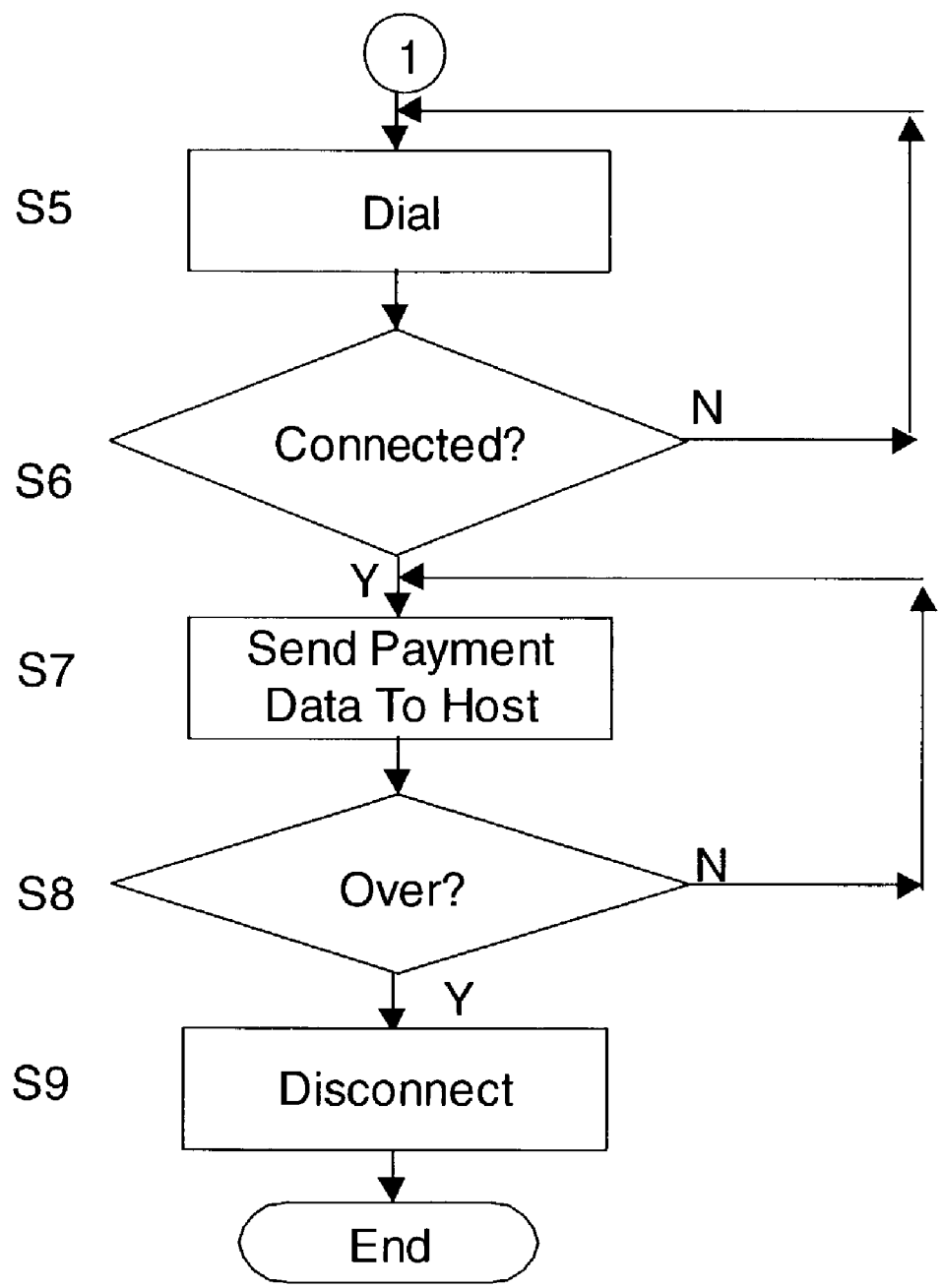

FIGS. 61a and 61b illustrate the operation of the payer device, communication device 200. Assuming that device A is the payer device and device B is the payee device. Account A explained in FIG. 60 stores the account data of the user of device A, and account B explained in the same drawing stores the account data of the user of device B. As illustrated in FIG. 61a, LCD 201 (FIG. 1) of device A displays the balance of account A by receiving the relevant data from host H (FIG. 60) (S1). From the signal input from input device 210 (FIG. 1), the payer's account and the payee's account are selected (in the present example, account A as the payer's account and account B as the payee's account are selected), and the amount of payment and the device ID (in the present example, device A as the payer's device and device B as the payee's device) are input via input device 210 (S2). If the data input from input device 210 is correct (S3), CPU 211 (FIG. 1) of device A prompts for other payments. If there are other payments to make, the sequence of S1 through S3 is repeated until all of the payments are made (S4). The dialing process is initiated and repeated thereafter (S5) until the line is connected to host H (FIG. 60) (S6). Once the line is connected, device A sends the payment data to host H (S7). The line is disconnected when all of the payment data including the data produced in S2 are sent to host H (S8 and S9).

Figure 62:
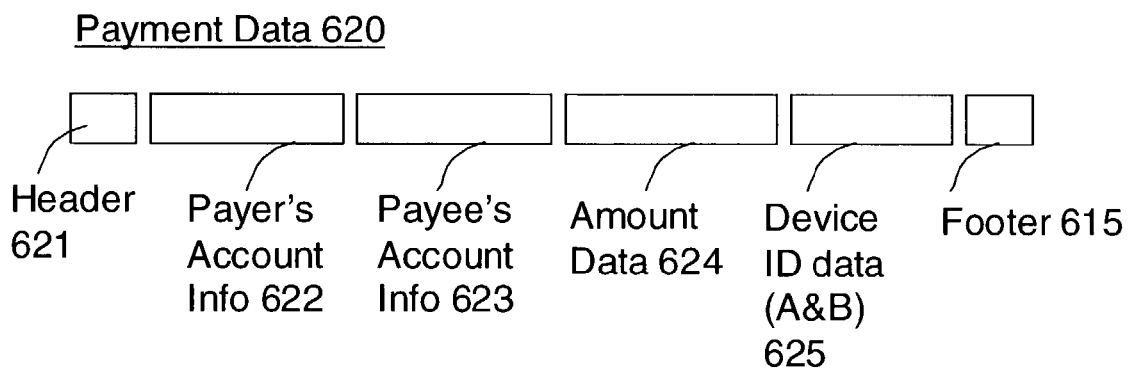
FIG. 62 is a simplified illustration illustrating an exemplary embodiment of the present invention.

FIG. 62 illustrates the payment data described in S7 of FIG. 61b. Payment data 620 is composed of header 621, payer's account information 622, payee's account information 623, amount data 624, device ID data 625, and footer 615. Payer's account information 622 represents the information regarding the payer's account data stored in host H (FIG. 60) which is, in the present example, account A. Payee's account information 623 represents the information regarding the payee's account data stored in host H which is, in the present example, account B. Amount data 624 represents the amount of monetary value either in the U.S. dollars or in other currencies which is to be transferred from the payer's account to the payee's account. The device ID data represents the data of the payer's device and the payee's device, i.e., in the present example, device A and device B.

Figure 63:
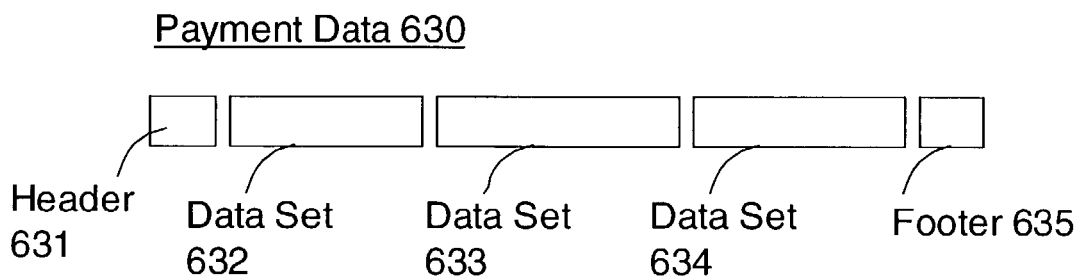
FIG. 63 is a simplified illustration illustrating an exemplary embodiment of the present invention.

FIG. 63 illustrates the basic structure of the payment data described in S7 of FIG. 61b when multiple payments are made, i.e., when more than one payment is made in S4 of FIG. 61a. Assuming that three payments are made in S4 of FIG. 61a. In that case, payment data 630 is composed of header 631, footer 635, and three data sets, i.e., data set 632, data set 633, data set 634. Each data set represents the data components described in FIG. 62 excluding header 621 and footer 615.

Figure 64:
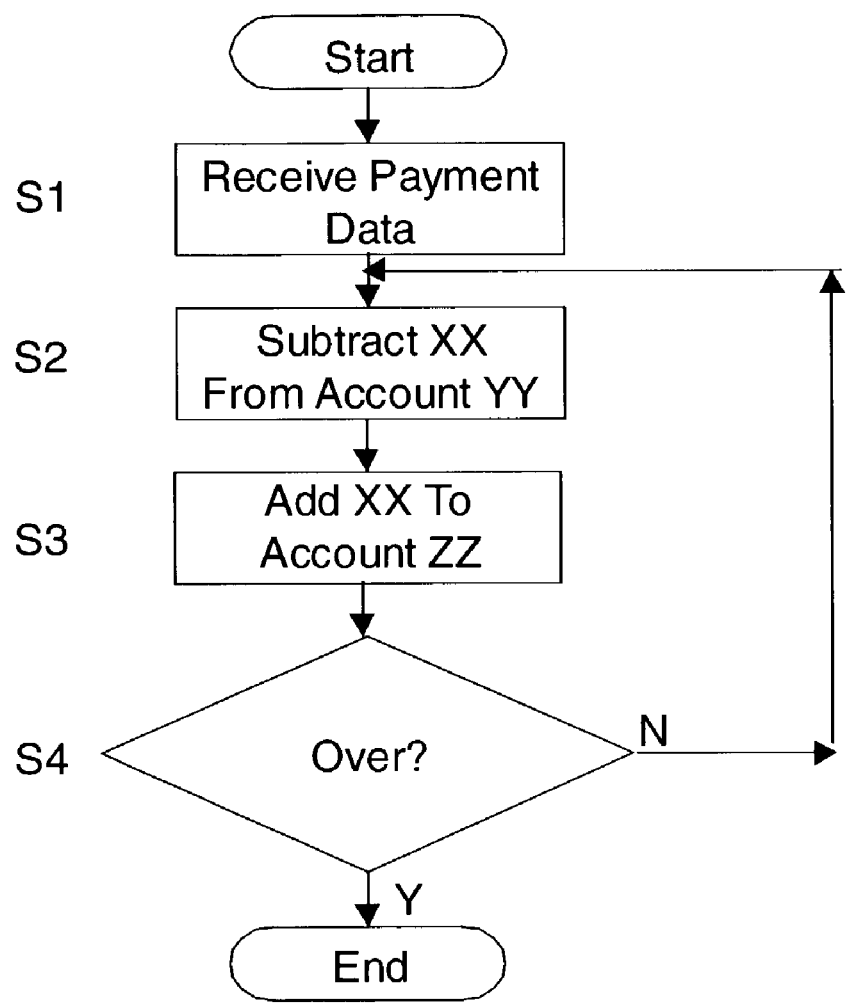
FIG. 64 is a flowchart illustrating an exemplary embodiment of the present invention.

FIG. 64 illustrates the operation of host H (FIG. 60). After receiving payment data from device A described in FIGS. 62 and 63, host H retrieves therefrom the payer's account information (in the present example account A), the payee's account information (in the present example account B), the amount data which represents the monetary value, and the device IDs of both the payer's device and the payee's device (in the present example device A and device B) (S1). Host H, based on such data, subtracts the monetary value represented by the amount data from the payer's account (in the present example account A) (S2), and adds the same amount to the payee's account (in the present example account B) (S3). If there are other payments to make, i.e., if host H received a payment data which has a structure of the one described in FIG. 63, the sequence of S2 and S3 is repeated as many times as the amount of the data sets are included in such payment data.

<<Online Payment—Summary>>

The foregoing invention may be summarized as the following.

An online payment system consisting of a host and a first device and a second device wherein said host and said first device are connected in a wireless fashion; said host and said second device are also connected in a wireless fashion; said host stores a first account data of said first device and a second account data of said second device; a payment data which includes an amount data representing monetary value, said first account data, and said second account data is input into said first device; said payment data is sent to said host in a wireless fashion; and said host subtracts the value represented by said amount data from said first account data and adds the same value to said second account data thereby enables the users of said first device and said second device to initiate transactions and payments at any location wherever they desire <<Navigation System>>

FIGS. 65 through 74 illustrate the navigation system of communication device 200 (FIG. 1).

Figure 65:
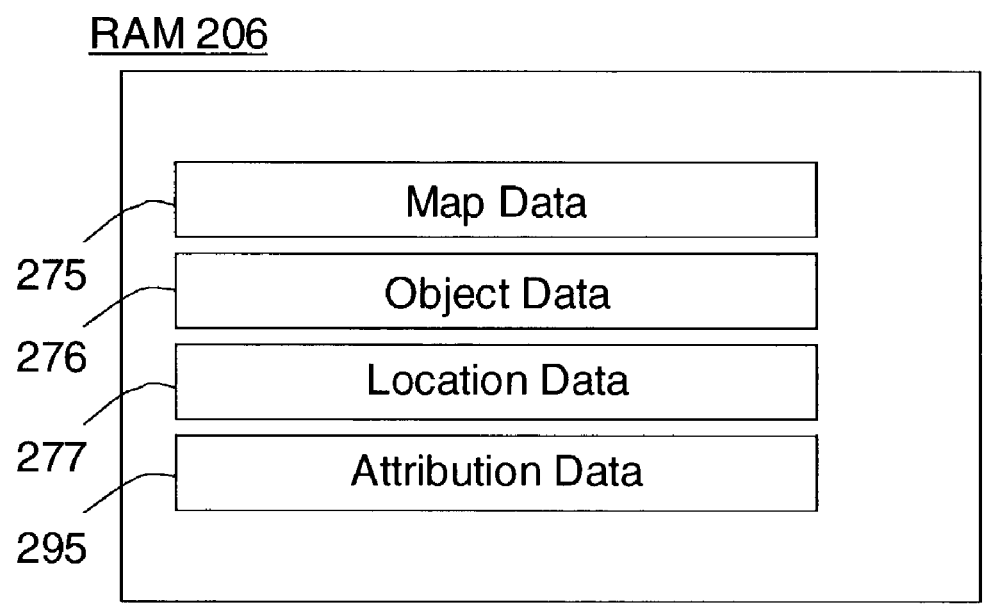
FIG. 65 is a block diagram illustrating an exemplary embodiment of the present invention.

As illustrated in FIG. 65, RAM 206 (FIG. 1) includes area 275, area 276, area 277, and area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called "texture mapping" which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in area 276. Area 277 also stores a plurality of data representing the street address of each object stored in area 276. In addition, area 277 stores the current position data of communication device 200 and the destination data which are explained in details hereafter. The map data stored in area 275 and the location data stored in area 277 are linked each other. Area 295 stores a plurality of attribution data attributing to the map data stored in area 275 and location data stored in area 277, such as road blocks, traffic accidents, and road constructions, and traffic jams. The attribution data stored in area 295 is updated periodically by receiving an updated data from a host (not shown).

Figure 66:
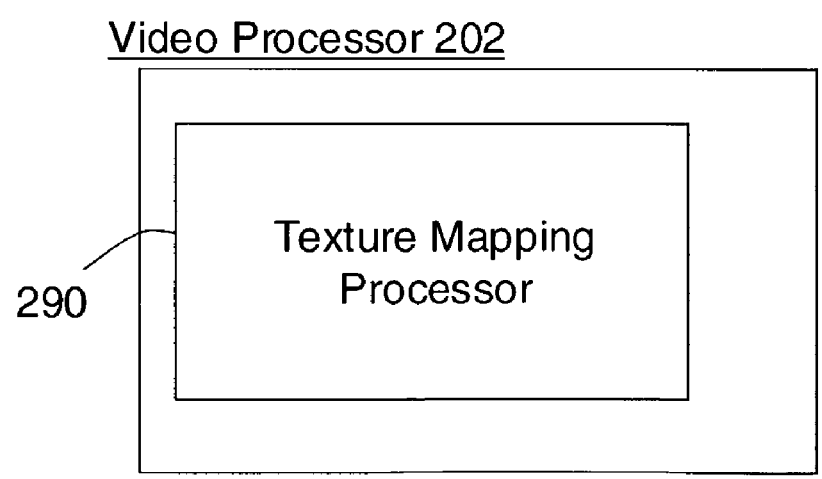
FIG. 66 is a block diagram illustrating an exemplary embodiment of the present invention.

As illustrated in FIG. 66, video processor 202 (FIG. 1) includes texture mapping processor 290. Texture mapping processor 290 produces polygons in a three-dimensional space and "pastes" textures to each polygon. The concept of such method is described in the following patents. U.S. Pat. No. 5,870,101, U.S. Pat. No. 6,157,384, U.S. Pat. No. 5,774,125, U.S. Pat. No. 5,375,206, and/or U.S. Pat. No. 5,925,127.

Figure 67:
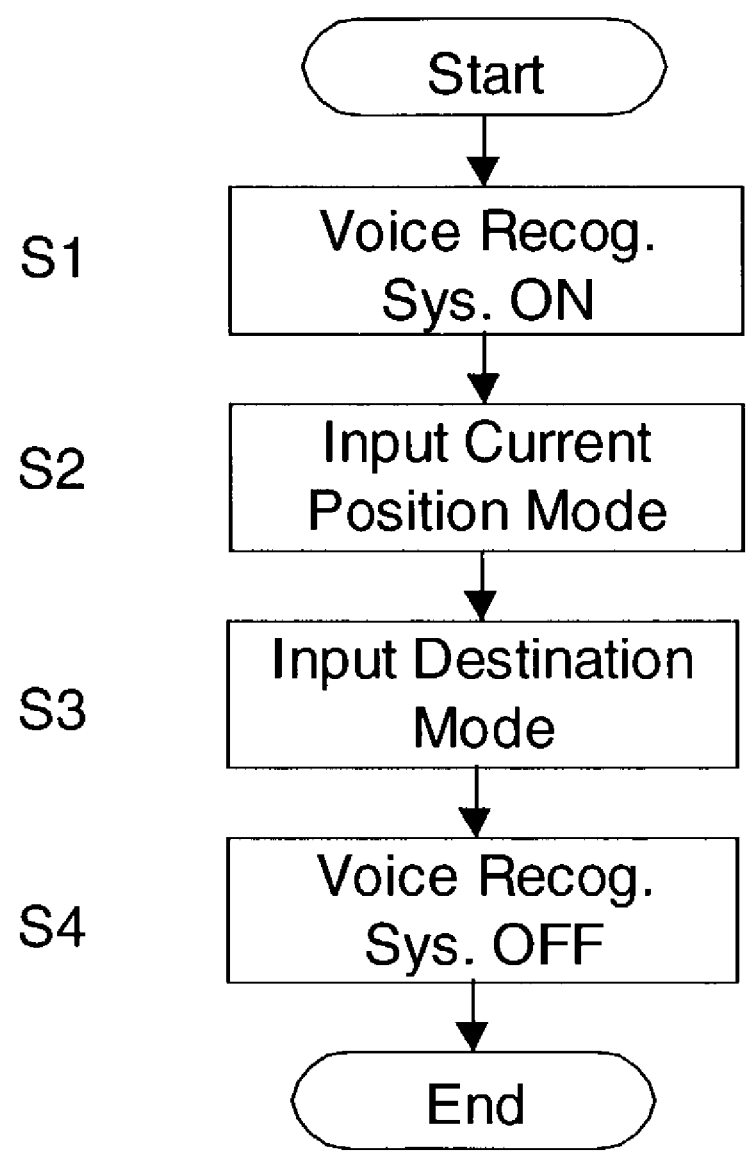
FIG. 67 is a flowchart illustrating an exemplary embodiment of the present invention.

As illustrated in FIG. 67, the voice recognition system is activated when the CPU 211 (FIG. 1) detects a specific signal input from input device 210 (FIG. 1) (S1). After the voice recognition system is activated, the input current position mode starts and the current position of communication device 200 is input by voice recognition system explained in FIG. 3, FIG. 4, FIG. 5, FIG. 13, FIG. 14, FIG. 14a, FIG. 15, FIG. 16 and/or FIG. 17 (S2). The current position can also be input from input device 210. As another embodiment of the present invention, the current position can automatically be detected by the method so-called "global positioning system" or "GPS" as illustrated in FIGS. 20a through 26 and input the current data therefrom. After the process of inputting the current data is completed, the input destination mode starts and the destination is input by the voice recognition system explained above or by the input device 210 (S3), and the voice recognition system is deactivated after the process of inputting the destination data is completed by utilizing such system (S4).

Figure 68:
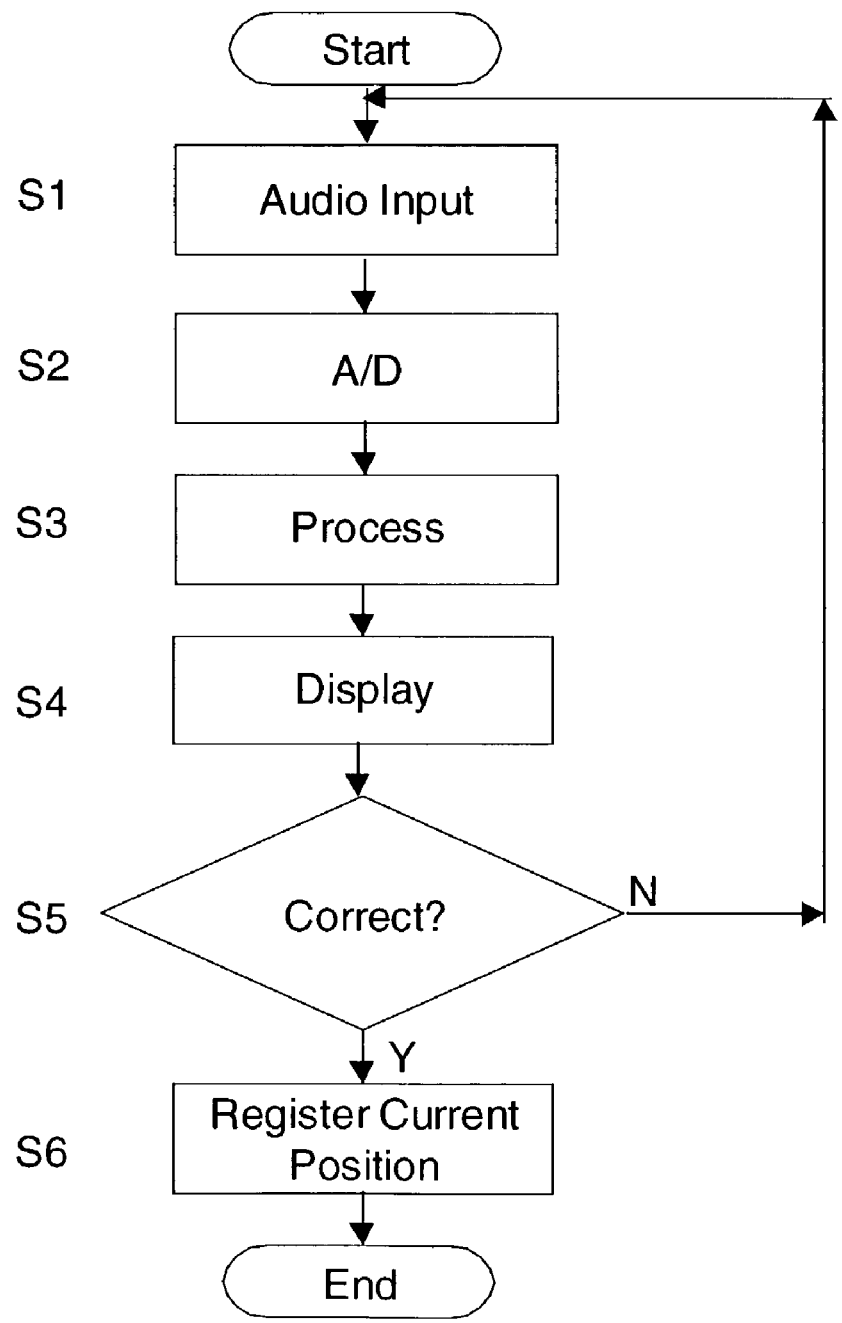
FIG. 68 is a flowchart illustrating an exemplary embodiment of the present invention.

FIG. 68 illustrates the sequence of the input current position mode described in S2 of FIG. 67. When analog audio data is input from microphone 215 (FIG. 1) (S1), such data is converted into digital audio data by A/D 213 (FIG. 1) (S2). The digital audio data is processed by sound processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by input device 210 (FIG. 1) and/or can be automatically input by utilizing the method so-called "global positioning system" or "GPS" as described hereinbefore.

Figure 69:
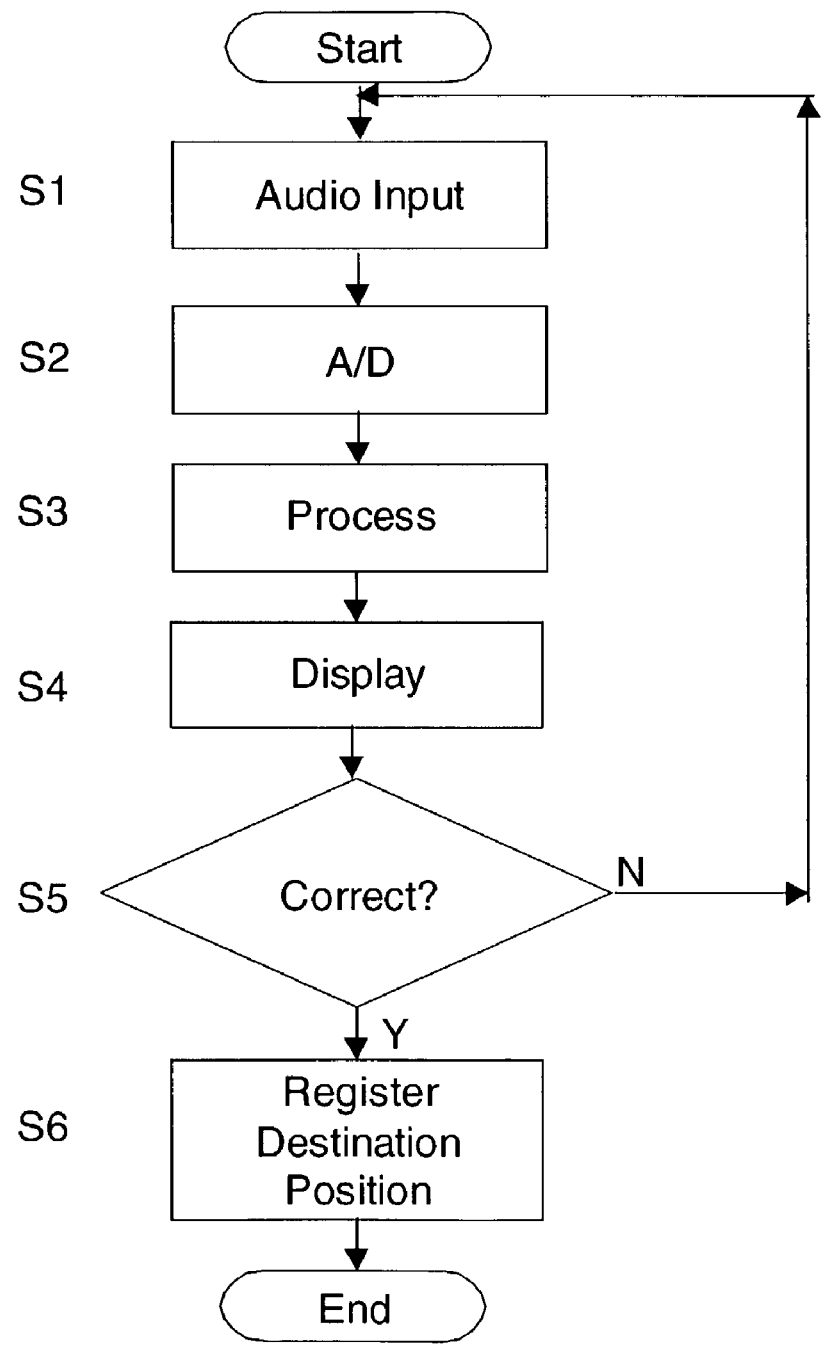
FIG. 69 is a flowchart illustrating an exemplary embodiment of the present invention.

FIG. 69 illustrates the sequence of the input destination mode described in S3 of FIG. 67. When analog audio data is input from microphone 215 (FIG. 1) (S1), such data is converted into digital audio data by A/D 213 (FIG. 1) (S2). The digital audio data is processed by sound processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as destination data (S6).

Figure 70:
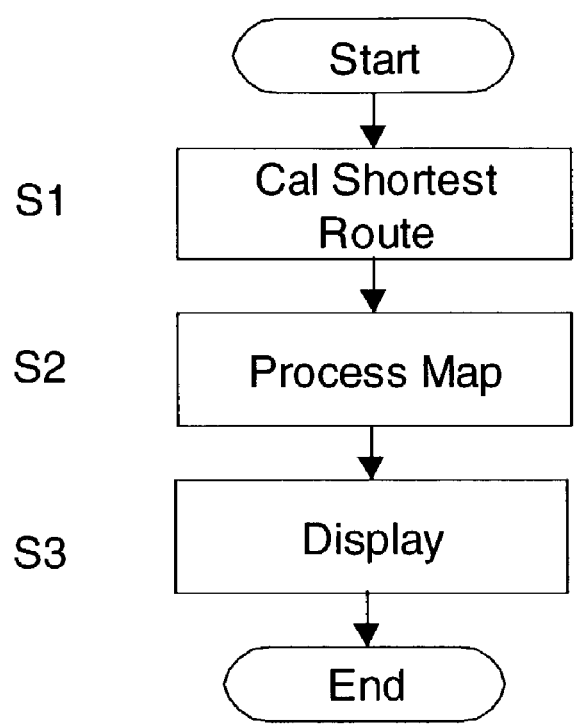
FIG. 70 is a flowchart illustrating an exemplary embodiment of the present invention.

FIG. 70 illustrates the sequence of displaying the shortest route from the current position to the destination. CPU 211 (FIG. 1) retrieves both the current position data and the destination data which are input by the method described in FIGS. 67 through 69 from area 277 (FIG. 65) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from area 275 (FIG. 65) of RAM 206 (S2).

As another embodiment of the present invention, by way of utilizing the location data stored in area 277, CPU 211 may produce a three-dimensional map by composing the three dimensional objects (by method so-called "texture mapping" as described above) which are stored in area 276 (FIG. 65) of RAM 206. The two-dimensional map and/or the three dimensional map is displayed on LCD 201 (FIG. 1) (S3).

As another embodiment of the present invention, the attribution data stored in area 295 (FIG. 65) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of communication device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from area 277 (FIG. 65) of RAM 206. Then CPU 211 retrieves a plurality of object data which correspond to such location data from area 276 (FIG. 65) of RAM 206 and displays a plurality of objects on LCD 201 based on such object data in a manner the user of communication device 200 may observe from the current location.

Figure 71:
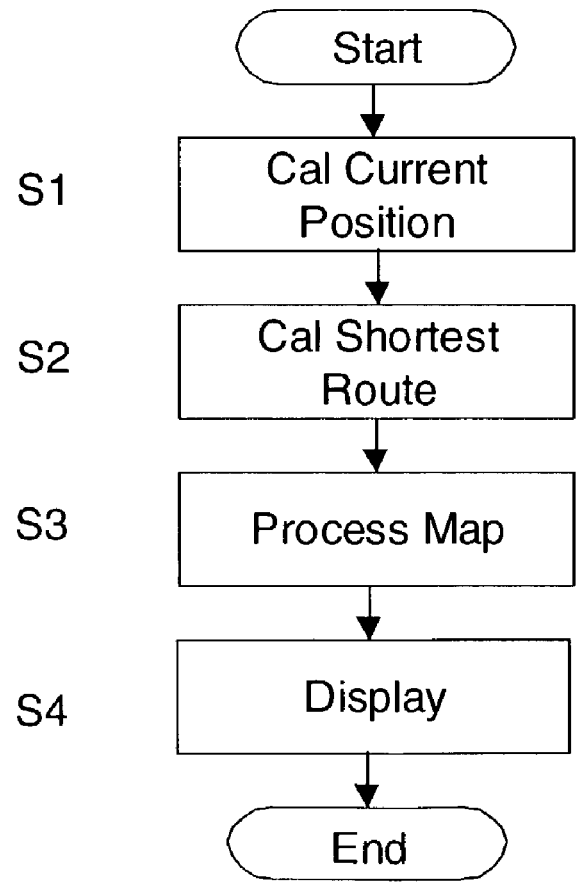
FIG. 71 is a flowchart illustrating an exemplary embodiment of the present invention.

FIG. 71 illustrates the sequence of updating the shortest route to the destination while communication device 200 is moving. By way of periodically and automatically inputting the current position by the method so-called "global positioning system" or "GPS" as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from area 275 (FIG. 65) of RAM 206 (S3). Instead, by way of utilizing the location data stored in area 277 (FIG. 65), CPU 211 may produce a three-dimensional map by composing the three dimensional objects by method so-called "texture mapping" which are stored in area 276 (FIG. 65) of RAM 206. The two-dimensional map and/or the three-dimensional map is displayed on LCD 201 (FIG. 1) (S4). The shortest route to the destination is re-highlighted by a significant color (such as red) to enable the user of communication device 200 to easily recognize the updated route on LCD 201.

Figure 72:
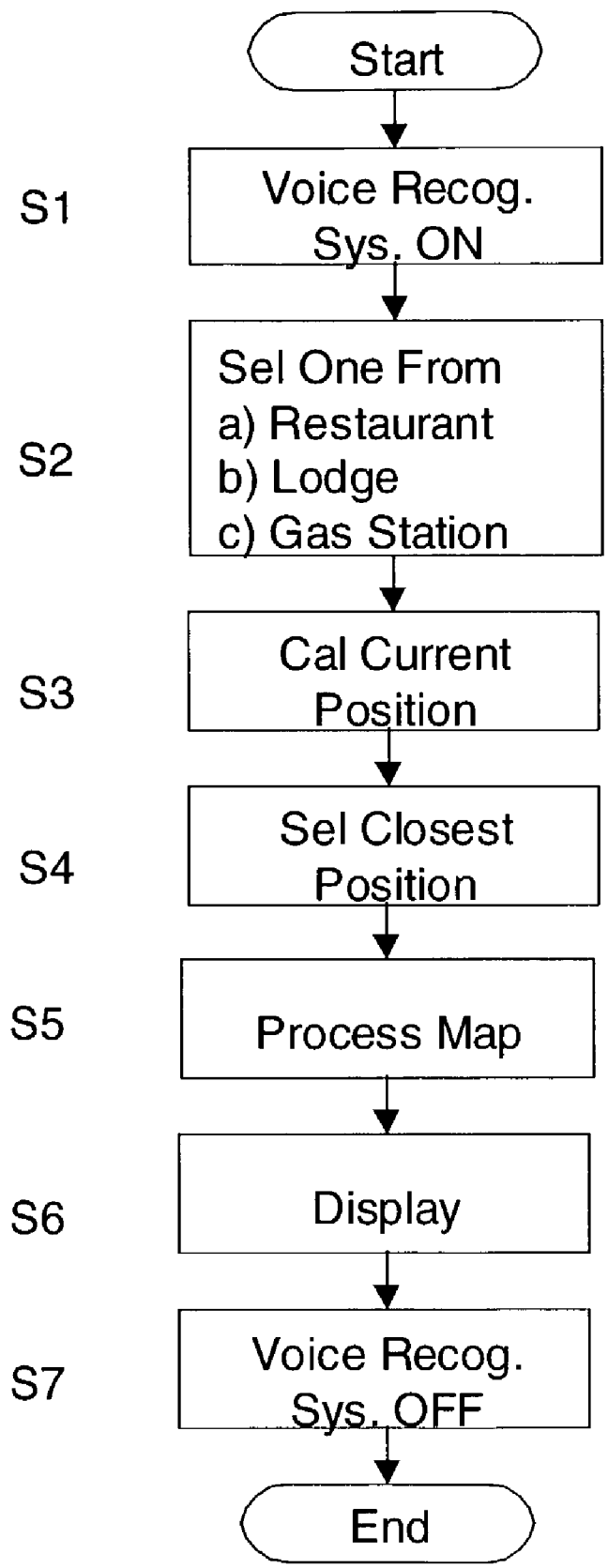
FIG. 72 is a flowchart illustrating an exemplary embodiment of the present invention.

FIG. 72 illustrates the method of finding the shortest location of the desired facility, such as restaurant, hotel, gas station, etc. The voice recognition system is activated in the manner described in FIG. 67 (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in FIG. 68 and/or FIG. 71 (S3). From the data selected in S2, CPU 211 scans area 277 (FIG. 65) of RAM 206 and searches the location of the facilities of the selected category (such as restaurant) which is the closest to the current position (S4). CPU 211 then retrieves the relevant two-dimensional map data which should be displayed on LCD 201 from area 275 of RAM 206 (FIG. 65) (S5). Instead, by way of utilizing the location data stored in 277 (FIG. 65), CPU 211 may produce a three-dimensional map by composing the three dimensional objects by method so-called "texture mapping" which are stored in area 276 (FIG. 65) of RAM 206. The two-dimensional map and/or the three dimensional map is displayed on LCD 201 (FIG. 1) (S6). The shortest route to the destination is re-highlighted by a significant color (such as red) to enable the user of communication device 200 to easily recognize the updated route on LCD 201. The voice recognition system is deactivated thereafter (S7).

Figure 73:
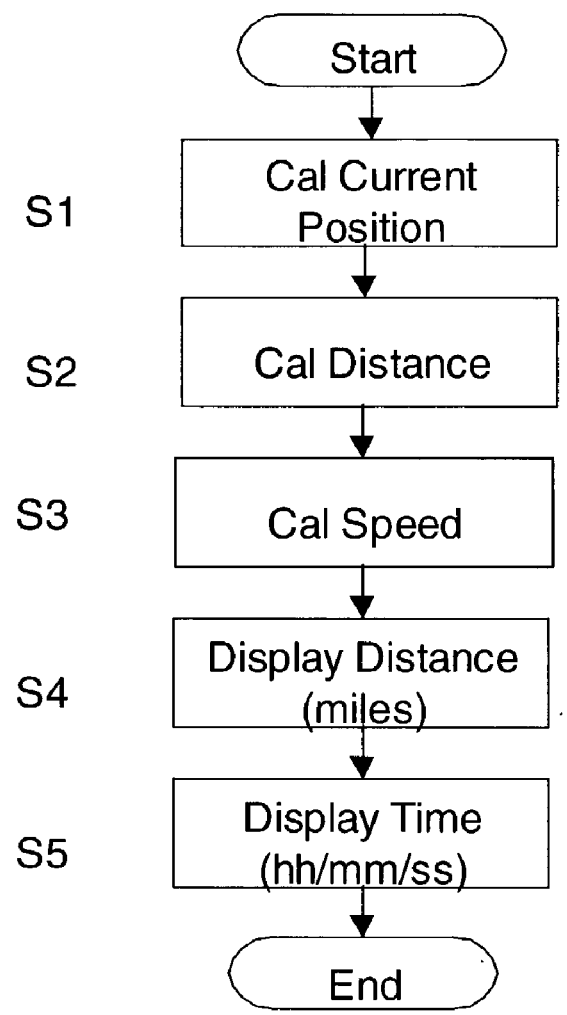
FIG. 73 is a flowchart illustrating an exemplary embodiment of the present invention.

FIG. 73 illustrates the method of displaying the time and distance to the destination. As illustrated in FIG. 73, CPU 211 (FIG. 1) calculates the current position wherein the source data can be input from the method described in FIG. 68 and/or FIG. 71 (S1). The distance is calculated from the method described in FIG. 70 (S2). The speed is calculated from the distance which communication device 200 has proceeded within specific period of time (S3). The distance to the destination and the time left are displayed on LCD 201 (FIG. 1) (S4 and S5).

Figure 74:
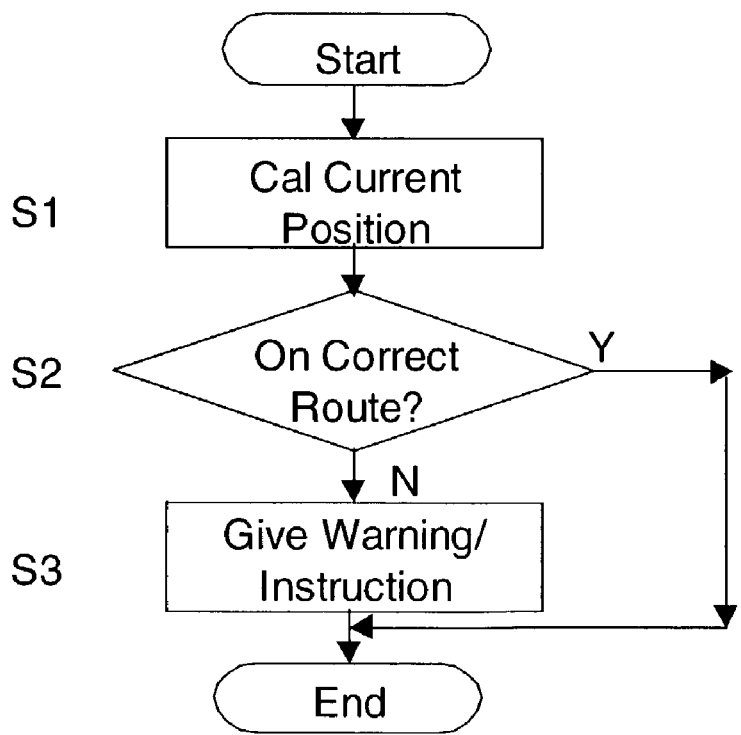
FIG. 74 is a flowchart illustrating an exemplary embodiment of the present invention.

FIG. 74 illustrates the method of warning and giving instructions when the user of communication device 200 deviates from the correct route. By way of periodically and automatically inputting the current position by the method so-called "global positioning system" or "GPS" as described hereinbefore, the current position is continuously updated (S1). If the current position deviates from the correct route (S2), a warning is given from speaker 216 (FIG. 1) and/or LCD 201 (FIG. 1) (S3). The method described in FIG. 74 is repeated for certain period of time. If the deviation still exists after such period of time has passed, CPU 211 (FIG. 1) initiates the sequence described in FIG. 70 and calculates the shortest route to the destination and display on LCD 201. The details of such sequence is as same as the one explained in FIG. 70.

Figure 74A:
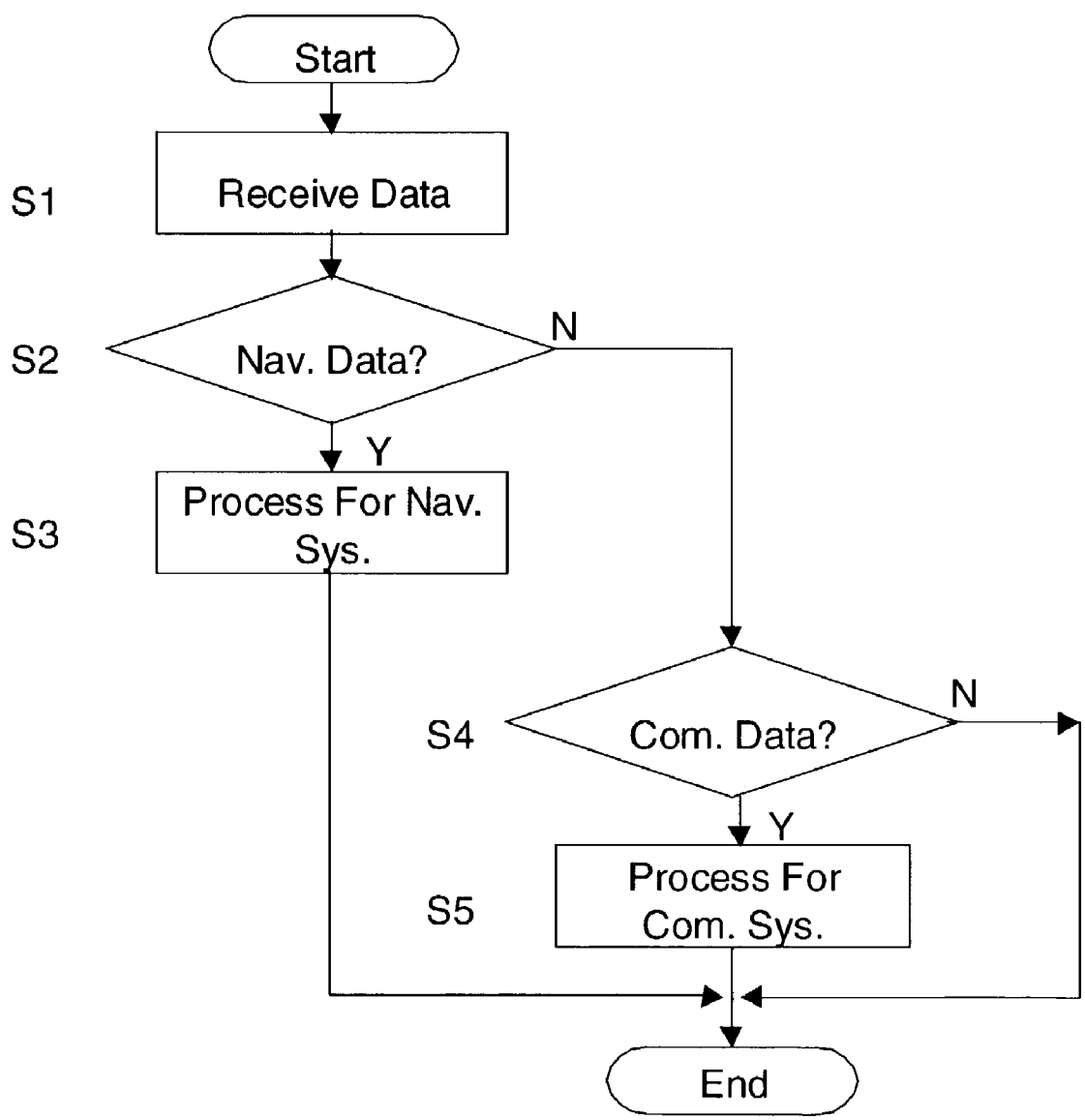
FIG. 74a is a flowchart illustrating an exemplary embodiment of the present invention.

FIG. 74a illustrates the overall operation of communication device 200 regarding the navigation system and the communication system. When communication device 200 receives data from antenna 218 (FIG. 1) (S1), CPU 211 (FIG. 1) determines whether the data is navigation data, i.e., data necessary to operate the navigation system (S2). If the data received is a navigation data the navigation system described in FIGS. 67 through 74 is performed (S3). On the other hand, if the data received is a communication data (S4), the communication system, i.e., the system necessary for wireless communication which is mainly described in FIG. 1 is performed (S5).

<<Navigation System—Summary>>

The foregoing inventions may be summarized as the following.

(1) A GPS navigation device consisting of a display, a microphone, a GPS navigation system which identifies the present location of said GPS navigation device, and a voice recognition system which retrieves a text and numeric data from an analog audio input from said microphone wherein said analog audio is input to said microphone, said voice recognition system retrieves said text and numeric data from said analog audio, said text and numeric data is input to said GPS navigation system thereby enabling the user of said GPS navigation device to input necessary data therein without using his/her hands and/or without physically contacting said GPS navigation device and utilizing said GPS navigation system.

(2) A communication device consisting of a GPS navigation system, a wireless communication system, and an antenna wherein said antenna receives navigation data which is necessary to operate said GPS navigation system, and said antenna also receives communication data which is necessary to operate said wireless communication system thereby enabling said communication device to be compact and also enabling the user of said communication device to find directions by utilizing said GPS navigation system as well as using said wireless communication system.

(3) A GPS navigation device consisting of a display means, a navigation system which identifies the present location of said GPS navigation device, a storage means which stores a plurality of object data which is a three-dimensional data of object that is displayed on said display means and a plurality of location data which represents the location of said object wherein based on a specific information produced by said navigation system a specific location data is selected from said storage means, a plurality of said object data which corresponds to said location data is retrieved from said storage means, and said plurality of said object data is displayed on said display means in a manner the user of said GPS navigation device observes from the current location of said GPS navigation device thereby enables said user of said GPS navigation device to have a realistic view from said current location on said display means.

(4) A GPS navigation device consisting of a display means, a navigation system which identifies the shortest route from a first location to a second location, a storage means which stores a plurality of location data which is categorized in one or more groups wherein when a certain group is selected, said navigation system retrieves a plurality of location data pertaining to said certain group, and identifies the shortest route to one of the location data pertaining to said certain group thereby enables the user of said GPS navigation device to take the shortest route from said user's present location to the location of said certain group.

(5) A GPS navigation device consisting of a display means, a navigation system which identifies the shortest route from a first location to a second location, a storage means which stores a plurality of attribution data wherein said shortest route is calculated by referring to said plurality of attribution data thereby enabling the user of said GPS navigation device to reach said second location within shorter period time by way of avoiding road blocks, traffic accidents, road constructions, and traffic jams.

<<Remote Controlling System>>

FIGS. 75 through 83 illustrate the remote controlling system utilizing communication device 200 (FIG. 1).

Figure 75:
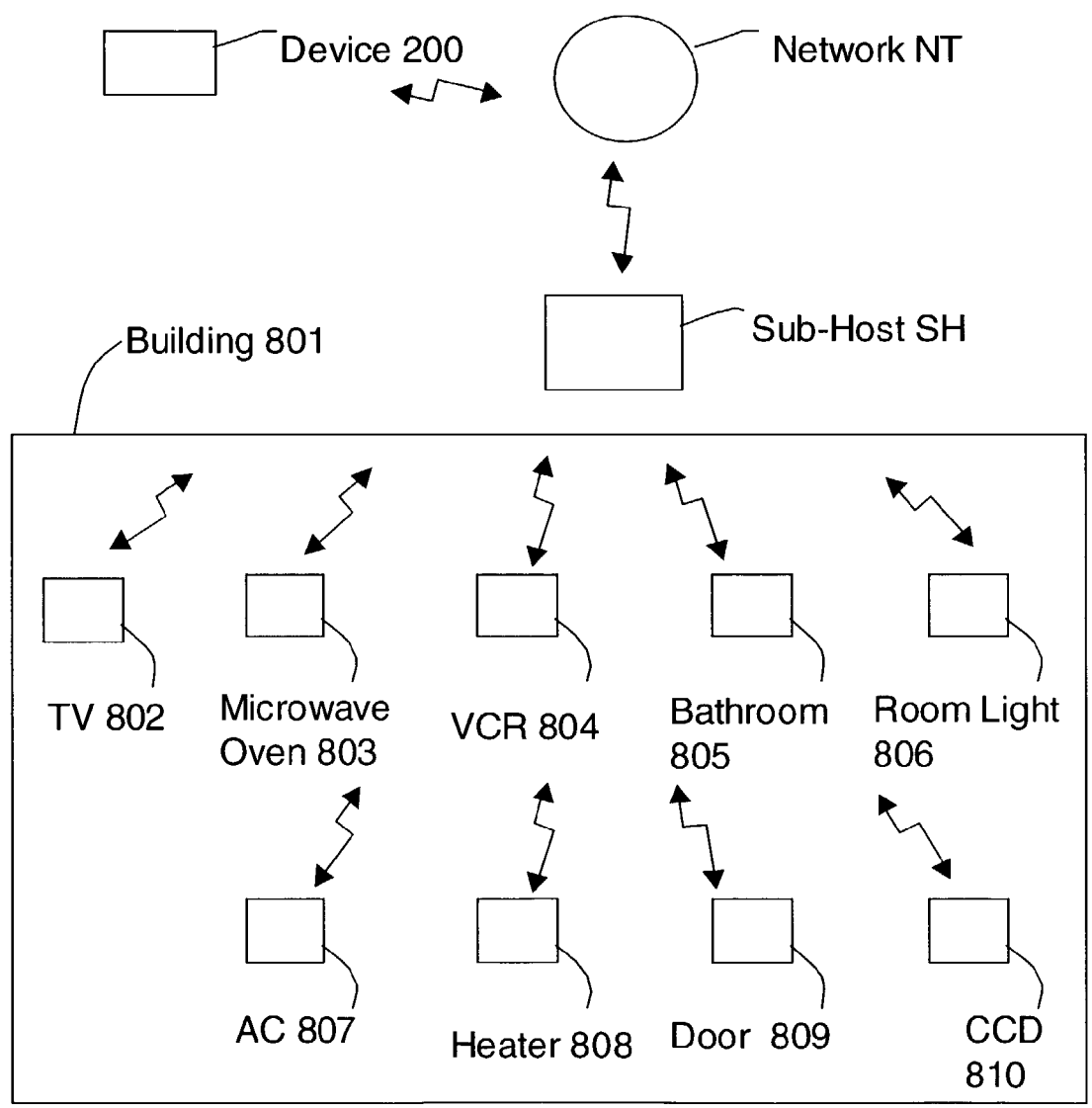
FIG. 75 is a simplified illustration illustrating an exemplary embodiment of the present invention.

As illustrated in FIG. 75, communication device 200 is connected to network NT. Network NT may be the internet or have the same or similar structure described in FIG. 2a, FIG. 2b and/or FIG. 2c except "device B" is substituted to "sub-host SH" in these drawings. Network NT is connected to sub-host SH in a wireless fashion. Sub-host SH administers various kinds of equipment installed in building 801, such as TV 802, microwave oven 803, VCR 804, bathroom 805, room light 806, AC 807, heater 808, door 809, and CCD camera 810. Communication device 200 transfers a control signal to sub-host SH via network NT, and sub-host SH controls the selected equipment based on the control signal.

Figure 76:
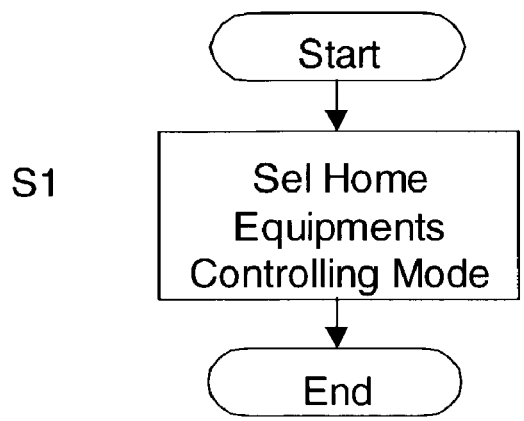
FIG. 76 is a flowchart illustrating an exemplary embodiment of the present invention.

As illustrated in FIG. 76, communication device 200 is enabled to perform the remote controlling system when the device is set to the home equipment controlling mode. Once communication device 200 is set to the home equipment controlling mode, LCD 201 (FIG. 1) displays all pieces of equipment which are remotely controllable by communication device 200. Each equipment can be controllable by the following method.

Figure 77:
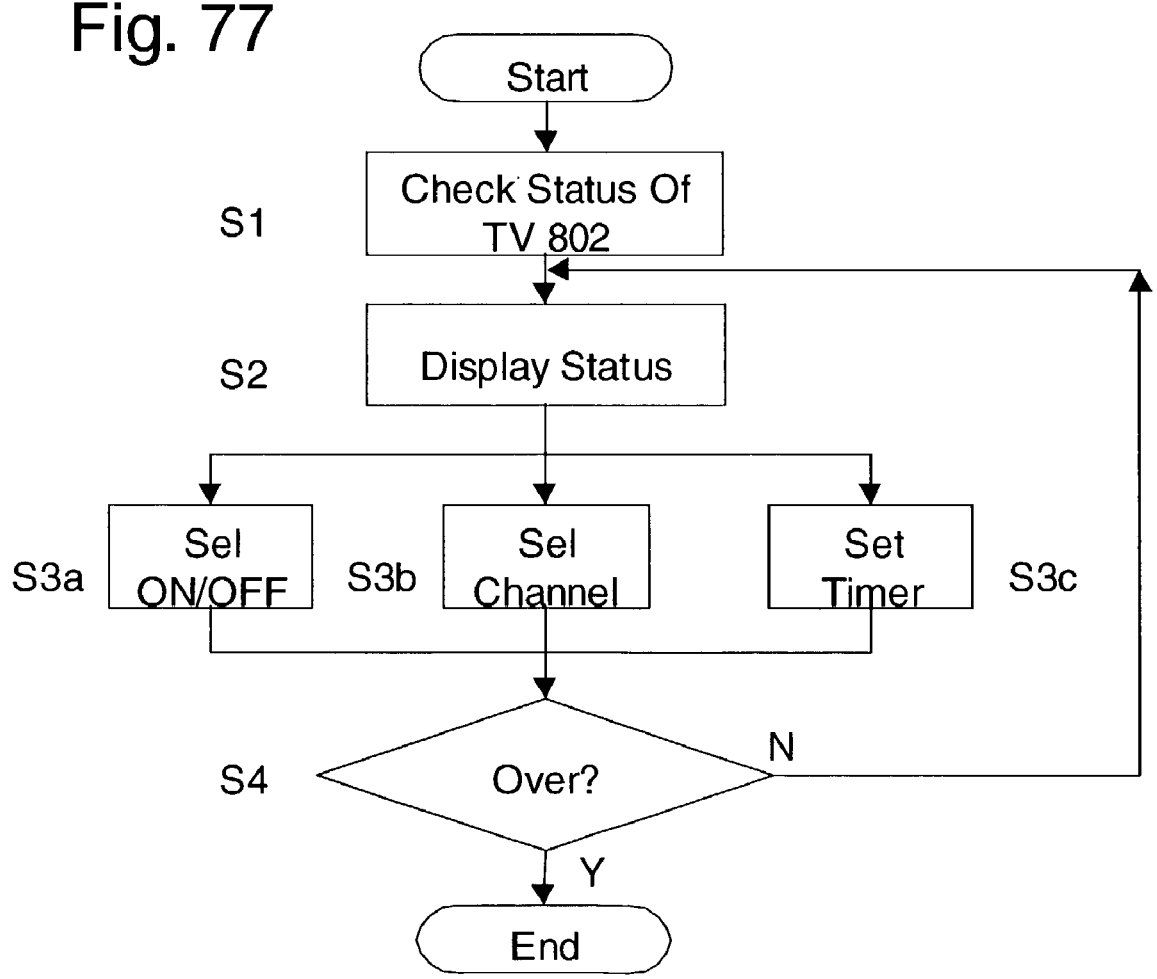
FIG. 77 is a flowchart illustrating an exemplary embodiment of the present invention.

FIG. 77 illustrates the method of remotely controlling TV 802. In order to check the status of TV 802, a specific signal is input from input device 210 (FIG. 1) or by the voice recognition system, and communication device 200 thereby sends a check request signal to sub-host SH via network NT. Sub-host SH, upon receiving the check request signal, checks the status of TV 802, i.e., the status of the power (ON/OFF), the channel, and the timer of TV 802 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the channel (S3b), and/or sets the timer of TV 802 (S3c). The sequence of S2 and S3 can be repeated (S4).

Figure 78:
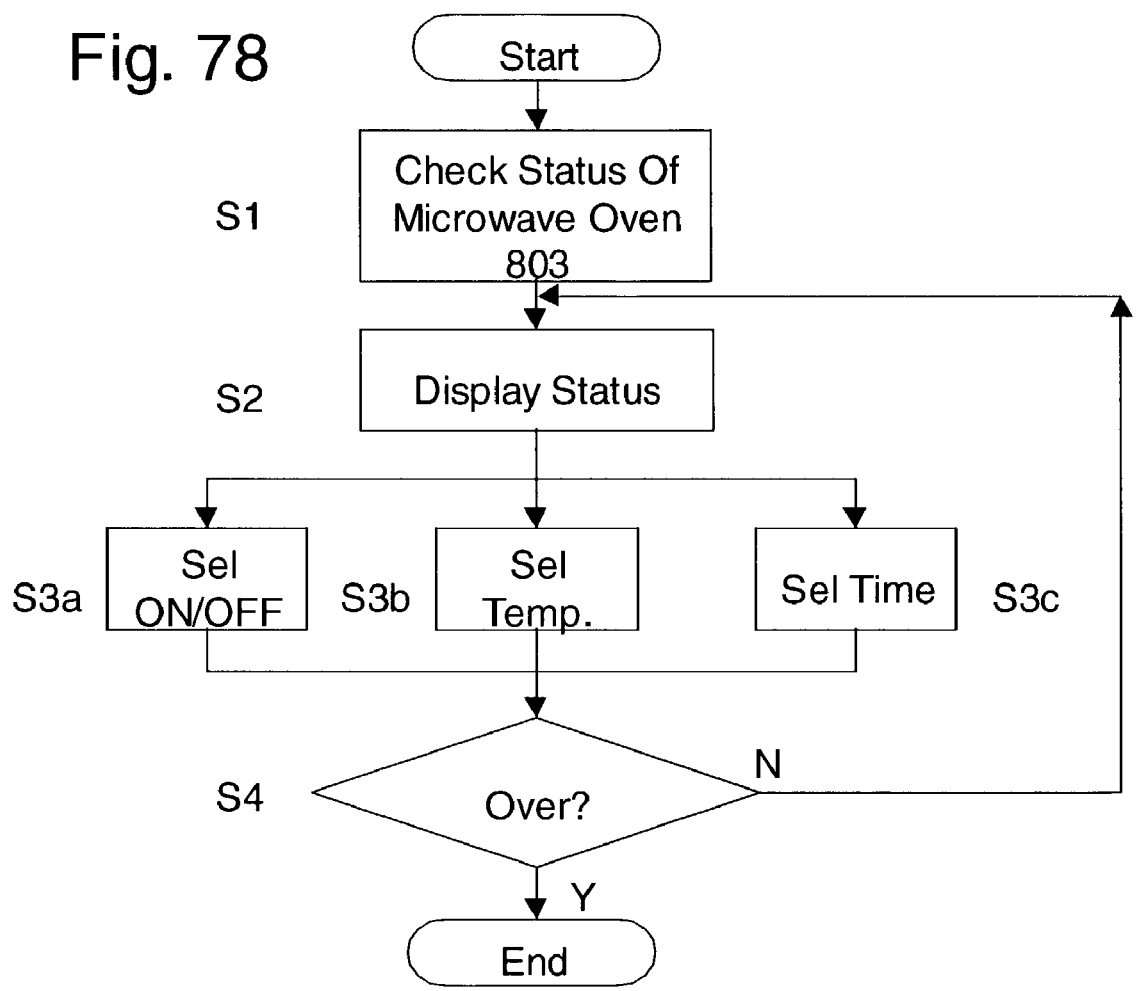
FIG. 78 is a flowchart illustrating an exemplary embodiment of the present invention.

FIG. 78 illustrates the method of remotely controlling microwave oven 803. In order to check the status of microwave oven 803, a specific signal is input from input device 210 (FIG. 1) or by the voice recognition system, and communication device 200 thereby sends a check request signal to sub-host SH via network NT. Sub-host SH, upon receiving the check request signal, checks the status of microwave oven 803, i.e., the status of the power (ON/OFF), the status of temperature, and the timer of microwave oven 803 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the temperature (S3b), and/or sets the timer of microwave oven 803 (S3c). The sequence of S2 and S3 can be repeated (S4).

Figure 79:
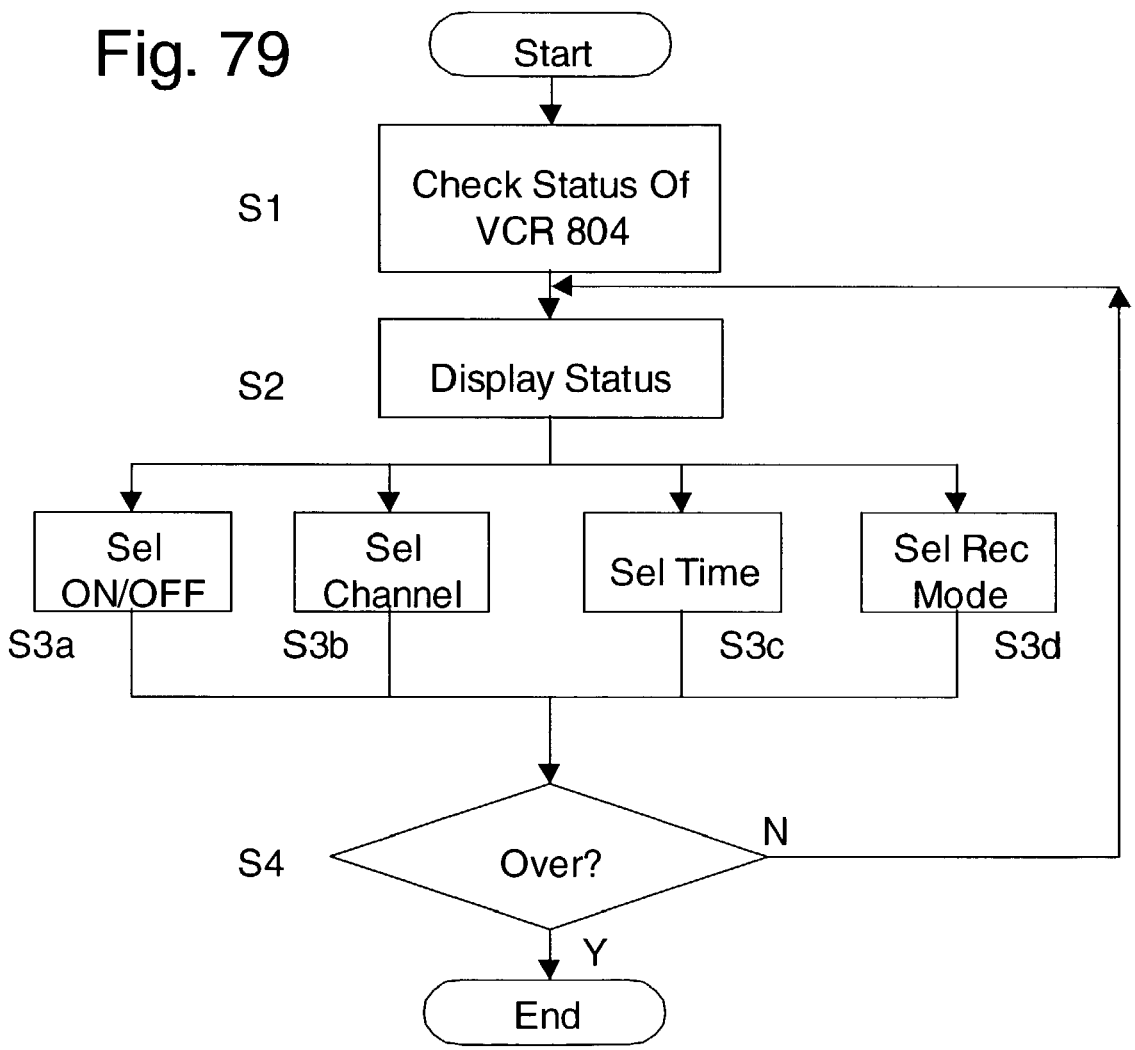
FIG. 79 is a flowchart illustrating an exemplary embodiment of the present invention.

FIG. 79 illustrates the method of remotely controlling VCR 804. In order to check the status of VCR 804, a specific signal is input from input device 210 (FIG. 1) or by the voice recognition system, and communication device 200 thereby sends a check request signal to sub-host SH via network NT. Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the TV channel (S3b), sets the timer (S3c), and/or selects the recording mode of VCR 804 (S3d). The sequence of S2 and S3 can be repeated (S4).

Figure 80:
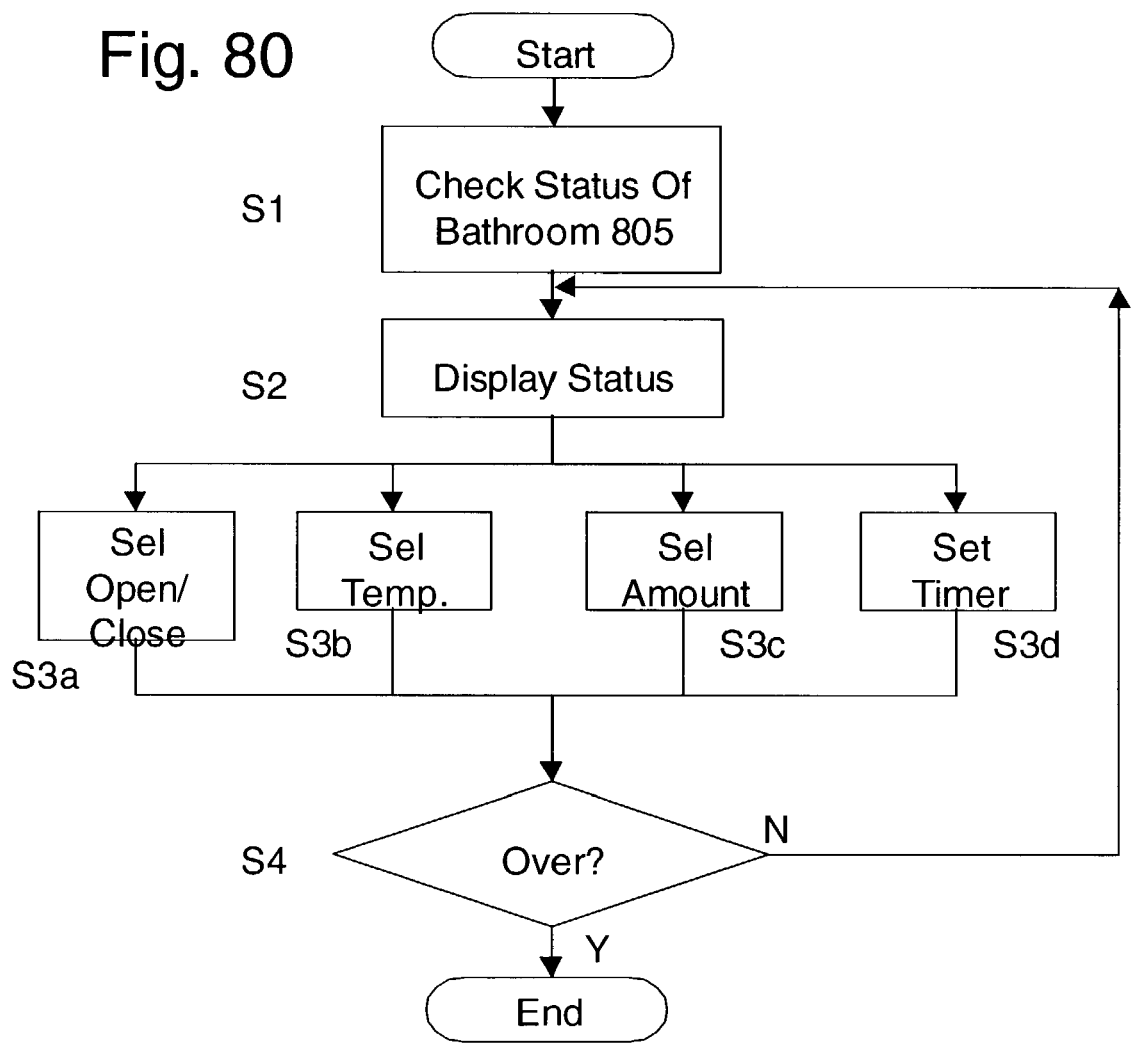
FIG. 80 is a flowchart illustrating an exemplary embodiment of the present invention.

FIG. 80 illustrates the method of remotely controlling bathroom 805. In order to check the status of bathroom 805, a specific signal is input from input device 210 (FIG. 1) or by the voice recognition system, and communication device 200 thereby sends a check request signal to sub-host SH via network NT. Sub-host SH, upon receiving the check request signal, checks the status of bathroom 805, i.e., the status of the bath plug (or the stopper for bathtub) (OPEN/CLOSE), the temperature, the amount of hot water, and the timer of bathroom 805 (S1), and returns the results to communication device 200 via network NT, which are displayed on LCD 201 (FIG. 1) (S2). Based on the control signal produced by communication device 200, which is transferred via network NT, sub-host SH opens (or closes) the bath plug (S3a), selects the temperature (S3b), selects the amount of hot water (S3c), and/or sets the timer of bathroom 805 (S3d). The sequence of S2 and S3 can be repeated (S4).

Figure 81:
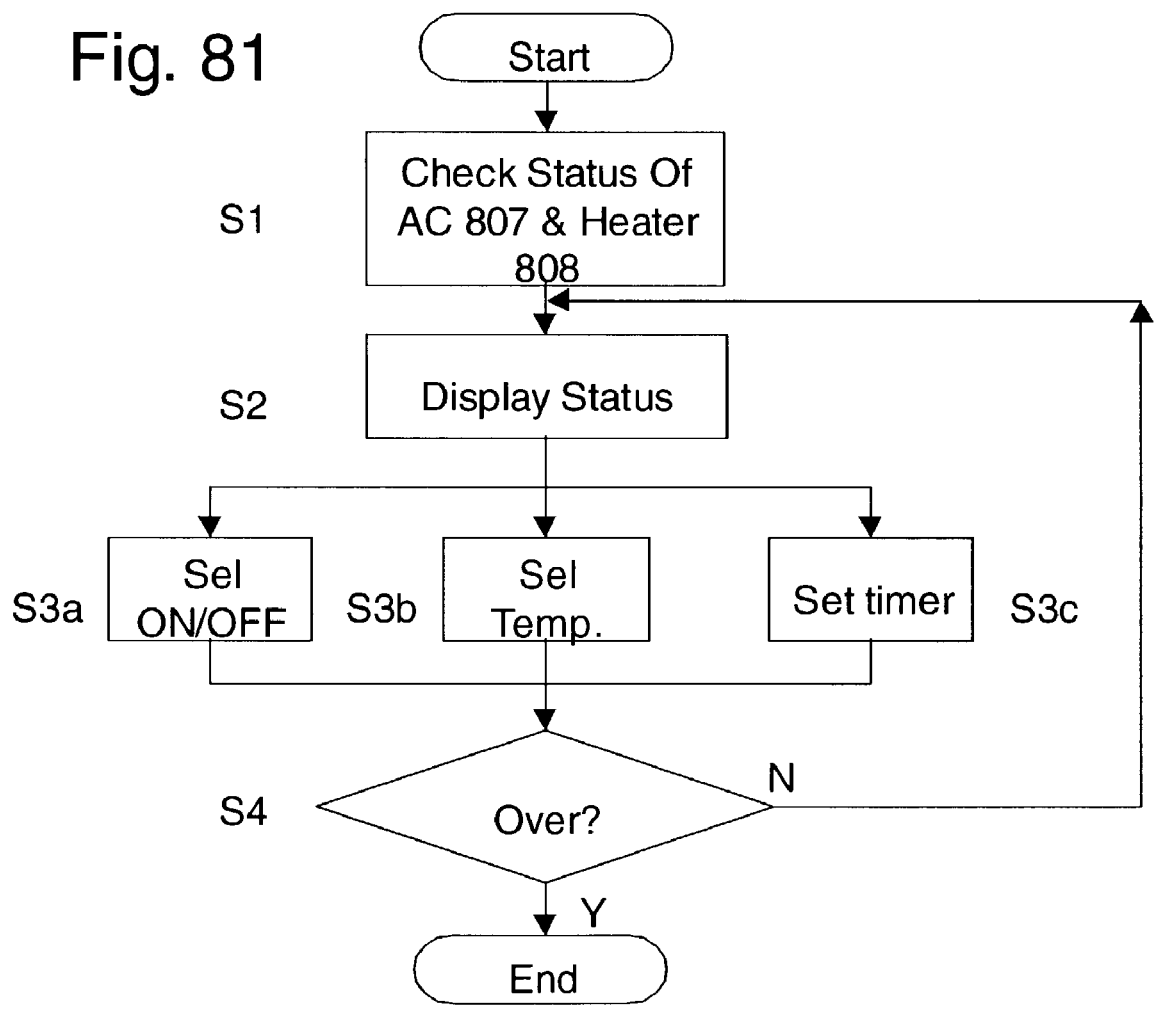
FIG. 81 is a flowchart illustrating an exemplary embodiment of the present invention.

FIG. 81 illustrates the method of remotely controlling AC 807 and heater 808. In order to check the status of AC 807 and/or heater 808 a specific signal is input from input device 210 (FIG. 1) or by the voice recognition system, and communication device 200 thereby sends a check request signal to sub-host SH via network NT. Sub-host SH, upon receiving the check request signal, checks the status of AC 807 and/or heater 808, i.e., the status of the power (ON/OFF), the status of temperature, and the timer of AC 807 and/or heater 808 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the temperature (S3b), and/or sets the timer of AC 807 and/or heater 808 (S3c). The sequence of S2 and S3 can be repeated (S4).

Figure 82:
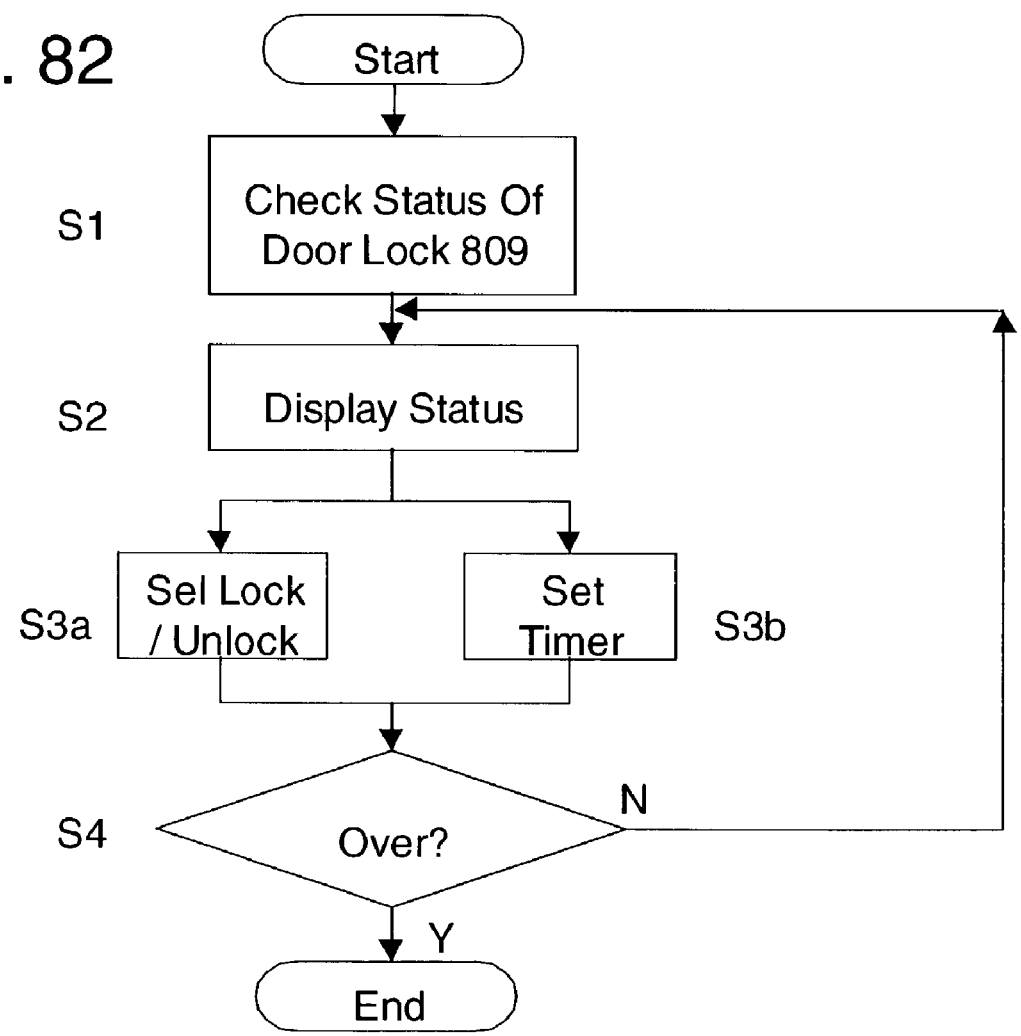
FIG. 82 is a flowchart illustrating an exemplary embodiment of the present invention.

FIG. 82 illustrates the method of remotely controlling door 809. In order to check the status of door 809 a specific signal is input from input device 210 (FIG. 1) or by the voice recognition system, and communication device 200 thereby sends a check request signal to sub-host SH via network NT. Sub-host SH, upon receiving the check request signal, checks the status of door 809, i.e., the status of the door lock (LOCKED/UNLOCKED), and the timer of door lock (S1), and returns the results to communication device 200 via network NT, which are displayed on LCD 201 (FIG. 1) (S2). Based on the control signal produced by communication device 200, which is transferred via network NT, sub-host SH locks (or unlocks) the door (S3a), and/or sets the timer of the door lock (S3b). The sequence of S2 and S3 can be repeated (S4).

Figure 83:
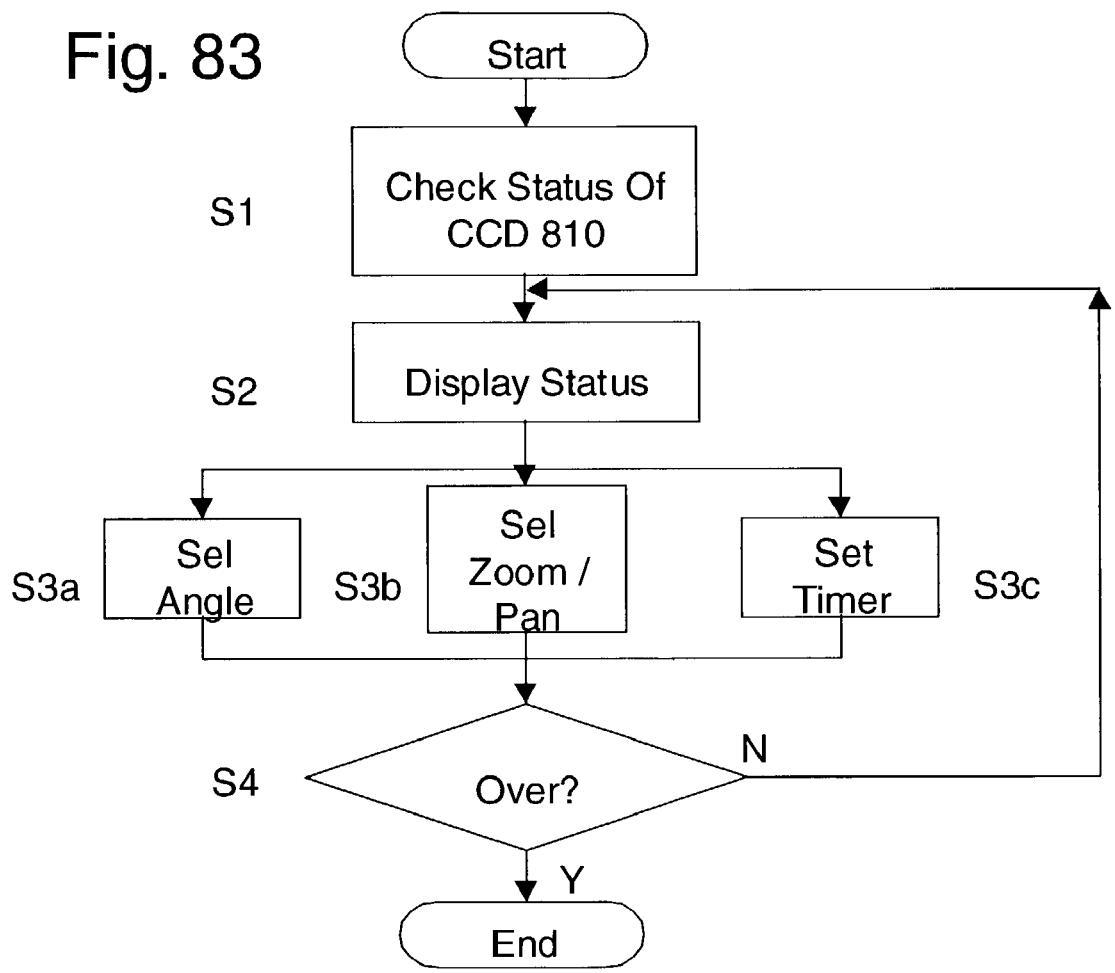
FIG. 83 is a flowchart illustrating an exemplary embodiment of the present invention.

FIG. 83 illustrates the method of CCD camera 810. In order to check the status of CCD camera 810 a specific signal is input from input device 210 (FIG. 1) or by the voice recognition system, and communication device 200 thereby sends a check request signal to sub-host SH via network NT. Sub-host SH, upon receiving the check request signal, checks the status of CCD camera 810, i.e., the status of the camera angle, zoom and pan, and the timer of CCD camera 810 (S1), and returns the results to communication device 200 via network NT, which are displayed on LCD 201 (FIG. 1) (S2). Based on the control signal produced by communication device 200, which is transferred via network NT, sub-host SH selects the camera angle (S3a), selects zoom or pan (S3b), and/or sets the timer of CCD camera 810 (S3c). The sequence of S2 and S3 can be repeated (S4).

Figure 84:
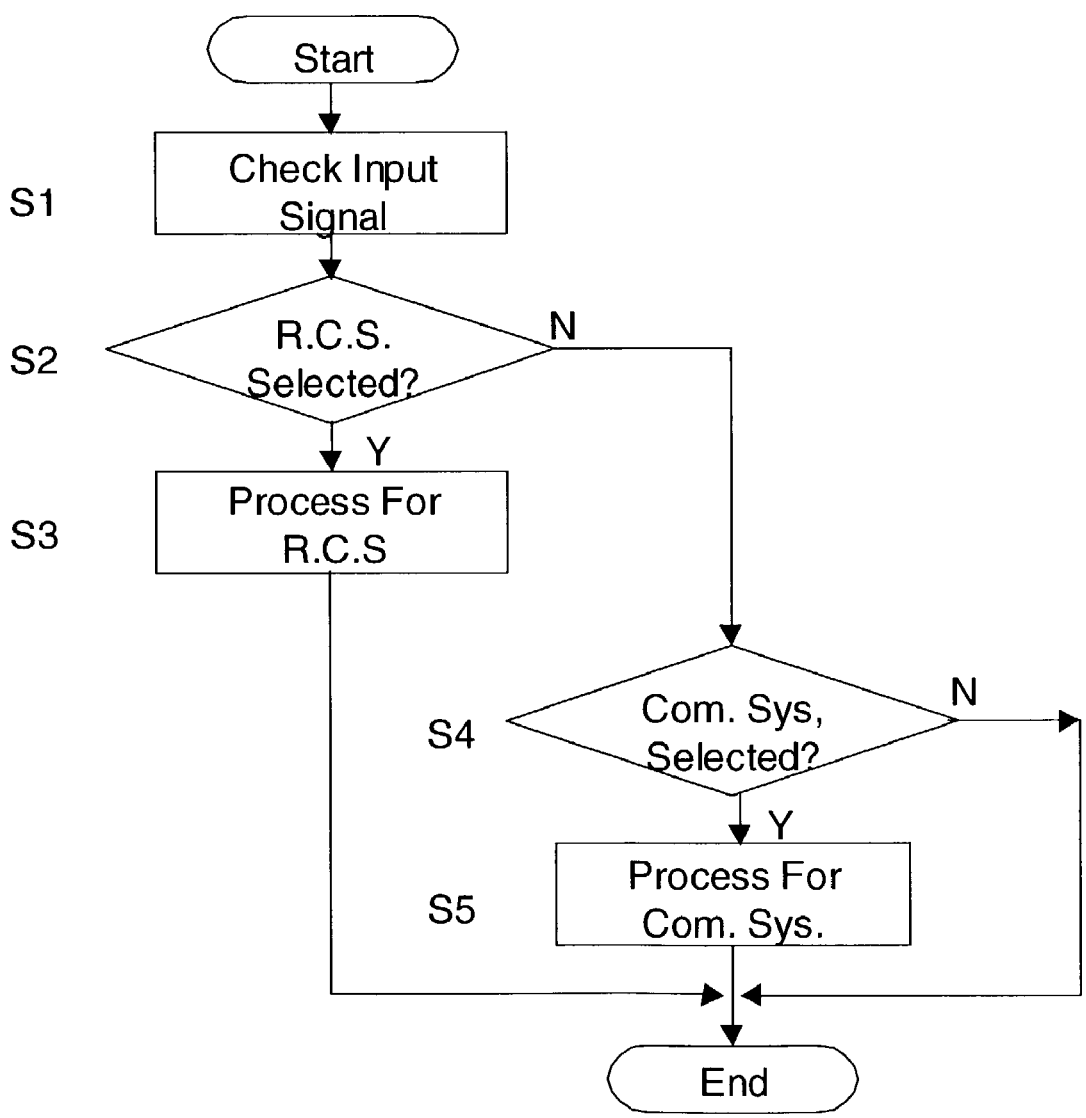
FIG. 84 is a flowchart illustrating an exemplary embodiment of the present invention.

FIG. 84 illustrates the overall operation of communication device 200 regarding the remote controlling system and communication system. CPU 211 (FIG. 1) periodically checks the input signal from input device 210 (FIG. 1) (S1). If the input signal indicates that the remote controlling system is selected (S2), CPU 211 initiates the process for the remote controlling system (S3). On the other hand, if the input signal indicates that the communication system is selected (S4), CPU 211 initiates the process for the communication system (S5).

Figure 85:
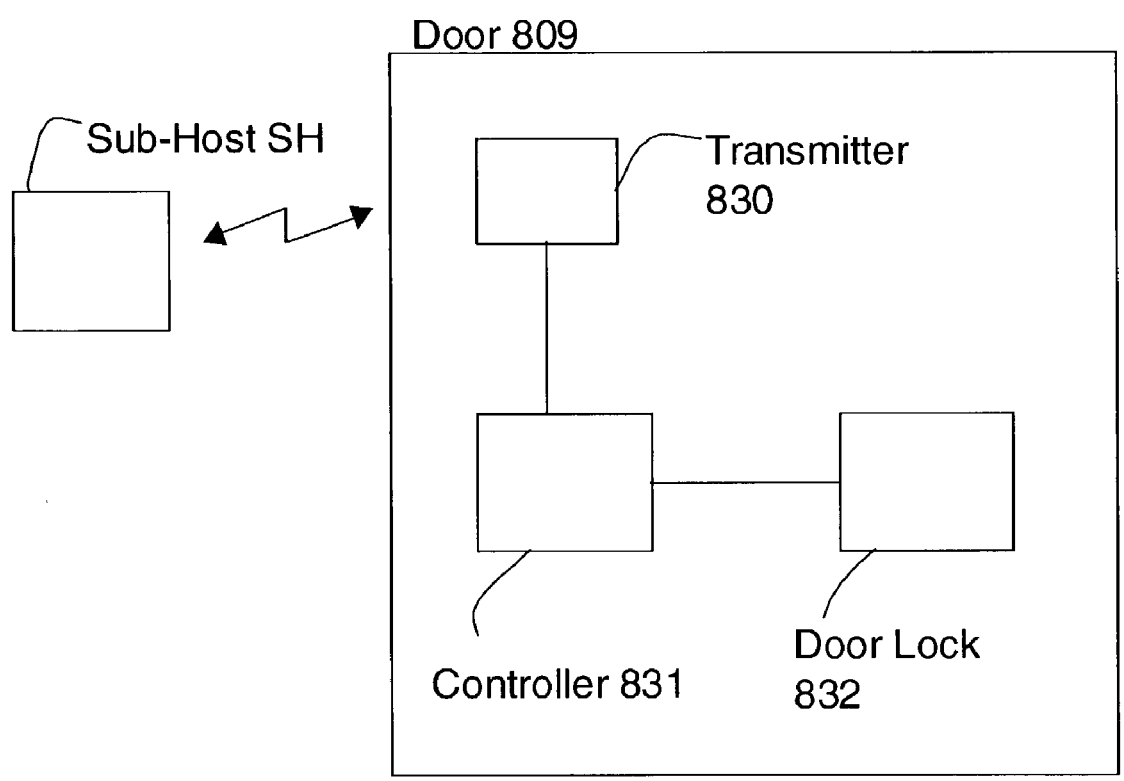
FIG. 85 is a block diagram illustrating an exemplary embodiment of the present invention.

FIG. 85 is a further description of the communication performed between sub-host SH and door 809 which is described in FIG. 82. When sub-host SH receives a check request signal as described in FIG. 82, sub-host SH sends a check status signal which is received by controller 831 via transmitter 830. Controller 831 checks the status of door lock 832 and sends back a response signal to sub-host SH via transmitter 830 in a wireless fashion indicating that door lock 832 is locked or unlocked. Upon receiving the response signal from controller 832, sub-host SH sends a result signal to communication device 200 in a wireless fashion as described in FIG. 82. When sub-host SH receives a control signal from communication device 200 in a wireless fashion as described in FIG. 82, it sends a door control signal which is received by controller 831 via transmitter 830. Controller 831 locks or unlocks door lock 832 in conformity with the door control signal. As another embodiment of the present invention, controller 831 may owe the task of both sub-host SH and itself and communicate directly with communication device 200 via network NT.

As another embodiment of the present invention each equipment, i.e., TV 802, microwave oven 803, VCR 804, bathroom 805, room light 806, AC 807, heater 808, door lock 809, and CCD camera 810, may carry a computer which directly administers its own equipment and directly communicates with communication device 200 via network NT instead of sub-host SH administering all pieces of equipment and communicate with communication device 200.

The above-mentioned invention is not limited to equipment installed in building 801 (FIG. 75), i.e., it is also applicable to the ones installed in all carriers in general, such as automobiles, airplanes, space shuttles, ships, motor cycles and trains.

<<Remote Controlling System—Summary>>

The foregoing inventions may be summarized as the following.

(1) A remote controlling system consisting of a wireless communication device, an administration device which is capable of communicating with said communication device in a wireless fashion, a plurality of equipment which are subject to control of said administration device wherein said communication device sends a controlling signal to said administration device, said administration device controls said plurality of equipment in conformity with said control signal thereby enabling the user of said remote controlling system to remotely control one or more of said equipment in a wireless fashion from any location he/she desires and enabling said user to remotely control one or more said equipment as well as using said remote controlling system to communicate with other devices.

(2) A communication device consisting of a remote controlling system which locks or unlocks a door, a wireless communication system, and an antenna wherein said antenna sends a door control signal which is necessary to lock or unlock said door, and said antenna also sends a communication signal which is necessary to operate said wireless communication system thereby enabling said communication device to be compact and also enabling the user of said communication device to lock or unlock said door as well as using said wireless communication system.

<<Auto Emergency Calling System>>

Figure 86:
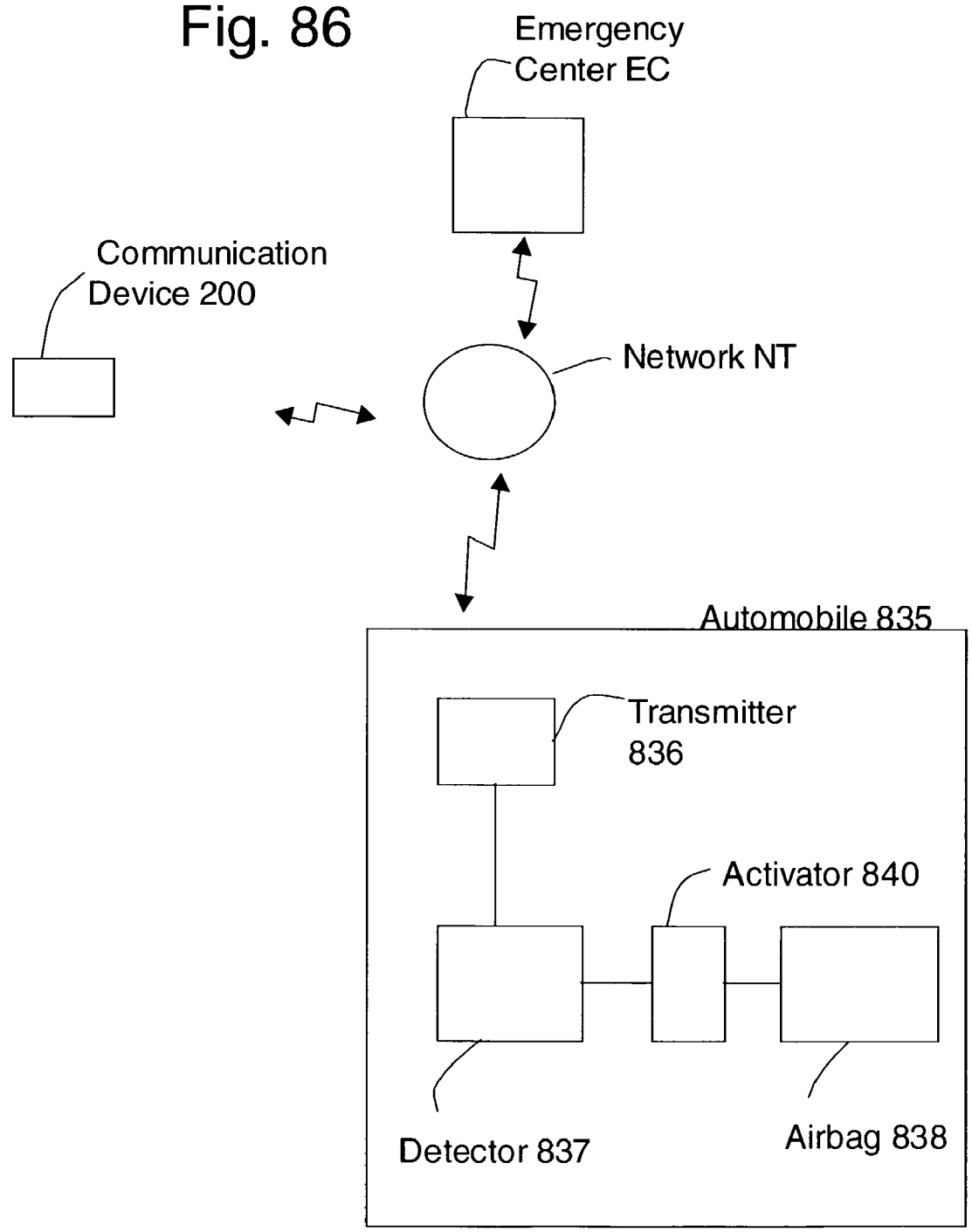
FIG. 86 is a simplified illustration illustrating an exemplary embodiment of the present invention.
Figure 87:
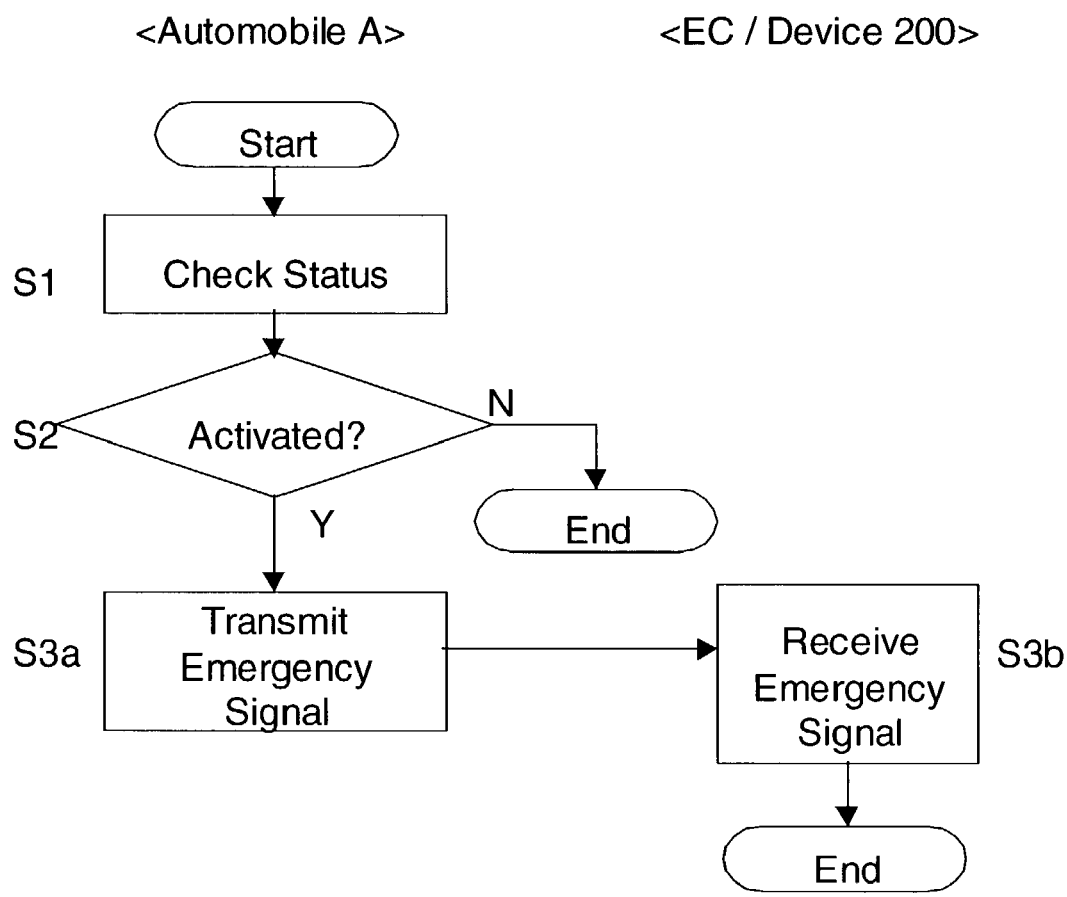
FIG. 87 is a flowchart illustrating an exemplary embodiment of the present invention.

FIGS. 86 and 87 illustrate the automatic emergency calling system utilizing communication device 200 (FIG. 1).

FIG. 86 illustrates the overall structure of the automatic emergency calling system. Communication device 200 is connected to network NT in a wireless fashion. Network NT may be the Internet or have the same or similar structure described in FIG. 2a, FIG. 2b and/or FIG. 2c. Network NT is connected to automobile 835 thereby enabling automobile 835 to communicate with communication device 200 in a wireless fashion. Emergency center EC, a host computer, is also connected to automobile 835 in a wireless fashion via network NT. Airbag 838 which prevents persons in automobile 835 from being physically injured or minimizes such injury in case traffic accidents occur is connected to activator 840 which activates airbag 838 when it detects an impact of more than certain level. Detector 837 sends an emergency signal via transmitter 836 in a wireless fashion when activator 840 is activated. The activation signal is sent to both emergency center EC and communication device 200. In lieu of airbag 838 any equipment may be used so long as such equipment prevents from or minimizes physical injuries of the persons in automobile 835.

FIG. 87 illustrates the overall process of the automatic emergency calling system. Detector 837 (FIG. 86) periodically checks the status of activator 840 (FIG. 86) (S1). If the activator 840 is activated (S2), detector 837 transmits an emergency signal via transmitter 836 in a wireless fashion (S3a). The emergency signal is transferred via network NT and received by emergency center EC (FIG. 86) and by communication device 200 in a wireless fashion (S3b).

As another embodiment of the present invention, the power of detector 837 (FIG. 86) may be usually turned off, and activator 840 (FIG. 86) may turn on the power of detector 837 by the activation of activator 840 thereby enabling detector 837 to send the emergency signal to both emergency center EC (FIG. 86) and to communication device 200 as described above.

This invention is also applicable to any carriers including airplanes, space shuttles, ships, motor cycles and trains.

<<Auto Emergency Calling System—Summary>>

The foregoing invention may be summarized as the following.

An automatic emergency calling system consisting of a carrier, a network and a host wherein said carrier consists of a physical injury prevention means which prevents persons in said carrier from being physically injured or minimizes such injury, a detector which sends an emergency signal, said detector sends said emergency signal when said physical injury prevention means is activated, said emergency signal is received by said host via said network thereby enabling to minimize the duration of time of said persons to be rescued.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A communication device comprising a microphone, a speaker, a display, an input device, a camera, an antenna, and a multiple mode implementor, wherein said multiple mode implementor implements a voice communication mode, a digital mirror mode, a video phone mode, and a call blocking mode, said camera faces the same direction with said display, voice data input from said microphone is transmitted via said antenna and voice data received via said antenna is output from said speaker when said voice communication mode is implemented, visual data is input via said camera, said visual data is converted to an inverted visual data which is inverted data of said visual data, and said inverted visual data is output from said display when said digital mirror mode is implemented, voice data input from said microphone and visual data input from said camera are transmitted via said antenna and voice data and visual data received via said antenna are output from said speaker and said display when said video phone mode is implemented, and when said communication device receives an incoming call via said antenna and the identification of said incoming call is determined to be included in a call blocking list, said incoming call is prohibited from communicating with said communication device when said call blocking mode is implemented.

2. A communication device comprising a microphone, a speaker, a display, an input device, a camera, an antenna, and a multiple mode implementor, wherein said multiple mode implementor implements a voice communication mode, a digital mirror mode, a video phone mode, and a call blocking mode, voice data input from said microphone is transmitted via said antenna and voice data received via said antenna is output from said speaker when said voice communication mode is implemented, visual data is input via said camera, said visual data is converted to an inverted visual data which is inverted data of said visual data, and said inverted visual data is output from said display when said digital mirror mode is implemented, voice data input from said microphone and visual data input from said camera are transmitted via said antenna and voice data and visual data received via said antenna are output from said speaker and said display when said video phone mode is implemented, and when said communication device receives an incoming call via said antenna and the identification of said incoming call is determined to be included in a call blocking list, said incoming call is prohibited from communicating with said communication device when said call blocking mode is implemented.

* * * * *